US007548548B2

(12) United States Patent
Rakib et al.

(10) Patent No.: US 7,548,548 B2
(45) Date of Patent: Jun. 16, 2009

(54) SYSTEM FOR LOW NOISE AGGREGATION IN DOCSIS CONTENTION SLOTS IN A SHARED UPSTREAM RECEIVER ENVIRONMENT

(76) Inventors: Shlomo Selim Rakib, 10271 W. Acres, Cupertino, CA (US) 95014; Yehuda Azenkot, 1128 Littleoak Cir., San Jose, CA (US) 95129

( * ) Notice: Subject to any disclaimer, the term of this patent is extended or adjusted under 35 U.S.C. 154(b) by 1094 days.

(21) Appl. No.: 10/860,959

(22) Filed: Jun. 4, 2004

(65) Prior Publication Data
US 2008/0170853 A1 Jul. 17, 2008

(51) Int. Cl.
*H04L 12/56* (2006.01)
(52) U.S. Cl. .................. 370/419; 370/462; 370/463; 398/66; 398/115; 725/111; 725/126; 725/129
(58) Field of Classification Search .................. None
See application file for complete search history.

(56) References Cited

U.S. PATENT DOCUMENTS

| | | | |
|---|---|---|---|
| 6,529,520 B1 * | 3/2003 | Lee et al. ............... 370/442 |
| 6,742,187 B1 * | 5/2004 | Vogel .................. 725/126 |
| 6,961,314 B1 * | 11/2005 | Quigley et al. .......... 370/252 |
| 7,023,871 B2 * | 4/2006 | Lind et al. ............. 370/437 |
| 7,085,287 B1 * | 8/2006 | Chapman ............... 370/468 |
| 7,187,669 B1 * | 3/2007 | Lee .................... 370/347 |
| 7,359,332 B2 * | 4/2008 | Kolze et al. ............ 370/252 |
| 7,397,846 B1 * | 7/2008 | Beser ................... 375/222 |
| 2003/0061620 A1 * | 3/2003 | Denney et al. ............ 725/95 |

* cited by examiner

*Primary Examiner*—Hong Cho
*Assistant Examiner*—Brian Roberts
(74) *Attorney, Agent, or Firm*—Larry T. Cullen

(57) ABSTRACT

A cable modem termination system is disclosed with flexible mapping of upstreams to downstreams and flexible mapping of downstreams to optical nodes and optical nodes to upstream receivers and the ability to add singe upstreams or downstreams as needed for load balancing. Multiple downstreams can share the same upstream. Multiple receivers can be coupled to the same upstream. Monitoring of upstream performance for overperforming or underperforming modems can be carried out, and new upstreams with higher and/or lower throughput can be created to service the overperformers and/or underperformers. Modems can be grouped into logical groups with different performance levels and serviced by different upstreams or different upstream logical channels on the same upstream physical channel. An upstream linecard with a digital crosspoint switch is disclosed with the switch operated during contention intervals to allow reception with or without aggregation of noise where multiple upstream share the same receiver.

18 Claims, 32 Drawing Sheets

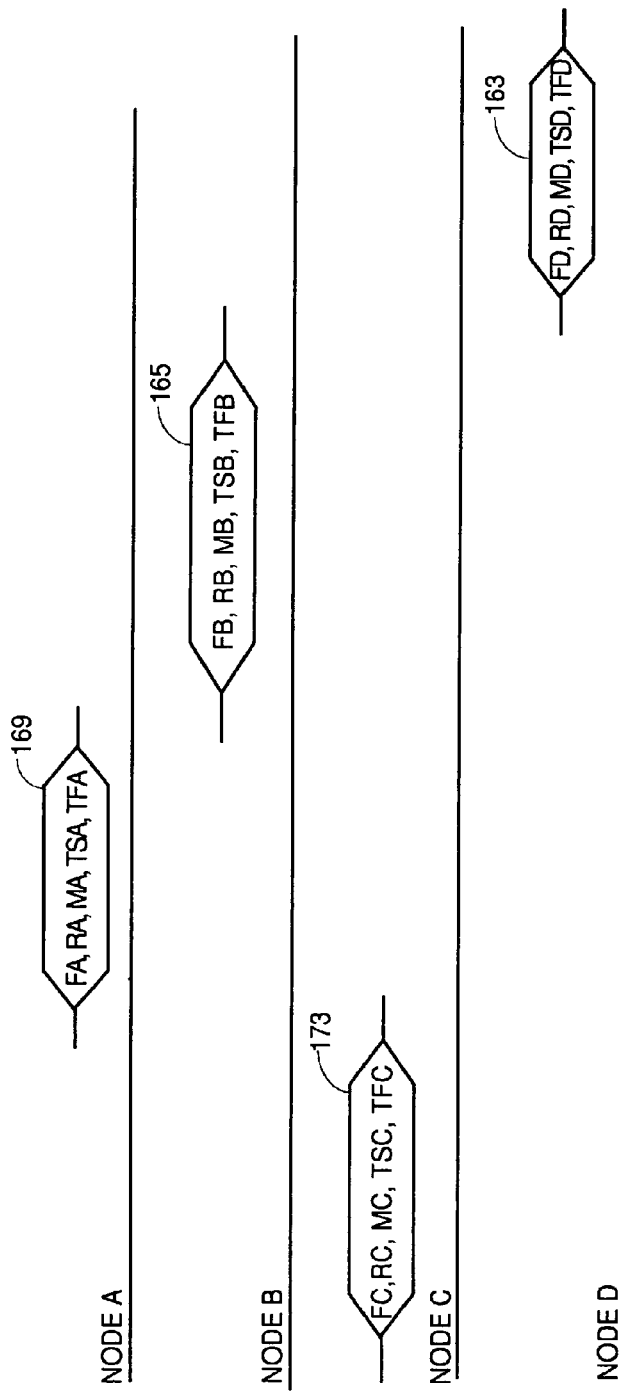
FIG. 7
FIG. 8

COMMON NODE FOR US & DS, BUT SEPARATE CHANNELS ON THE DS

SYSTEM FOR LOW NOISE AGGREGATION IN DOCSIS CONTENTION SLOTS IN A SHARED UPSTREAM RECEIVER ENVIRONMENT

BACKGROUND OF THE INVENTION

This invention is related to the subject matter of a U.S. patent application entitled PROCESS FOR SHARING AN UPSTREAM AMONG MULTIPLE DOWNSTREAMS, Ser. No. 10/295,712, filed Nov. 15, 2002 (TER-029) and a U.S. patent application entitled CABLE MODEM TERMINATION SYSTEM WITH FLEXIBLE ADDITION OF SINGLE UPSTREAMS OR DOWNSTREAMS, filed Nov. 29, 2003, Ser. No. 10/725,092 (TER-045) both of which are hereby incorporated by reference.

In today's cable modem termination systems (CMTS), there is a fixed ratio of downstreams to upstreams on each expansion card. This means that a prior art expansion card for a CMTS has one downstream transmitter with all the media access control and physical layer circuitry needed to transmit a DOCSIS downstream on a hybrid fiber coaxial cable (HFC). The prior art expansion cards also has four upstream receivers, each with the MAC and physical layer circuitry needed to interface with one hybrid fiber coaxial cable medium. Other prior art expansion cards have different ratios of upstreams to downstreams. However, the need for additional upstream and downstream capacity does not change in the same fixed ratio as the cards. Thus, when upstream or downstream installed capacity is exceeded, another card must be added which adds another downstream and four upstreams. This causes excessive expenditure and bad return on investment if all the cable operator needs is another upstream or another downstream. A need has arisen for a system which can smoothly and gradually add downstream or upstream capacity as needed. As downstreams are added, it would be convenient to be able to associate them to a shared upstream. A U.S. patent application entitled PROCESS FOR SHARING AN UPSTREAM AMONG MULTIPLE DOWNSTREAMS, Ser. No. 10/295, 712, filed Nov. 15, 2002 teaches how to do this and teaches a CMTS mapping system at FIG. 11. This CMTS mapping system maps M downstreams flexibly to N HFC systems. In other words, it has the ability to split a single downstream for simultaneous transmission thereof on more than one HFC and to combine multiple downstreams for transmission on a single HFC (or multiple HFC systems that are different in number than the number of downstreams which have been combined). The CMTS mapping system also has the ability to allow multiple downstreams to share a single upstream receiver, and the ability to combine an upstream arriving on multiple HFC systems for coupling to an input of a single upstream receiver.

When sharing an upstream receiver, one option is to combine upstream logical channels and apply the combined signals to the input of a shared receiver. This aggregates the noise on the upstreams. When there are multiple receivers, summing all the inputs to one receiver is a waste. Further aggregation of noise is not necessary during either contention intervals or non contention intervals. A need has arisen for a method and apparatus to share receivers without aggregation of noise during contention and non contention intervals and a way to fully utilized all receivers during contention intervals and reduce noise aggregation.

Further, it would be desirable to share a downstream between multiple upstreams and to do load balancing as traffic conditions dictate. This notion of flexible addition of upstreams and downstream, removing the necessity for a line card to have both upstreams and downstream or fixed ratios there between, and flexible mapping between upstreams and downstreams will be referred to as upstream/downstream decoupling. Decoupling is somewhat misdescriptive because the downstreams which share an upstream must be coordinated tightly as will be described below. The term is meant here to refer to the elimination of the need to add unneeded circuitry as the need for capacity grows by providing a greater granularity in the ability to add single downstream transmitters or single upstream receivers, map multiple downstreams to the same upstream or multiple upstreams to the same downstream, and coordinate the media access control messaging needed to do that.

Further, it would be desirable to provide a CMTS which supports the coexistence of MPEG video delivery via conventional transport streams with video delivery over IP packets, and provide two way conditional access and high definition delivery capability and video rate shaping.

SUMMARY OF THE INVENTION

An upstream linecard having a digital crosspoint switch, multiple inputs and one or more receivers is disclosed. The inputs are coupled to RF amplifier sections which have their gain controlled by the receiver(s). The receivers receive DOCSIS MAP and UCD data for bursts they have been assigned to receive by an upstream media access control process. The receivers use this data to determine when bursts are scheduled during non contention intervals so as to generate switching control signals to control the crosspoint switch to couple each scheduled burst during non contention intervals to the input of the receiver scheduled to receive it. The UCD data is used to configure the receiver properly to receive the type of burst scheduled. During contention intervals, the receivers inform the crosspoint switch (or the crosspoint switch receives the MAP data itself from the MAC process), and the crosspoint switch goes into a different mode of operation. Since it is unknown when bursts will be arriving during contention intervals, the receivers can no longer control switching of the crosspoint switch according to MAP data. Accordingly, in one species, when a contention interval occurs, the crosspoint switch determines which receivers are available and senses energy of incoming bursts. When energy is sensed, the input at which the burst is arriving is coupled to an output coupled to a PHY receiver and the PHY receiver receives the burst and recovers the data. If the burst was a collision, the PHY receiver will not be successful in recovering data and the UMAC process will not send any response back to the cable modem which sent the burst which causes the cable modem to retry its burst later. When energy is sensed on another input, that input is coupled to another output (if any) coupled to another available receiver (if any). If only one receiver is available, additional bursts are ignored until the receiver finishes processing of the preceding burst and announces or is polled to indicate its renewed availability.

Another class of species has noise aggregation during contention intervals (which is permissible because contention interval bursts use simple, more noise tolerant QPSK modulation) but shares a receiver without noise aggregation during non contention intervals. One member of this class of species divides the upstream logical channels into groups having the same MAC domain, the same UCD and same IUC burst type. Each group is then subdivided into a number of subgroups equal to the number of receivers available. The inputs at which the logical channels of each subgroup will arrive are then summed to the same output which is coupled to one of the available receivers. Each receiver then recovers the data of any non colliding burst in the subgroup of logical channels to which it is coupled. Breaking the channels into groups and subgroups reduces the amount of aggregated noise per shared receiver.

Another member of the class of species groups the upstream logical channels into groups with the same MAC domain, the same UCD and the same IUC. A group is then picked during contention intervals, and the inputs at which the logical channels of the group will be arriving are coupled through the crosspoint switch to a receiver which is available to process the bursts. Non colliding bursts are then received and data recovered.

All species within the genus share a receiver among multiple upstreams without aggregation of noise during non contention intervals and, during contention intervals different approaches are used including energy sensing, grouping and summing or grouping, subgrouping and summing each subgroup. However, all species use the crosspoint switch to get bursts during contention intervals to a receiver which is capable of receiving them.

BRIEF DESCRIPTION OF THE DRAWINGS

FIG. 7 is a diagram of how the UMAC schedules non overlapping TDMA or SCDMA or both TDMA and SCDMA bursts for the upstream transmissions of CMs tuned to one of the multiple downstreams which shares an upstream, with the CMs being coupled to four different optical nodes.

FIG. 8 is a diagram of the timing of input bursts from different optical nodes to the input of the shared upstream receiver.

DETAILED DESCRIPTION OF THE PREFERRED AND ALTERNATIVE EMBODIMENTS

Figure 1:
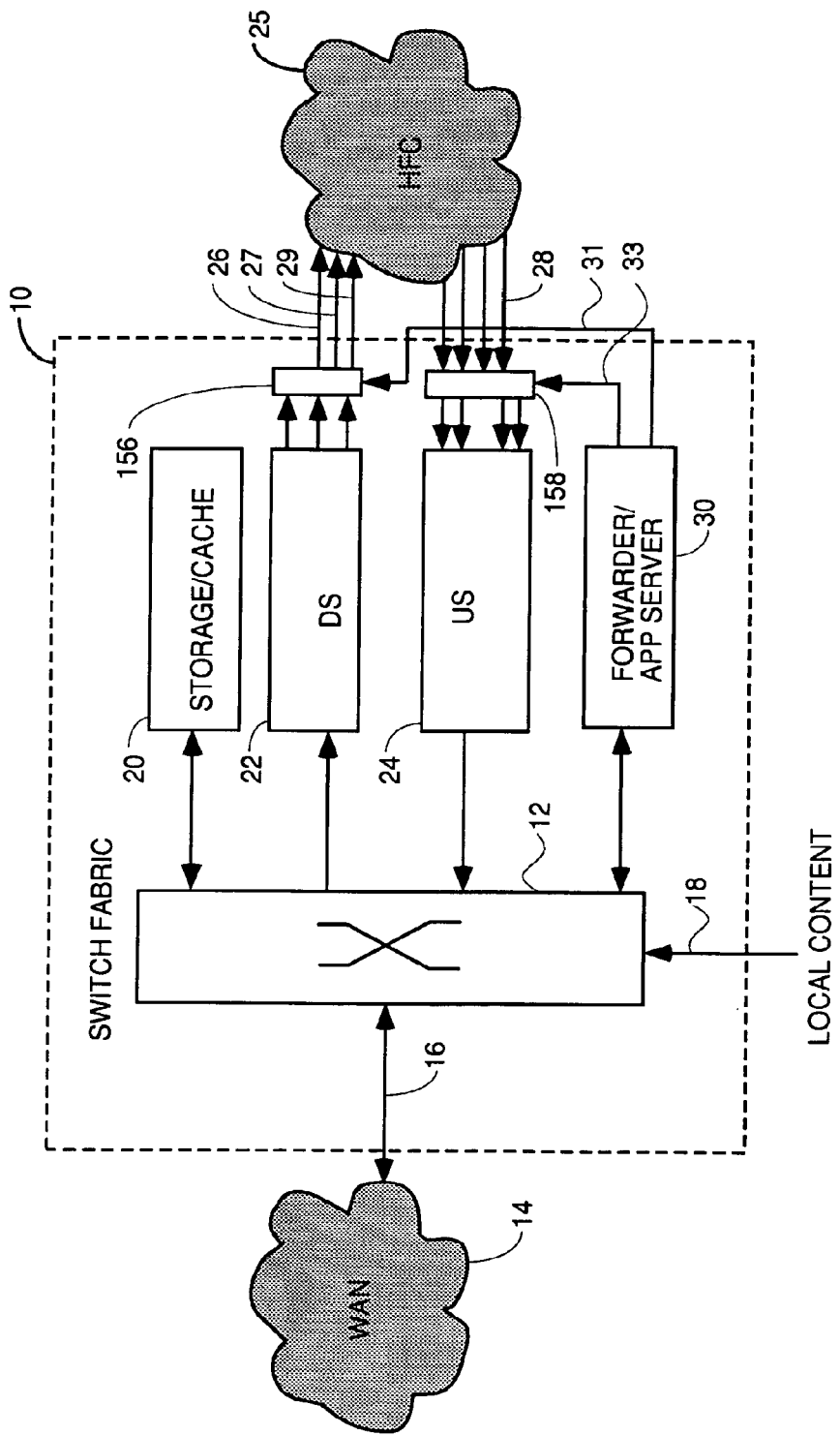
FIG. 1 is a block diagram of a new third generation CMTS architecture.

FIG. 1 is a block diagram of a new third generation CMTS architecture and having circuitry which is compliant with DOCSIS 1.0, 1.1 and 2.0 specifications, all of which are hereby incorporated by reference. The CMTS 10 is comprised of a packet switch 12 for coupling to a wide area network 14 such as the internet via data path 16, local content provider servers such as video-on-demand (VOD) servers (not shown) via data path 18. Inside the CMTS, the switch fabric is coupled to a storage/cache memory 20, one or more downstream transmitter line cards, represented collectively at 22.

The downstream transmitters each have an RF output which is coupled to one or more optical nodes (not shown) of a hybrid fiber coaxial cable system (HFC) 25 via a downstream mapper and splitter/combiner 156 (downstream mapping switch). Each downstream transmitter line card functions to transmit one or more MPEG transport streams and DOCSIS downstreams on a QAM modulated downstream channel to one or more optical nodes in HFC system 25, as dictated by a downstream mapping switch 156.

The downstream mapping switch 156 has a plurality of outputs 27, 29 and 26 for coupling to one or more optical nodes of HFC system 25. It also has an input coupled to the RF output of each downstream transmitter. Downstream mapping switch also has a control input 31 for receiving control signals which control which transmitter outputs are coupled to which optical nodes. In the embodiment shown, these switching control signals are supplied on line 31 from a forwarder/application server 30 which is described below as running upstream and downstream media access control processes. In alternative embodiments, each downstream transmitter line card in collection 22 has its own microprocessor running a downstream media access control process (DMAC) and control signals for downstream mapping switch 156 are generated by these DMAC processes in cooperation with upstream media access control processes running in one or more upstream receiver line cards shown collectively at 24.

The switch fabric 12 is also coupled to one or more upstream receiver line cards shown collectively at 24. Each receiver line card functions to receive one or more DOCSIS or other upstreams 28 from one or more optical nodes in HFC system 25, as dictated by an upstream mapper switch 158. Each receiver line card has a microprocessor which runs an upstream media access control (UMAC) process in alternative embodiments, but in the embodiment shown, all UMAC processes are executed in forwarder/application server 30.

The upstream mapper switch 158 has one or more outputs coupled to the RF inputs of the receiver line cards. The mapper switch 158 also has one or more inputs for coupling to optical nodes in said HFC system 25. Control over which optical nodes are coupled to which receiver inputs is by way of control signals on line 33 from forwarder/application server 30. In alternative embodiments, the UMAC processes in the line cards generate the control signals which control the mapping implemented by upstream mapper switch 158. Data is exchanged as described later herein between UMAC and DMAC processes to map downstreams to shared upstreams and coordinate DOCSIS messaging to implement flexible upstream and downstream mapping. Data exchange between UMAC and DMAC processes is via switch fabric 12 in some embodiments and via any other interprocess data exchange path in embodiments where the UMAC and DMAC processes are run in forwarder/application server 30.

A forwarder/application server 30 functions, inter alia, in one embodiment to receive upstream requests from the upstream line cards and to send DOCSIS downstream message and other data to the downstream line card collection 22. The forwarder 30 also controls switch fabric 12 to route messages to the proper servers to fulfill those requests, and runs a downstream media access control (DMAC) process for each downstream and generates downstream media access control (MAC) messages and sending them to the appropriate downstream transmitters by properly controlling switch fabric 12. The forwarder also runs an upstream media access control process for each upstream (UMAC) and passes UMAC data needed by the DMAC processes to the appropriate DMAC processes by suitably controlling switch fabric 12. The forwarder/application server 30 also runs application programs and conditional access programs, and controls the switch fabric 12 to properly direct all packet traffic to the proper destinations. In other embodiments, each line card has its own MAC process for the downstream transmitter or upstream receiver on the card as the case may be. In some embodiments, each upstream receiver linecard can have multiple receivers.

Upstream and Downstream Decoupling

Flexible Mapping of Multiple Downstreams to a Shared Upstream

Figure 2:
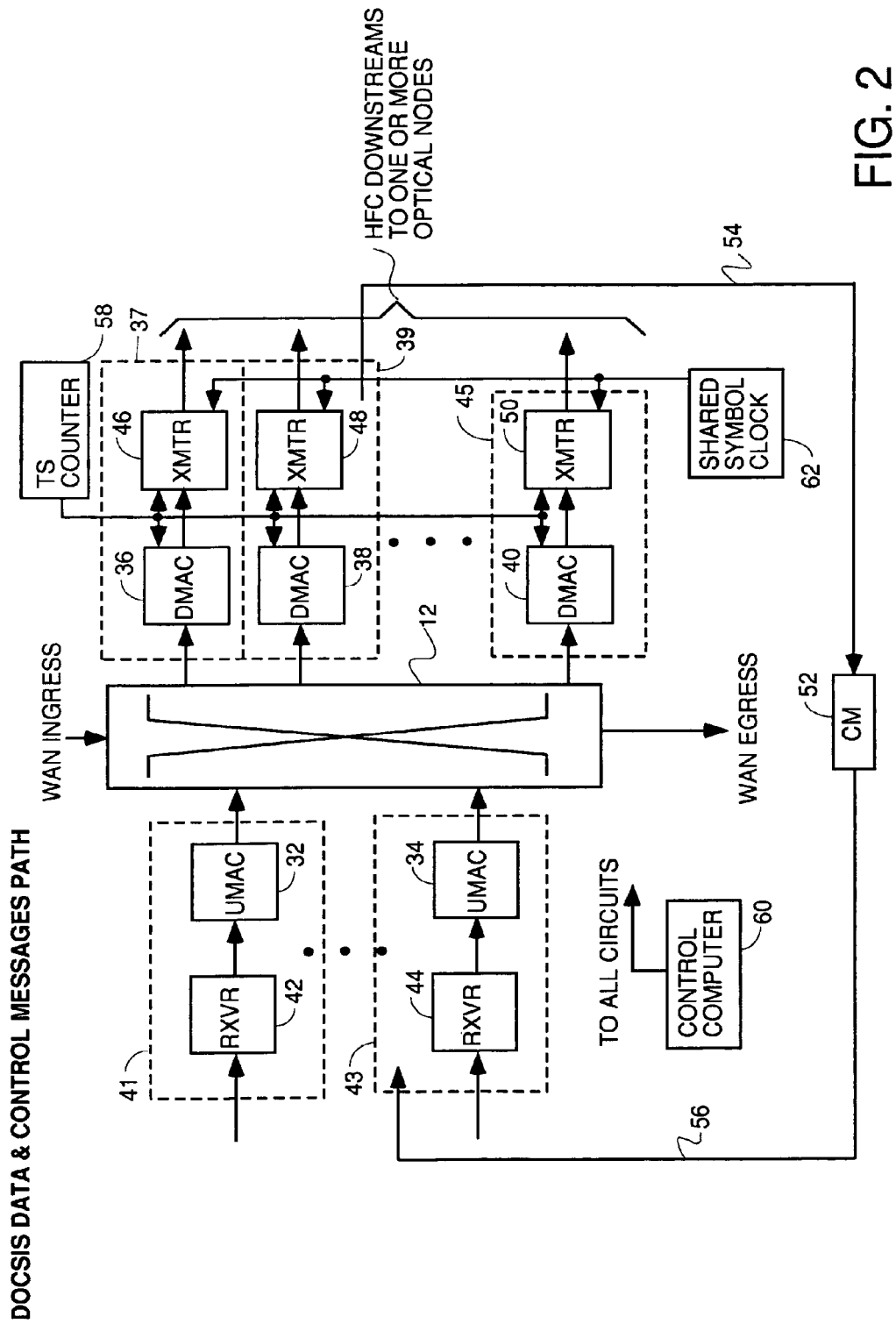
FIG. 2 is a block diagram of the DOCSIS data and control message path in the CMTS.

FIG. 2 is a block diagram of the DOCSIS data and control message path in the CMTS. Upstream and downstream decoupling is about granularity and the ability to add single upstreams as needed and single downstreams as needed and to group them together as needed. The mapping of multiple downstreams to a single upstream is all about coordination of various MAC requirements and messaging among the multiple downstreams and shared upstream. The messaging functions are carried out by Upstream Media Access Control (UMAC) blocks 32 and 34, Downstream Media Access Control blocks (DMAC) 36, 38 and 40, switch 12, upstream receivers 42 and 44, and downstream transmitters 46, 48 and 50.

A first upstream line card 41 is comprised of upstream DOCSIS receiver 42 and a computer or state machine programmed or structured to execute UMAC process 32. A second upstream line card 43 is comprised of upstream DOCSIS receiver 44 and a computer or state machine programmed or structured to execute UMAC process 34. The upstream DOCSIS receivers can be any DOCSIS receiver, and are programmable. This means that the UMAC processes or some other computer can send burst profile and other configuration data to each receiver to configure it to properly tune to, and process any upstream DOCSIS burst type (IUC) to recover the data encoded therein.

A first downstream line card 37 is comprised of DOCSIS transmitter 46 and a computer or state machine programmed or structured to execute DMAC process 36. A second downstream line card 39 is comprised of DOCSIS transmitter 48 and a computer or state machine structured to execute DMAC process 38. Similarly for downstream line card 45. The DOCSIS transmitters can be any transmitters capable of sending DOCSIS downstream messages and data. In other embodiments, each linecard may have a mixed number of upstream receivers and/or downstream transmitters each of which can be grouped by the cooperation of the UMAC and DMAC processes with any other upstream receiver or other downstream transmitter on any linecard.

The UMAC and DMAC processes generate and exchange data via switch 12 so as do the necessary DOCSIS message transmission described in the flowcharts of FIGS. 9, 10 and 11. The UMAC and DMAC processes cooperate to control the transmitters and receivers to do necessary messaging and switch control signal generation. The upstream and downstream mappers are not shown but are controlled by the UMAC and DMAC processes in one embodiment. The messaging and switch control signal generation functions and other functions carried out by the UMAC and DMAC processes control the following operations of the CMTS:

1) create DOCSIS downstreams and upstreams and create group(s) thereof;
2) implement a flexible mapping of downstreams to optical nodes;
3) map one or more downstreams to a shared upstream receiver;
4) implement flexible mapping of optical nodes to upstream receivers;
5) carry out load balancing and communication parameter monitoring so as to create new upstreams and downstreams with channel parameters and burst profiles as needed to meet load balancing considerations or resolve problems some CMs may be having in communicating with the CMTS.

Although only two upstream receivers and 3 downstream transmitters are shown, the number of upstreams and downstreams can be less or more in each case. A single Cable Modem (CM) 52 is shown communicating with the CMTS via downstream data path 54 on the HFC and upstream data path 56 on the HFC.

The UMAC and DMAC processes are usually processes run in software in a control computer 60 of the CMTS. The control computer 60 is coupled to all of the CMTS circuits and is programmed to send data to configure transmitters and receivers to transmit and receive in accordance with downstream and upstream channel parameters established by the MAC processes and coordinate the activities of the switch 12, all the MAC processes and the receivers and transmitters to carry out the protocols described herein to decouple the upstreams and downstreams, etc.

The requirements to map multiple downstreams to a shared upstream or upstreams are as follows:

If the shared upstream is time division multiple access (TDMA) only and no DOCSIS 2.0 Synchronous Code Division Multiple Access (SCDMA) bursts are allowed, then the only requirements on the downstreams are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible. Thus, transmitters 46, 48 and 50 must each have a timestamp counter which is synchronized with the timestamp counters of the other transmitters which share the same upstream receiver (or synchronized to maintain a small, constant offset). Alternatively, all downstream transmitters in a group share the same timestamp counter 58. In this embodiment, there may be a separate timestamp counter for each group of downstream transmitter linecards which share the same upstream receiver linecard (all counting ticks of the CMTS master clock or a timestamp counter clock derived from the CMTS master clock), so if there are several groups of downstreams, each sharing an upstream, each group must have its own master timestamp counter which counts the master clock of the CMTS or some clock derived therefrom. In an alternative embodiment, all downstream linecards receive timestamp counts from a single timestamp counter which counts ticks of the CMTS master clock. Generally, all timestamps in the CMTS are synchronized. This is especially important for redundancy considerations so as to be able to replace a faulty receiver or transmitter or faulty linecard with a new receiver or transmitter or another linecard. If the timestamps are synchronized, the replacement will be smoother and easier to implement. The receiver linecards also have to receive timestamps that are synchronized to the downstream timestamps although the receiver timestamp can have a fixed offset to the transmitter timestamp. All these alternative embodiments are intended to be within the scope of the term "timestamp counter means" in the claims.

2) Each downstream transmitter must transmit downstream DOCSIS sync messages on the schedule restraints imposed by the DOCSIS specifications and which contain the timestamp counts. The CMs use these sync message timestamps to keep a local timestamp counter in each CM "synchronized" to the timestamp counter of the downstream transmitter to which the CM is tuned. Synchronized CM timestamp counters means a proper offset between the timestamp counts exists so that when a CM gets an upstream timeslot or minislot grant after requesting bandwidth, the CM can use its timestamp counter to determine the correct time to transmit so that its bursts arrive at the CMTS aligned in time with the boundaries of the assigned timeslots or minislots. CMs achieve synchronization by carrying out the ranging process specified in the DOCSIS specifications. It is the responsibility of the DMAC processes to generate these sync messages and send them to the downstream transmitters for transmission. The DMAC processes receive the timestamp counts from the timestamp counter 58 and incorporate them into the sync messages.

3) Each downstream transmitter must transmit a DOCSIS Upstream Channel Descriptor (UCD) message which defines the shared upstream in terms of the same parameters, with each UCD message containing the downstream ID of the downstream it is transmitted upon and the upstream ID of the shared upstream. Basically, the transmission characteristics of each logical channel, as defined by the corresponding UCD message, are separated into three portions: 1) channel parameters; 2) burst profile attributes, and 3) user unique parameters. In the appended claims, the term "burst parameters" is intended to include all those channel parameters, burst profile attributes and user unique parameters needed by the shared back end demodulator to properly process each burst. The logical channel parameters include: a) the symbol rate which can be any one of 6 different rates from 160 ksym/sec to 5.12 Msym/sec in octave steps; b) the center frequency; and c) the 1536-bit preamble superstring that is prepended to at least some bursts; and d) the SCDMA channel parameters. These characteristics are shared by all users on a given channel or subchannel (hereafter logical channel may be used to refer to either channel or sub-channel). The burst profile transmission characteristics of a logical channel, in the preferred embodiment, include: modulation (QPSK, 64 QAM, 128 QAM etc.), differential encoding on or off; Trellis or TCM encoding on or off; preamble length, preamble value offset; preamble type (QPSK 0 or QPSK1), RS error correction T value from 0 to 16 where 0 is no FEC bits to 16 for the maximum where the number of codeword parity bytes is 2×T, RS codeword length, scrambler seed, max burst length in minislots, guardtime from 5 to 255 symbols for TDMA channels and 1 symbol for SCDMA channels, last codeword length (fixed or shortened), scrambler on or off, byte interleaver depth, byte interleaver block size, SCDMA spreading on or off, codes per subframe, and SCDMA interleaver step size. User unique parameters may vary from user to user even when on the same channel and same burst type and include such things as: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient—2 real and 2 complex). The UMAC process for the shared upstream defines the parameters of the upstream and sends those parameters through switch 12 to the DMAC processes of each downstream which shares the upstream. Since the UMAC and DMAC processes are usually executed in software in computer 60, transfer of the data to the DMAC process for composition of the UCD messages may be by any other interprocess data transfer mechanism.

4) Each downstream transmitter must transmit a MAP message which tells the CMs when bursts may start and stop and defining when initial ranging contention intervals and periodic station maintenance (ranging by invitation) intervals exist on the shared upstream. CMs can only transmit upstream ranging bursts during the appropriate initial ranging contention interval or periodic station maintenance interval in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization as that term is defined above. The MAP messages must be coordinated so that they all define the same ranging contention interval in the upstream and there is no conflict between grants on the upstream between different CMs tuned to different downstreams. The UMAC process for the shared upstream determines when the initial ranging contention intervals will be, when the periodic station maintenance intervals will be for each CM and coordinates the grants for all CMs tuned to all downstreams to avoid conflicts. The data defining when the initial station maintenance intervals are is sent by the shared upstream UMAC to each DMAC process for a downstream that is linked to the shared upstream and is put into the MAP messages composed by that DMAC process for its downstream. The data developed by the shared upstream UMAC defining when the periodic station maintenance interval is for a particular CM coupled to a downstream is sent to just the DMAC that is generating the MAP messages for the downstream to which the CM is tuned and is incorporated into the MAP messages for the downstream to which the CM is tuned. While ranging and initial training as defined in the DOCSIS specification is completed, the UMAC process for the shared upstream receives the ranging bursts, and, with the aid of circuitry in the receiver coupled to the shared upstream, performs ranging measurements. These ranging measurements determine from the ranging burst of each CM time, frequency and power offsets for that particular CM. The UMAC process also reads upstream equalization coefficients developed by the shared upstream receiver from the ranging burst of the CM which equalize the channel. These offsets and equalization coefficients are sent by the UMAC process of the shared upstream to the DMAC process for the downstream to which the CM is tuned which sent the ranging burst. The DMAC process then includes the offsets and equalization coefficients in a DOCSIS ranging response message which it composes and sends to the CM. The CM then makes the requested offset adjustments to achieve synchronization and convolves the received equalization coefficients with the existing upstream equalization coefficients in its transmit filter to develop new upstream equalization coefficients which will equalize the upstream channel. During the ranging process or the subsequent DOCSIS registration process, the UMAC of the shared upstream does a discovery process to determine which CMs are tuned to which downstreams linked to a particular shared upstream. Each ranging burst includes the downstream ID of the downstream to which the CM which sent the ranging burst is tuned so the UMAC process can determine to which downstream each CM which sends a ranging burst is tuned.

5) The UMAC of each shared upstream builds routing tables for each downstream from information in the ranging bursts of each CM. Specifically, if the ranging bursts are used, the CMTS must be able to build the routing table for each downstream from the downstream ID information and the SID or something equivalent such as the MAC address which identifies the CM which sent each initial ranging burst so as to automatically determine which CMs are listening to each downstream. Initial ranging bursts contain an initialization Service ID (SID) if the CM is attempting to join the network, and contains a temporary SID if the CM is not yet registered and is changing upstreams as directed by a downloaded parameter file. The CMs initially join the best valid DOCSIS downstream for the CM type when the CM first powers up and then listens for UCD and MAP messages on that downstream. The CM then transmits an initial ranging burst during the initial ranging contention interval set in the MAP message for the upstream defined in the UCD message. This initial ranging burst contains the downstream ID and an initialization SID and a MAC address which identifies the CM. The CMTS controls which upstream and which downstream each CM is assigned to and can dynamically change the assignments by sending suitable downstream messages. Thus, the mapping of multiple downstreams to a shared upstream can be changed to add more downstreams or fewer downstreams for load balancing and to change the upstream, all by generating the appropriate channel change messages in the shared upstream UMAC and routing them to the appropriate DMACs for transmission to the CMs which are to change. The routing tables are then changed when a CM re-ranges or re-registers after a change in downstream or upstream.

If the upstream allows SCMDA bursts (the following requirements would also work if the upstream allows both SCMDA and TDMA bursts), the requirements are as follows.

In the claims, the downstreams which have these characteristics and which share an upstream are referred to as coordinated downstreams. All the description of operation of and cooperation between the UMAC and DMAC processes given above in the TDMA only embodiments apply equally here unless otherwise indicated.

1) Each downstream transmitter for a downstream that shares an upstream must have a timestamp counter or something equivalent which counts the same CMTS master clock. Fixed offsets in the timestamp counts are permissible, but no drift is permissible. Shared timestamp counter 58 which counts the CMTS master clock (typically part of the TS counter 58 or control computer 60) will serve this purpose. Alternatively, all downstream transmitters in a group share the same timestamp counter 58. In this embodiment, there may be a separate timestamp counter for each group of downstream transmitter linecards which share the same upstream receiver linecard (all counting ticks of the CMTS master clock or a timestamp counter clock derived from the CMTS master clock), so if there are several groups of downstreams, each sharing an upstream, each group must have its own master timestamp counter which counts the master clock of the CMTS or some clock derived therefrom. In an alternative embodiment, all downstream linecards receive timestamp counts from a single timestamp counter which counts ticks of the CMTS master clock. All these alternative embodiments are intended to be within the scope of the term "timestamp counter means" in the claims.

2) Each downstream transmitter may use the same frequency symbol clock and may use the same symbol rate but the symbol clocks on all downstreams must be locked in frequency and phase if they are the same frequency and must be at least locked in phase if the symbol clocks are at different frequencies using an M/N relationship where M and N are integers. When the upstream channel allows Synchronous Code Division Multiplexed (SCDMA) bursts, all the downstream channels may use different or the same symbol clock frequency, but the symbol clock frequency should be locked to the same master clock in the CMTS (generally 10.24 MHz). The symbol clocks can be locked to the common CMTS master clock via a phase locked loop using M/N ratios. The M/N ratio is different if the symbol rate for the upstream is different than the symbol rate for the downstream. The cable modem is able to synchronize its upstream symbol clock in this way using the recovered symbol clock of whatever downstream to which it is tuned. The recovered downstream symbol clock is used as a reference signal having frequency N to the PLL. The output of the PLL at frequency M is the upstream symbol clock. In other words, all transmitters in a group sharing an upstream must be locked to the same CMTS master clock (10.24 MHz in the preferred embodiment) even if the symbol clocks counting these master clock ticks are operating at different frequencies. This may be done by locking the symbol clocks in phase to the CMTS master clock using a PLL for downstreams which are sharing a single upstream. In FIG. 2, transmitters 46, 48 and 50 are shown as sharing the same master clock 62 and the timestamp counter 58 count ticks of this master clock 62. Transmitters in a group may share a symbol clock and timestamp counter in embodiments where the entire group has the same symbol clock frequency and same timestamp counts. This can also be the case for all downstream groups, i.e., all downstream groups share the same symbol clock and/or timestamp count. The number of downstream transmitters sharing any particular symbol clock or timestamp counter may vary as may the number of groups of downstream transmitters sharing a symbol clock or timestamp counter. A separate symbol clock and separate timestamp counter for each transmitter may be used each with a different frequency so long as the M/N ratio and synchronization relationship identified above is maintained so that all the symbol clocks and timestamp counters in all groups of downstreams are kept in at least phase synchronization with the master clock 62.

3) The CMs must each recover the downstream symbol clock of the downstream to which the CM is tuned, and must synchronize its upstream symbol clock to the downstream symbol clock using an M/N relationship between the frequency and phase of the downstream symbol clock versus the frequency and phase of the upstream symbol clock. M and N are integers, and the upstream symbol clock is set at a frequency suitable to generate spread spectrum bursts.

4) Each downstream transmitter must transmit sync messages or something equivalent which contain the timestamp counts which the CMs can use to keep a local timestamp counter in each CM "synchronized" to the timestamp counter of the downstream transmitter the CM is tuned to. Synchronized means a proper offset between the timestamp counts exists so that when a CM gets an upstream timeslot or minislot grant, it can use its timestamp counter to determine the correct time to transmit so that its bursts arrive at the CMTS aligned in time with the boundaries of the assigned timeslots or minislots. CMs achieve synchronization by carrying out the ranging process specified in the DOCSIS specifications. It is the responsibility of the DMAC processes to generate these sync messages and send them to the downstream transmitters for transmission. The DMAC processes receive the timestamp counts from the timestamp counter 58 and incorporate them into the sync messages.

5) Each downstream transmitter must transmit a UCD message or something equivalent which defines the shared upstream in terms of the same parameters, with each UCD message containing the downstream ID of the downstream it is transmitted upon and the upstream ID of the shared upstream. The UMAC process for the shared upstream defines the parameters of the upstream and sends those parameters through switch 12 to the DMAC processes of each downstream which shares the upstream. Since the UMAC and DMAC processes are usually executed in software in computer 60, transfer of the data to the DMAC process for composition of the UCD messages may be by any other interprocess data transfer mechanism.

6) Each downstream transmitter must transmit a MAP message which tells the CMs when initial ranging contention intervals and periodic station maintenance (ranging by invitation) intervals exist on the shared upstream. CMs can only transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization as that term is defined above. The MAP messages must be coordinated so that they all define the same ranging contention interval in the upstream and there is no conflict between grants on the upstream between different CMs tuned to different downstreams. The UMAC process for the shared upstream determines when the initial ranging contention intervals will be, when the periodic station maintenance intervals will be for each CM and coordinates the grants for all CMs tuned to all downstreams to avoid conflicts. The data defining when the initial station maintenance intervals are is sent by the shared upstream UMAC to each DMAC process for a downstream that is linked to the shared upstream and is put into the MAP messages composed by that DMAC process for its downstream. The data developed by the shared upstream UMAC defining when the periodic station maintenance interval is for a particular CM coupled to a downstream is sent to just the DMAC that is generating the MAP messages for the downstream to which the CM is tuned and is incorporated into the MAP messages for the downstream to which the CM is tuned. While ranging and initial training as defined in the DOCSIS specification is completed, the UMAC process for the shared upstream receives the ranging bursts, and, with the aid of circuitry in the receiver coupled to the shared upstream, performs ranging measurements. These ranging measurements determine from the ranging burst of each CM time, frequency and power offsets for that particular CM. The UMAC process also reads upstream equalization coefficients developed by the shared upstream receiver from the ranging burst of the CM which equalize the channel. These offsets and equalization coefficients are sent by the UMAC process of the shared upstream to the DMAC process for the downstream to which the CM is tuned which sent the ranging burst. The DMAC process then includes the offsets and equalization coefficients in a DOCSIS ranging response message which it composes and sends to the CM. The CM then makes the requested offset adjustments to achieve synchronization and convolves the received equalization coefficients with the existing upstream equalization coefficients in its transmit filter to develop new upstream equalization coefficients which will equalize the upstream channel. During the ranging process or the subsequent DOCSIS registration process, the UMAC of the shared upstream does a discovery process to determine which CMs are tuned to which downstreams linked to a particular shared upstream. Each ranging burst includes the downstream ID of the downstream to which the CM which sent the ranging burst is tuned so the UMAC process can determine to which downstream each CM which sends a ranging burst is tuned.

7) The UMAC process of the shared upstream builds routing tables for each downstream from information in the ranging bursts or registration messages of each CM. Specifically, the UMAC process of the shared upstream must be able to build the routing table for each downstream from the downstream ID information in the ranging bursts and the SID or something equivalent such as the MAC address which identifies the CM which sent each initial ranging burst. The routing table allows the UMAC process to determine which CMs are tuned to each downstream so that routing of periodic station maintenance minislot specifications and upstream bandwidth grants for specific CMs may be routed to the DMAC process for the downstream to which the CM is tuned. Initial ranging bursts contain an initialization Service ID (SID) if the CM is attempting to join the network, and contains a temporary SID if the CM is not yet registered and is changing upstreams as directed by a downloaded parameter file. The CMs initially join the best valid DOCSIS downstream for the CM type when the CM first powers up and then listens for UCD and MAP messages on that downstream which define the parameters of the linked upstream and times when certain types of bursts may be transmitted. The CM then transmits an initial ranging burst during the initial ranging contention interval set in the MAP message for the upstream defined in the UCD message. This initial ranging burst contains the downstream ID and an initialization SID and a MAC address which identifies the CM. The CMTS controls which upstream and which downstream each CM is assigned to and can dynamically change the assignments by sending suitable downstream messages. Thus, the mapping of multiple downstreams to a shared upstream can be changed to add more downstreams or fewer downstreams for load balancing and to change the upstream, all by generating the appropriate channel change messages in the shared upstream UMAC and routing them to the appropriate DMACs for transmission to the CMs which are to change. The routing tables are then changed when a CM re-ranges or re-registers after a change in downstream or upstream or subsequently during data transmission since every payload data burst also includes the downstream ID.

The CMTS uses an automatic discovery process to determine the CMs on each downstream. This is done by interrupting the downstreams when the new CMTS is installed. This causes each CM to search for a valid downstream and latch onto the first one they find. The new CMTS then establishes multiple downstreams all mapped to the same upstream. On each downstream, a MAP message (coordinated to define the same ranging interval) is sent which tells the CMs listening to that downstream when an initial ranging contention window is on the upstream. Each downstream transmitter then also sends a UCD message which defines the shared upstream using the same parameters and contains the downstream ID on which it was sent and the shared upstream ID. The CMs respond to the MAP message by sending an initial ranging burst message. This message has the downstream ID the CM is listening to from the UCD message and a MAC address and a SID which identifies the CM. The CMTS uses the SID and downstream ID in each upstream ranging burst to build a routing table which identifies which CMs are listening to each downstream.

Flexible Termination of Optical Nodes with Upstream Receivers

Figure 3:
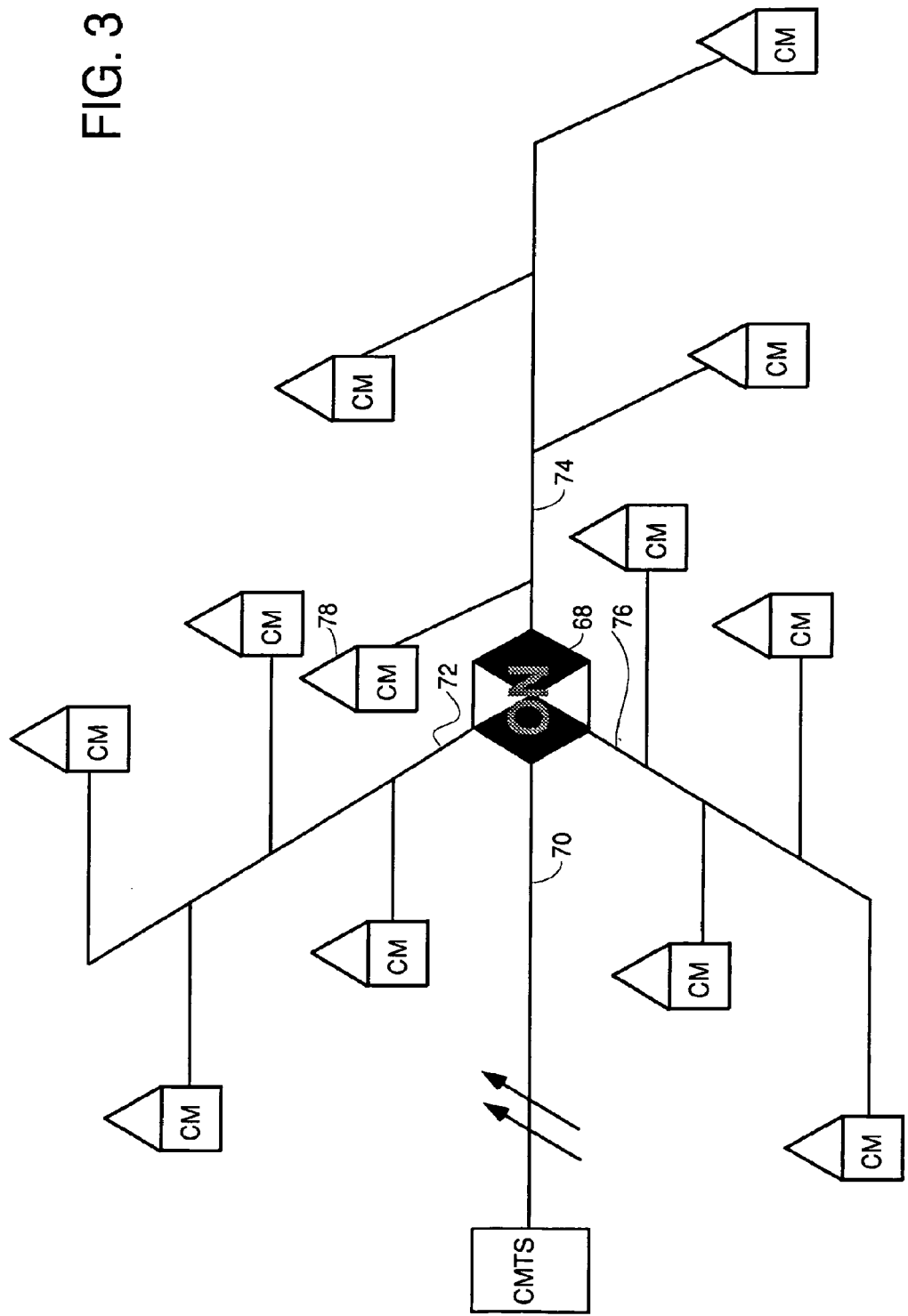
FIG. 3 is a diagram of a typical HFC system with an optical node feeding a plurality of coaxial cables coupled to cable modems.

FIG. 3 is a diagram of a typical HFC system with an optical node feeding a plurality of coaxial cables coupled to cable modems. Optical node 68 sends one or more upstream channels and receives one or more downstream channels via optical fiber 70. The optical node distributes one or more downstream channels on a plurality of coaxial cables 72, 74 and 76 to a plurality of cable modems (CMs) of which CM 78 is typical. The optical node also receives one or more upstream channels from the CMs on one or more different frequencies and converts them to light signals for upstream transmission on fiber 70 to the CMTS.

Figure 4:
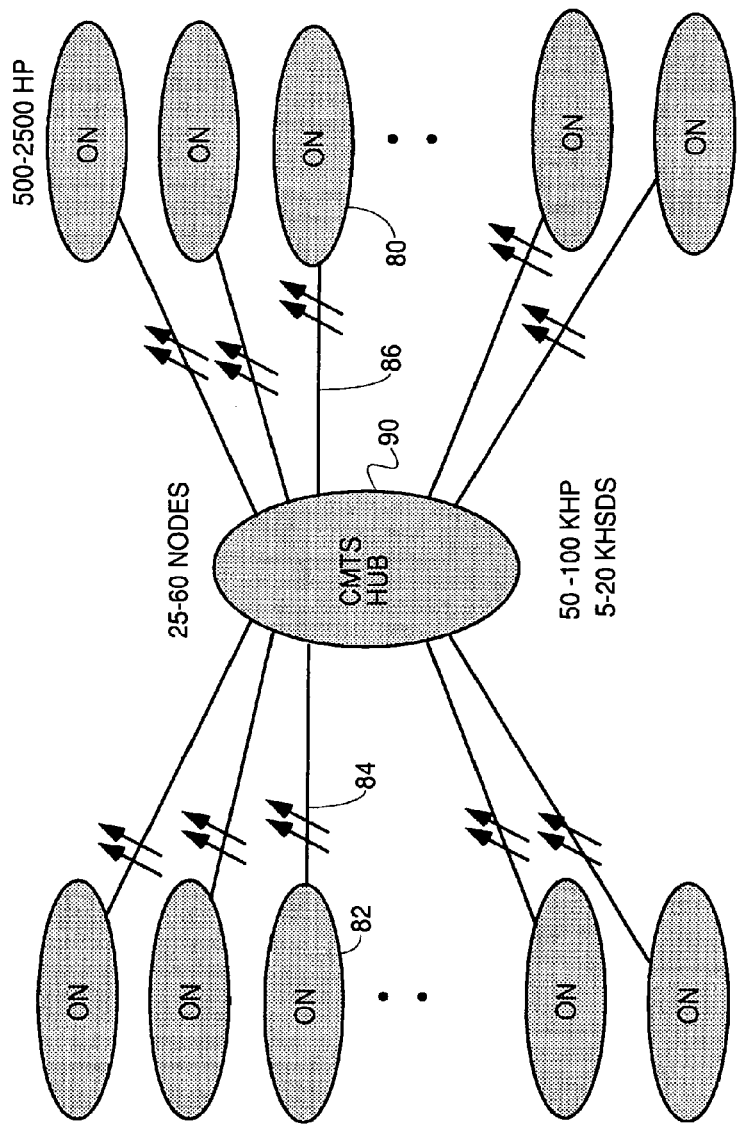
FIG. 4 is a diagram of a typical HFC network star topology where a CMTS terminate multiple optical nodes.

FIG. 4 is a diagram of a typical HFC network star topology where a CMTS terminate multiple optical nodes. Optical nodes 80 and 82 are typical of a plurality of optical nodes, all of which send and receive data via a plurality of optical fibers such as 84 and 86. A CMTS 90 has a plurality of transmitters and receivers (not shown) which are coupled to the optical fibers. Each optical node must be terminated in at least one upstream receiver and receive one or more downstreams from one or more downstream transmitters. Multiple optical nodes can be terminated in the same upstream receiver by summing the signals from the different optical nodes.

Conventional DOCSIS compliant CMTS allows sharing of a downstream by multiple upstreams. What is believed to be new in the invention is provision of the ability to add one or more upstreams as needed and dynamically change the termination of optical nodes to new upstream receivers as well as flexible mapping of downstreams to optical nodes and sharing of an upstream between a flexible number of downstreams. In some embodiments this dynamic mapping of multiple optical nodes to one or more receivers can be done by summing of multiple optical nodes to one receiver, or by establishing different logical upstream channels each handled by a different receiver, each mapped to one or more optical nodes. Summing of optical node signals aggregates noise, so a way of switching so as to combine signals from different optical nodes without noise aggregation is also disclosed herein. In the preferred embodiment, a switching protocol for the radio frequency signals from the optical nodes is used. This switching protocol does not aggregate noise. Changes to the switch mapping for the switching protocol is implemented when new upstream receivers are added or new upstream channels with different IDs are added. Further, the new CMTS structure allows mapping of one or more downstreams to a shared upstream for each upstream added and dynamic changing of the mapping between downstreams and upstreams as conditions dictate or as a cable operator desires. The downstream transmitters in each group can be located on different linecards.

Flexible Mapper Apparatus

Figures 5, 6:
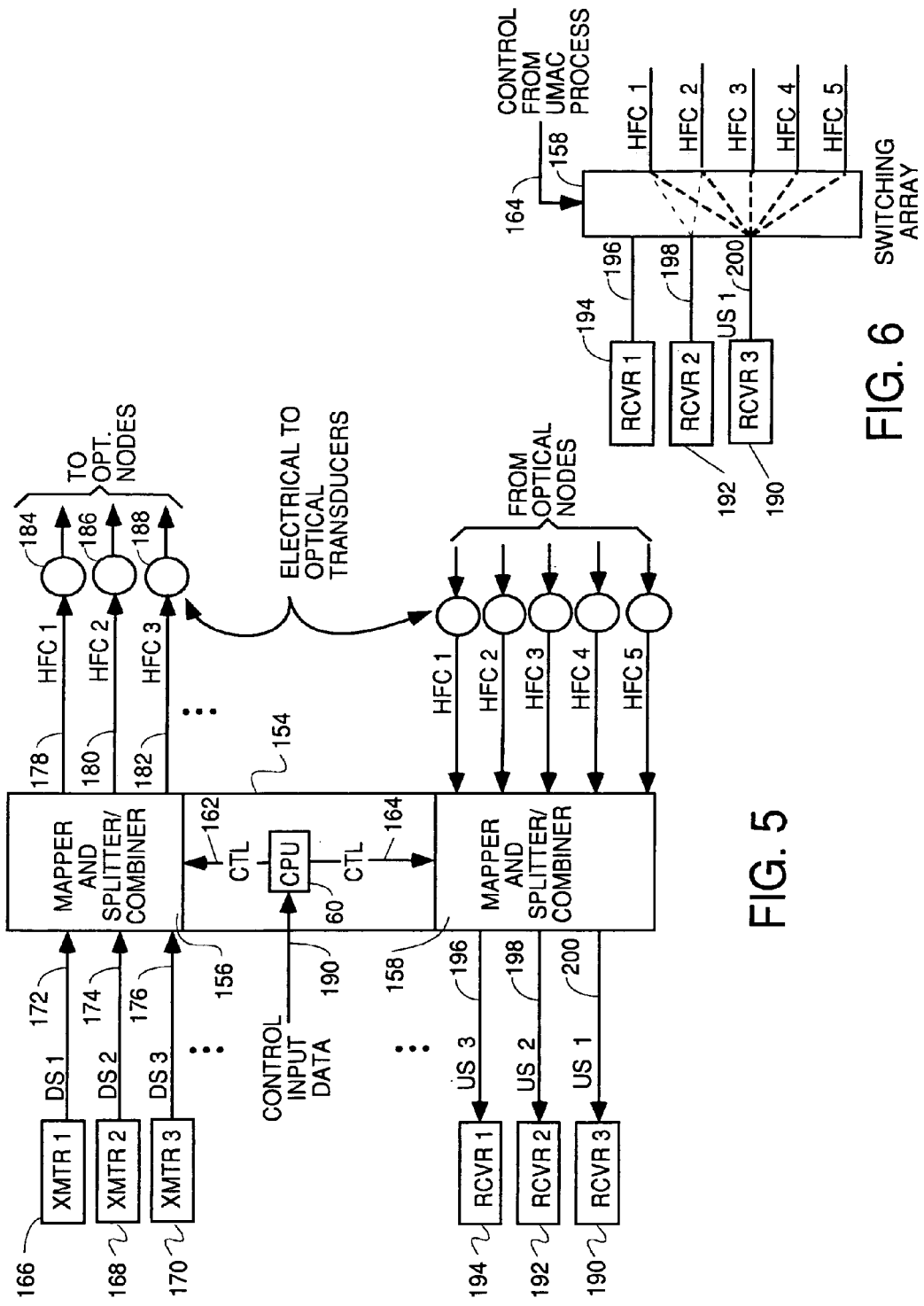
FIG. 5 a block diagram of a flexible mapper which can be used to flexibly map multiple downstream transmitters of a CMTS to multiple optical nodes and to flexibly map multiple optical nodes to termination in one or more upstream receivers.
FIG. 6 is a diagram of one embodiment for the upstream mapper and splitter/combiner using a simple switching array that combines upstream RF carriers by summing the signals and superposition.

FIG. 5 a block diagram of a flexible mapper which can be used to flexibly map multiple downstream transmitters of a CMTS to multiple optical nodes and to flexibly map multiple optical nodes to termination in one or more upstream receivers. A flexible mapper 154 is comprised, in part, of a downstream mapper and splitter/combiner 156 coupled to a plurality of CMTS downstream transmitters 166, 168, 170, etc. The flexible mapper is also comprised of an upstream mapper and splitter/combiner 158 which is coupled to a plurality of optical nodes and a plurality of CMTS upstream receivers 194, 192 and 190, etc. The mappers and splitter/combiner circuitry is controlled by computer or other control logic 160. Computer 160 can be the same computer as computer 60 in FIG. 2 or a separate computer dedicated to controlling the flexible upstream and downstream mappings.

The function of the computer or control logic 160 is to receive information from the upstream and downstream media access control process or processes or some other source such as a control panel operated by the cable operator and suitably control the mapper 154 to implement the upstream and downstream mappings. The downstream mapping information received is about which downstreams are to be transmitted on which HFC systems, and which downstreams are to be mapped to which upstreams. The upstream information received is about which optical nodes are to be terminated in which upstream receivers. The computer and control logic then generates suitable control signals on line 162 and 164 to cause the desired mapping in the mappers 156 and 158.

In summary, the function of the DS mapper 156 is to flexibly couple M downstreams to N optical nodes and have the mapping controlled electronically so that it can be easily changed. Whatever switching, splitting and/or combining of downstream DOCSIS or other data streams that is necessary to accomplish this M to N mapping function will be performed automatically. Thus, for example if three downstreams on different frequencies are to be combined and then coupled to each of two optical nodes, the three downstream RF frequencies will be combined by switching them all to one superposition summation node at the input of a splitter with two outputs and then switching the two outputs of the splitter to couple them to the appropriate lines coupled to the optical nodes to which the downstreams are to be coupled. Similarly, any downstream can be split and coupled to any number of optical nodes simply by supplying the data which defines the desired number of splits and which downstreams are to be coupled to which optical nodes. In alternative embodiments, the transmitter connection to the external RF cable can be done manually.

In summary, the function of the US mapper is to take shared upstreams from any number of designated optical nodes which are all the same upstream and mapped to a plurality of downstreams and combine them into one shared upstream for input to a single shared CMTS receiver. This can be done simultaneously for multiple CMTS receivers.

An upstream and downstream manager process in the media access control process can monitor traffic loads and reconfigure the system as needed by adding more downstreams, adding more upstreams mapped to one or more downstreams, combining more shared upstreams to one receiver, or splitting upstreams which have become overloaded to termination by two or more upstream receivers, all as needed to balance the upstream and downstream loads or provide preferences to certain customers. In addition, the upstream and downstream manager, in some embodiments, monitors the upstream receivers and downstream transmitters for failure, and, upon detecting a failure, switches a new receiver or transmitter into the mix as needed to take over the work formerly being done by the failed unit.

As a specific example of how the mappers work, consider the following. The various downstream transmitters 166, 168 and 170 generate separate "coordinated downstreams" on lines 172, 174 and 176, all of which are coupled to the downstream mapper and splitter/combiner 156 (hereafter the DS mapper). Lines 178, 180 and 182 represent electrical lines which carry signals which are converted to optical signals by transducers and coupled by fibers (not shown) to different optical nodes of one or more HFC systems. In alternative embodiments, lines 178, 180 and 182 may be fiber optic data paths to optical nodes 184, 186 and 188, respectively.

The function of DS mapper is to couple certain downstreams to designated optical nodes according to a mapping specified in the control signals on line 162, and to allow easy reconfiguration of the mapping of which downstreams are coupled to which optical nodes by simply changing the control signals on data path 162 without the need to rewire the CMTS. This is done by splitting and/or combining and or switch multiplexing the input radio frequency signals on lines 172, 174 and 176 (DS1, DS2 and DS3, respectively) as needed to connect each RF downstream carrier to the right ones of cables or fibers 178, 180 and 182. Suppose, for example, DS1, DS2 and DS3 are all to share the same upstream receiver 190 via US 1 on data path 200 to receiver 190, but DS1 and DS2 are to be coupled to HFC 1 (data path 178) and DS3 is to be coupled to HFC 3 (data path 182). In this case, DS mapper 156 takes DS1 and DS2 and sums them by superposition at a node coupled to cable or fiber 178. DS1 and DS2 carriers are on different frequencies, so the composite signal comprised of two RF carriers at different frequencies, each bearing the data of a different DOCSIS downstream, is simply coupled from the summing node onto HFC 1. DS3 is simply switched through a multiplexer to HFC 3. If DS3 becomes overloaded with traffic later, another downstream can be added to share the load, and the control signals to the upstream mapper can be changed to connect the new downstream to HFC 2 or HFC 3 if HFC 3 is not overloaded also. Suppose also that a DS4 (not shown) is to be split and transmitted on HFC 3, 4 and 5 (HFC 4 and 5 not shown). In this case, DS mapper 156 switches the RF carrier bearing the DOCSIS downstream data of DS4 to the input of an internal splitter which has four outputs. The four RF outputs of the splitter are coupled, possibly through multiplexers, to the cables or fibers of HFC 3, HFC 4 and HFC 5. All this can be controlled simply by supplying the appropriate control input data on line 90 to the computer or control logic 160. Whatever is supplying the control data on line 190 (usually the DMAC processes) needs to make sure that all the downstreams which share the same upstream are coordinated as that term is defined above.

The upstream mapper and splitter/combiner 158 (hereafter the US mapper) is coupled to all the HFC systems HFC1 through HFC5 at its upstream input side and is coupled to CMTS receivers 190, 192 and 194 via upstream lines 196, 198 and 200, respectively. Although the upstream mapper is shown working in the analog domain before the analog-to-digital conversion that happens in the receiver, the upstream mapping can also occur in the digital domain after the A/D conversion in alternative embodiments. The function of the upstream mapper and splitter/combiner is to provide for flexibility in termination of optical nodes by upstream receivers and easy, electronic switching of the mapping of optical nodes to upstream receivers without the need to rewire the CMTS. The flexible electronically controlled mapping allows multiple optical nodes to be terminated by the same optical receiver, when subscriber penetration is low. Then, as the number of subscribers grows and the traffic volume becomes too much for one upstream receiver to handle, the mapping can be changed to add another receiver and switch some of the optical nodes originally terminated by the first upstream receiver so as to be terminated by the second upstream receiver. Each receiver is considered to be one upstream regardless of how many optical nodes it terminates. Each upstream can be shared by multiple downstreams by the protocol defined above, and the mapping of multiple downstreams to one upstream can be flexibly, electronically changed as new upstreams are added.

In the hypothetical above, suppose DS1 through DS4 are all to share the upstream processed by CMTS receiver 190. In this situation, the upstream RF carriers generated by the CMs which are tuned to DS1 through DS4 are travelling upstream to the CMTS via HFC1 through HFC5 from five different optical nodes. In this situation, the US mapper 158 must combine all the electrical signals on HFC1 through HFC5 and output the result to receiver 190 as shared US1 on line 200.

This combining of the RF carriers on HFC 1 through HFC 5 onto input 200 for receiver 190 can be done in several different ways. They will be described in the separate sections below.

Upstream Combination in TDMA, SCDMA and Mixed Systems by Superposition

FIG. 6 is a diagram of one embodiment for the upstream mapper and splitter/combiner 158 using a simple switching array that combines upstream RF carriers by summing the signals and superposition. In this embodiment, a switching array 158 is used in the form of a crossbar switch or other switching array that can couple any number of selected inputs to any number of selected outputs. The switching array's connections are controlled by control signals on line 164 from the UMAC process wherever that process is implemented or by an upstream mapper control process in the physical layer receiver. The signals on line 164 control which of the five inputs from the optical nodes (HFC 1 through HFC 5) are coupled to which of the outputs 200, 198 and 196 coupled to the inputs of upstream receivers 190, 192 and 194. Each of these receivers represents one DOCSIS upstream which can be shared by one or more DOCSIS downstreams. In the example shown, low enough subscriber penetration is assumed as to allow the five optical nodes coupled to HFC 1 through HFC 5 to be terminated in a single upstream receiver 190. In this case, switching array 158 is ordered by signals on control path 164 to continuously connect the HFC 1 through HFC 5 inputs to the input 200 of the shared US1 receiver 190. This is represented by the dashed lines inside the switching array connecting these five inputs to the output 200.

To avoid collisions between bursts, the UMAC process for the shared upstream US1 processed by receiver 190 must schedule bursts on the upstream carriers on HFC 1 through HFC 5 properly to separate them in time on the HFC 1 through HFC 5 inputs for TDMA bursts. SCDMA bursts on the different HFC 1 through HFC 5 inputs do not have to be separated in time. However, the shared US1 upstream UMAC process does have to coordinate the SCDMA burst grants so as to have non overlapping spreading code assignments if they overlap in time, or separate the SCDMA bursts on the different HFC 1 through HFC 5 inputs so as to be separated in time. The TDMA and S-CDMA logical channels are separated in time.

FIG. 7 is a diagram of how the UMAC schedules non overlapping TDMA or SCDMA or both TDMA and SCDMA bursts for the upstream transmissions of CMs tuned to one of the multiple downstreams which shares an upstream, with the CMs being coupled to four different optical nodes. Because all the HFC 1 through HFC 5 mediums are continuously connected to the input of receiver 190 in switching array 158, the resulting input to the receiver looks like FIG. 8.

Switching array 158 is preferred for the flexibility it provides in mapping optical nodes to receivers. When the traffic load rises to the point that the receiver 190 cannot process all the bursts, another upstream receiver can be easily added and the switching connections re-mapped to divert the bursts from one or more optical nodes to the second receiver. This is illustrated in FIG. 6 by the dotted lines that couple HFC 1 and HFC 2 to input 198 of receiver 192. This means that the control signal to the switching array are changed such that the switching array breaks the connections between HFC 1 and HFC 2 to input 200 of receiver 190 and makes new connections between HFC 1 and HFC 2 to input 198 of receiver 192. This is done simply by changing the control signals on line 164.

If desired, the mapping of downstreams to upstreams can also be altered when a new upstream receiver is added. How this is done is described in FIG. 9.

The switching matrix 158 with continuous connections aggregates the noise on the various HFC systems which are coupled together to the input of the receiver. In some applications this is permissible. For example, because of the coding gain in the upstream from SCDMA burst traffic, noise aggregation in a system comprised of all SCDMA CMs operating in SCDMA mode might be permissible, especially if all the HFC systems are low noise systems. In some systems there may be some noisy HFC branches and/or a mixed bag of CMs some of which are DOCSIS 1.x TDMA where noise aggregation is a problem. One way to handle this problem even in the presence of noise aggregation is to use the CMTS to monitor the quality of upstream burst reception and create more robust upstream channels and assign CMs that are having problems to these lower throughput, more robust upstream channels. More robust upstream channels mean upstream channels which have lower throughput from lower symbol rate, less complex modulation constellation, and/or higher overhead devoted to forward error correction, etc.

Process to Establish Mapping and Change the Mapping for Load Balancing in the Presence of Noise Aggregation The process the CMTS UMAC and DMAC processes carry out to establish an initial mapping and change it is illustrated in FIG. 9. Step 220 represents the process of the CMTS DMAC processes establishing one or more DOCSIS downstreams and the types of upstreams needed for the CMs in the system. For an all DOCSIS 1.x system, that could be a single downstream and a DOCSIS 1.0 upstream for every optical node. For a system with a mixed bag of DOCSIS 1.0, DOCSIS 1.1 and DOCSIS 2.0 modems, step 220 represents creating, for example, at least one downstream for every optical node and a DOCSIS 1.0 and a DOCSIS 2.0 upstream for every optical node that is coupled to both types of CMs. The DMAC processes create the needed downstreams and upstreams in accordance with any process such as by consulting configuration data, interacting with the cable operator, etc. Since the cable operator knows what types of CMs are installed in the system, configuration data can be set up which controls which DMACs establish which type of upstreams are created for each optical node to serve the types of CMs coupled to each optical node.

In step 222, the CMTS downstream transmitters 46 and 48, etc. in FIG. 2 synchronize their timestamp counters to the CMTS master timestamp counter. Downstream transmitters for downstream sharing an upstream upon which SCDMA bursts are allowed frequency synchronize their symbol clocks to the (using M/N relationship) CMTS master clock for the group of downstreams sharing the upstream. The downstreams in each group may also use the same CMTS timestamp counter and/or the same CMTS symbol clock in some embodiments. The CMTS then maps particular downstreams to particular optical nodes and generates suitable control signals to the downstream mapper 156 in FIG. 5 to couple the appropriate downstream transmitter outputs to the appropriate optical nodes in accordance with the mapping. The downstream mapper may be a switch, splitter, combiner or any combination of switches, multiplexer, splitters and combiners necessary to carry out the mapping.

The downstream transmitters then start transmitting the one or more DOCSIS downstreams determined to be required in step 220, and start transmitting SYNC messages in each downstream with timestamp counter samples therein in step 224.

When the CMs coupled to these optical nodes power up, they look for and lock onto a DOCSIS downstream that is most compatible with their modem type and start looking for SYNC, UCD and MAP messages. The CMs receive the SYNC messages and use them to synchronize their local timestamp counters and upstream minislot counters to the timestamp counter to which all the downstream transmitters of downstreams which are sharing an upstream are synchronized. Each CM recovers the CMTS symbol clock from the received downstream signals. The CMs recover the downstream symbol clock and generate an upstream symbol clock having a synchronized M/N frequency relationship to the downstream symbol clock where M and N are integers. This is needed because the symbol clock needed for SCDMA transmission from all CMs in a group of downstreams that share an upstream must be precisely synchronized with the CMTS master clock. In the preferred embodiment, all cable modems (CMs) synchronize their timestamp counters to the timestamp count of the CMTS timestamp counter using the sync message data. In the preferred embodiment, all the CMs tuned to a downstream in a group of downstreams sharing an upstream use the same upstream symbol clock frequency obtained from the CMTS master clock. This is necessary when the upstream allows SCDMA bursts because of the precise upstream synchronization used in SCDMA, and it is desirable for time division multiplexed upstreams also because a shared TDMA upstream also requires fairly precise upstream synchronization to the timeslots although guardbands between timeslots allow a little tolerance.

In step 226, the UMAC for an initial upstream receiver decides which downstreams are to share the upstream receiver, and decides on the channel parameters and burst profile parameters for the shared upstream. The decision as to which downstreams will initially share the same upstream receiver can be made in any way such as by configuration data, initial traffic loading, customer preferences or subscriptions. The UMAC then sends data defining the channel parameters and burst profile for the shared upstream to the DMAC process for each downstream which is to share the upstream via the switch fabric 12. The UMAC for the shared upstream then generates switch control signals for upstream mapper switch 158 in FIG. 6 to couple the HFC systems and optical nodes for all the downstreams which are to share the upstream receiver so as to couple all these HFC systems to the RF input of the receiver to be shared. In the example of FIG. 6, HFC 1 through HFC 5 are all coupled to the input of shared upstream receiver 190. These connections will remain until remapping of the optical nodes to terminate them in one or more additional receivers occurs.

In step 228, the DMAC process for every downstream which is to share the upstream uses the information received from the UMAC process of the shared upstream which defines the channel parameters and burst profile of the shared upstream to generate and transmit downstream UCD messages which define the upstream. These UCD messages are received by the CMs and are used to set the parameters of their upstream transmitters to transmit on the shared upstream with the appropriate burst profile.

In step 230, the CMTS UMAC process for the shared upstream determines an initial station maintenance contention interval during which all CMs that need to do initial training may send their ranging bursts. This MAP data is sent through the CMTS switch 12 or by any other interprocess data transfer mechanism to all the DMAC processes for downstreams which will share the upstream (hereafter referred to as the DMAC group).

In step 232, the DMAC group processes the data into downstream DOCSIS MAP messages and transmits the MAP messages downstream. The MAP messages are coordinated on all downstreams that share the same upstream (hereafter the downstream group) such that the same initial ranging contention interval is defined for all CMs tuned to downstreams in the downstream group. In an alternative embodiment, the DMACs may send messages which schedule individual ranging contention intervals for each upstream channel meaning all downstreams that share that particular upstream must send their initial ranging bursts during the ranging contention interval scheduled for the upstream they share.

The CMs tuned to the downstreams in the downstream group receive the MAP messages and transmit their initial ranging bursts. Each initial ranging burst contains the downstream ID of the downstream to which the CM is tuned, a SID for the CM and the MAC address of the CM.

In step 234, the UMAC of shared upstream and shared receiver receives upstream ranging bursts from CMs tuned to downstreams in the downstream group and processes them in conventional DOCSIS ranging to make offset measurements and develop upstream equalization coefficients and sends ranging response message to each CM from which a ranging burst was successfully received. During the initial ranging bursts (IUC3) and during requests for data (IUC1), the upstream mapper switch will be controlled to sum all cables. This will aggregate noise, but initial ranging bursts are usually QPSK modulated so they have greater noise tolerance.

In step 236, the UMAC of the shared upstream does discovery of which CMs are tuned to each downstream in the downstream group using the downstream IDs, SIDs and/or MAC addresses included in the initial ranging bursts and doing one of the discovery processes described below. The UMAC builds a routing table from this information. The routing table defines which CM is associated with each optical node. This also tells the CMTS and its switch which input upon which each non contention burst identified in a MAP message will be arriving so that the switch can be properly operated to select that burst for coupling to a receiver.

Discovery of CM-Optical Node Mappings

Before finishing the discussion of FIG. 9, a brief discussion of the CM to optical node mapping discovery process is in order. The discovery of which CMs are coupled to which optical nodes is done in any one of several different ways. The purpose of the discovery process is to develop a mapping table that associates particular cable modems with the optical node and/or input to the switch to which the CM is coupled. This mapping table and MAP schedule data is then used in non contention intervals to receive non contention bursts and operate said switch so as to prevent noise aggregation. Three discovery methods are disclosed in FIGS. 27, 28, 29A, and 29B. Each of these methods is repeated until a mapping table entry for every cable modem which has registered has been completed.

Figure 27:
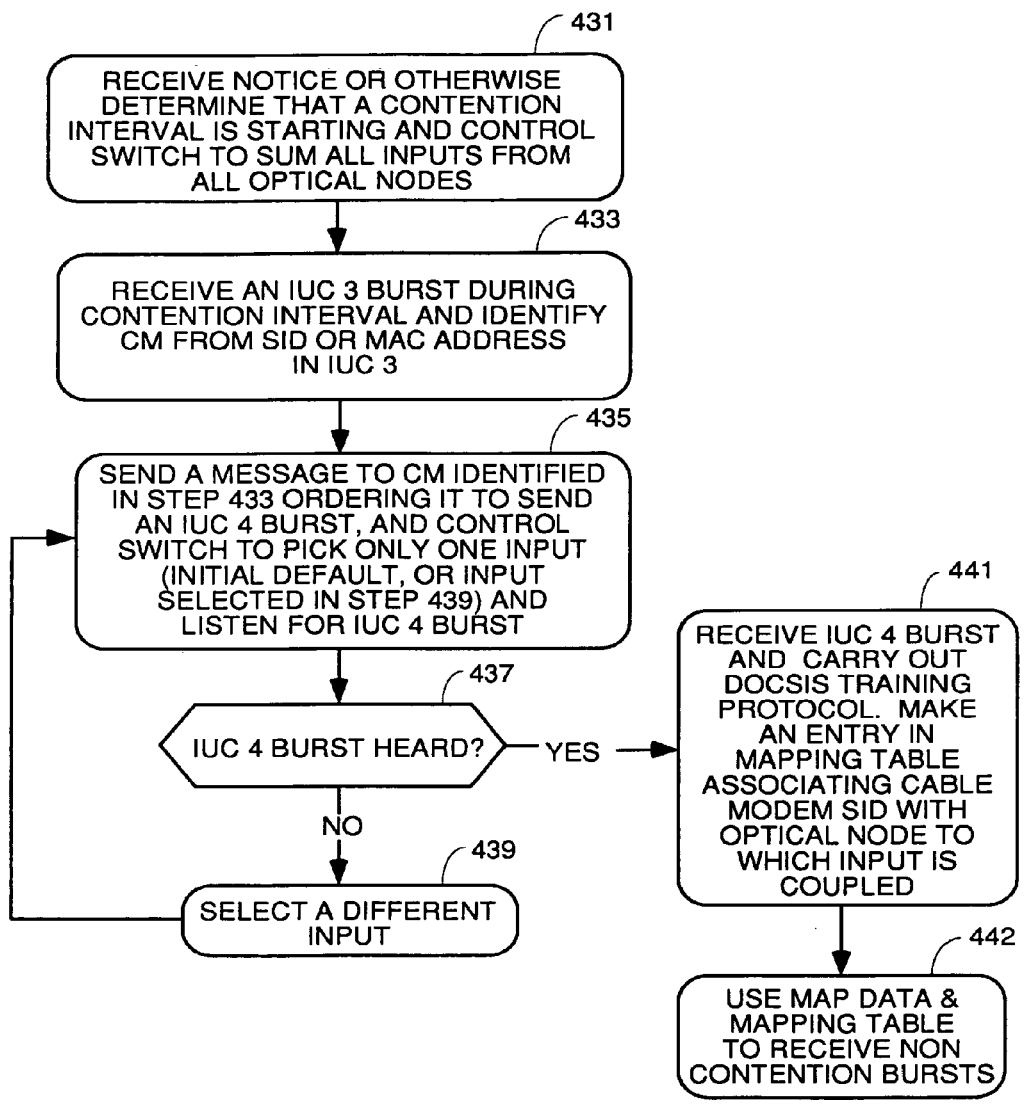
FIG. 27 is a flowchart of the trial and error discovery process to determine which cable modems are coupled to which optical nodes to develop a mapping table that associates particular cable modems with the inputs and/or optical nodes to which they are coupled and using the mapping table and MAP message data to receive non contention bursts.

1) Trial and error by trying different cable nodes to receive IUC 4 bursts: This discovery process is illustrated in FIG. 27. In this method, all the inputs are summed during contention intervals (step 431), and when an IUC 3 burst is received, the CM can be identified from the SID and/or MAC address in the burst (step 433). The CMTS then orders the CM to send an IUC 4 burst, and then operates the switch to pick an input to listen for the IUC 4 burst (step 435). The CMTS then listens for the IUC 4 burst (step 437). If the IUC 4 burst is not heard on the selected input, the CMTS orders the CM to send another IUC 4 burst and picks another input to listen (steps 439 and 435). This process continues until the input coupled to the CM sending the IUC 4 burst is found. Once the input is found, the PHY receiver receives the IUC 4 burst and carries out DOCSIS training protocols normally. Then an entry in a mapping table is made to associate the SID or MAC address of the CM with the optical node or input to the switch to which the CM is coupled (step 441). In step 442, the schedule data in the DOCSIS MAP messages and the mapping table data is used to control the switch to receive non contention bursts without noise aggregation by selecting each input upon which a burst is scheduled to arrive for coupling to the PHY receiver.

Figure 28:
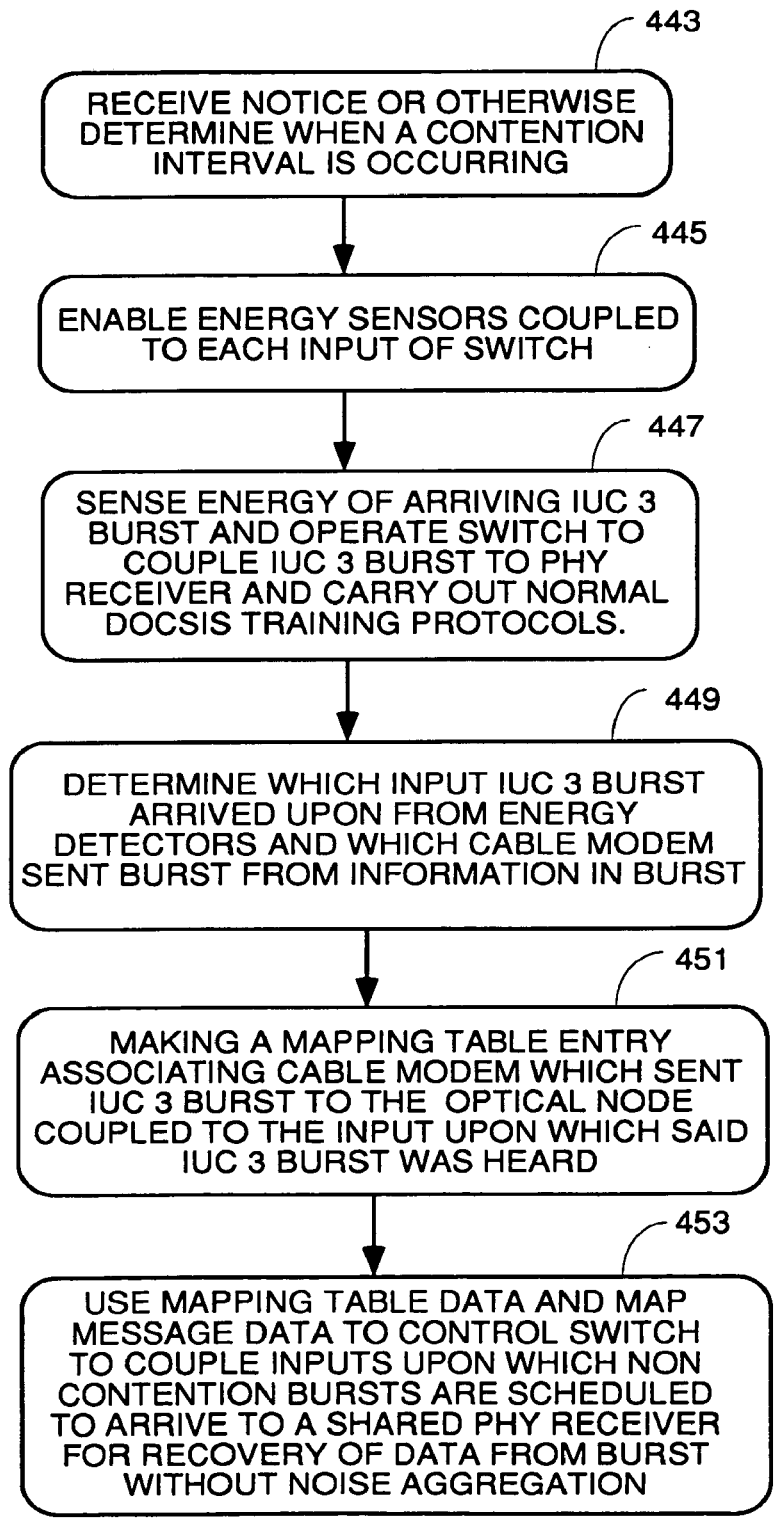
FIG. 28 is a flowchart of an energy sensing discovery process to determine which cable modems are coupled to which optical nodes to develop a mapping table that associates particular cable modems with the inputs and/or optical nodes to which they are coupled and using the mapping table and MAP message data to receive non contention bursts.
Figure 29A:
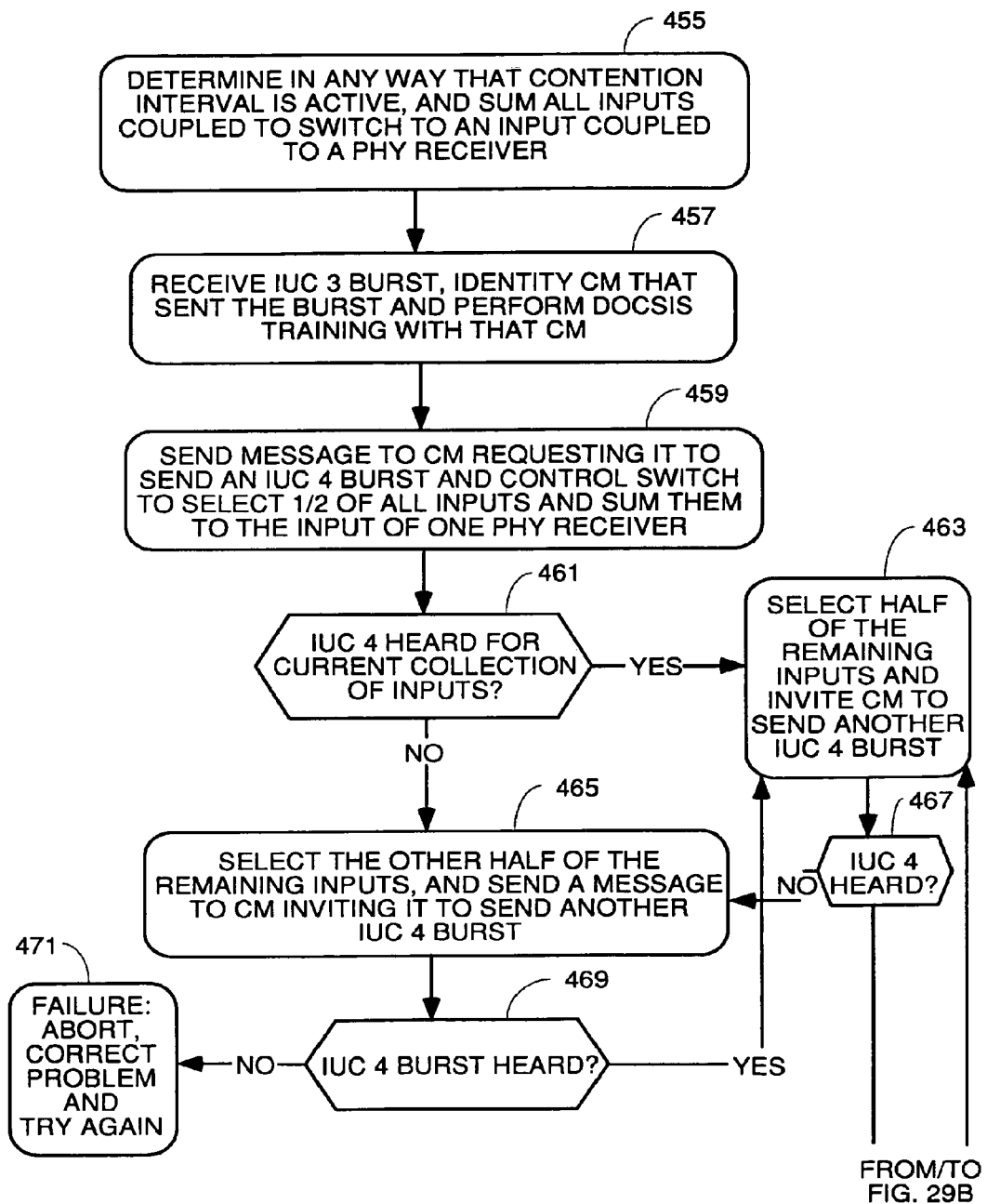
FIG. 29, comprised of FIG. 29A and 29B, is a flowchart of a successive approximation method of discovery using IUC 3 and IUC 4 contention interval bursts to develop a mapping table that associates particular cable modems with the inputs and/or optical nodes to which they are coupled and using the mapping table and MAP message data to receive non contention bursts.
Figure 29B:
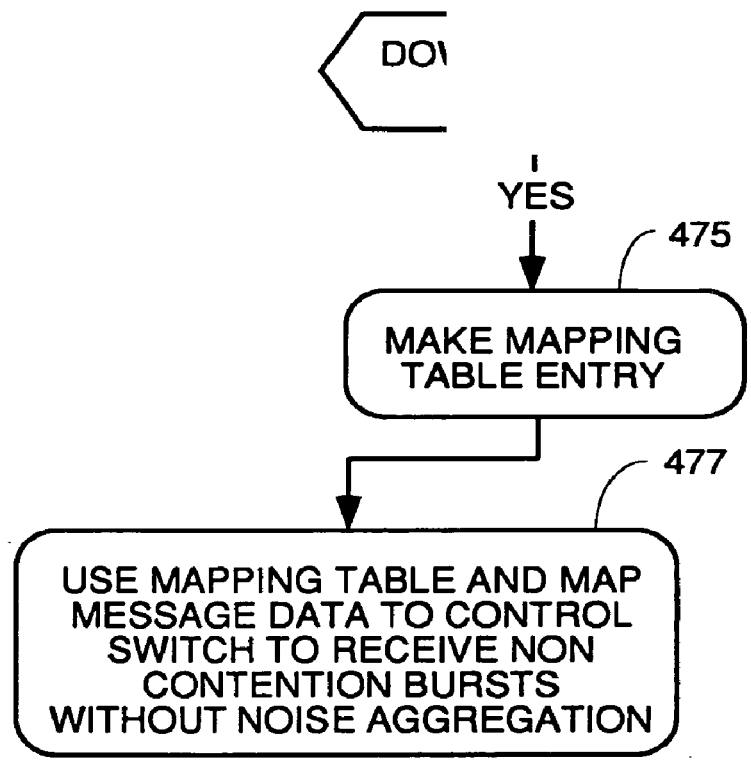

2) Using power detection on the various inputs to detect IUC 4 and/or IUC 3 bursts: power detection eliminates the need to sum all the inputs to hear the IUC 3 initial ranging bursts. FIG. 28 shows the process. Step 443 represents receiving notice that a contention interval is active or otherwise making this determination. In step 445, energy detectors coupled to each input of the switch are enabled to monitor for energy on each input during a contention interval. An energy detector detects which input an IUC 3 burst arrives upon and the switch is switched to select that input for coupling to the PHY receiver to receive the IUC 3 burst in step 447. The IUC 3 burst is received, and normal DOCSIS training protocols are completed in step 447. The SID or MAC address in the received data is used to make a mapping table entry associating the CM to the optical node or input in step 449 and 451. That mapping table is subsequently used in step 453 during non contention bursts to control switching of the switch using MAP data to use a shared PHY receiver to receive upstream DOCSIS bursts scheduled to arrive on particular inputs from CMs coupled to multiple optical nodes, all without noise aggregation. The MAP data indicates which CMs are scheduled to transmit and when. The mapping table indicates to which input each CM is coupled and that data is used to control the switch to select the input each scheduled burst will be arriving upon just in time to receive the burst thereby preventing aggregation of noise.

3) Similar to successive approximation in A/D converters—sum portion of the cable node to detect IUC 4: In this method no power detection is used. Instead, all the inputs are summed together when the switch learns that a contention interval is active (step 455). Then, when the receiver receives an IUC 3 burst (step 457), the CMTS identifies the CM that sent the burst and performs standard DOCSIS training with that CM (step 457). The CMTS then invites the CM which sent the IUC 3 burst to send an IUC 4 burst (step 459). The switch is then controlled to select half the total number of inputs and sum the signals arriving on the selected half of the inputs to the input of a shared PHY receiver (step 459). While doing this, the CMTS ignores the other half. If no IUC 4 burst is heard within the interval when it should have arrived (test 461), the CMTS invites the CM to send another IUC 4 burst (step 465), and the switch is controlled to select the other half of the inputs for summing to the input of the shared PHY receiver while the CMTS listens for the IUC 4 burst (step 465). The IUC 4 burst will be heard unless there is something wrong. If there is something wrong, and no IUC 4 burst is heard test 469 detects the fact that no IUC 4 burst arrived when it should have arrived on one of the second half of the inputs. In this case, step 471 is performed to indicate there is something wrong and abort the process until the problem is fixed. If test 469 detects an IUC 4 burst, step 463 is performed. In this step, the CMTS will then control the switch to select half of the inputs from the group upon which the IUC 4 burst was heard. The CMTS then invites the CM to send another IUC 4 burst (step 463). Test 467 is then performed to determine if the IUC 4 burst was heard on the newly selected and summed set of inputs. If the next IUC 4 burst is not heard, processing returns to step 465 where the CMTS controls the switch to select the other half of the inputs from the half in which the first IUC 4 burst was heard. The switch selects this other half of input and sums their inputs to the input of the shared PHY receiver and invites the CM to send another IUC 4 burst (step 465). That IUC 4 burst will be heard unless there is something wrong. Step 469 is then performed to determine if the IUC 4 burst was heard, and processing continues as previously described. If step 467 heard the IUC 4 burst, test 473 determines if the successive approximation is down to one input, and, if not, processing returns to step 463. If the IUC 4 input was heard on a single input, step 475 makes a mapping table entry associating the CM that sent the IUC 4 burst to the input and/or optical node to which it is coupled as determined from the successive approximation process. Step

477 represents using the mapping table and the MAP messages during non contention intervals to use a shared PHY receiver (or more than one) to receive upstream bursts from the different cable modems using the switch to select the input on which each burst is scheduled to arrive so as to avoid noise aggregation.

When a non contention grant burst is received, the switch uses the mapping table to select the cable input that carries the received burst to avoid summing and noise aggregation. When a contention grant burst is received (for initial ranging—IUC 3, and bandwidth requests—IUC 1), the bursts can come from all the optical nodes that belong to the same MAC domain. The CMTS needs to know to which optical node the CM belongs so it can build a mapping table.

While receiving a contention grant burst, the switch in any of the embodiments discussed herein can operate in one of the following modes.

1) No Power Detection: The switch can be operated to sum all the received signals of all the optical nodes. The summation will increase the noise because all the cable nodes contribute to the noise. In order to overcome the increased noise, a less complex modulation constellation such as QPSK and additional error correction may be used. After receiving the IUC 3, there will be a process of CM to optical node association discovery as was explained above so as to build the routing table. This can be done without power detection using the trial and error process or it can be done using the successive approximation process.

2) Power Detection: Instead of summing up the received signals, a power detection circuit can be used to detect power of an incoming burst on one of the inputs to the switch. Once a burst is detected on one of the inputs, the switch will immediately select the input coupled to the optical node from which the burst is arriving, and couple the burst to a receiver. In this mode, there is implemented in some embodiments, a delay on the received data, where the power detection is done before the delay. The delay interval is set according to the time it takes for the power detection circuitry to operate to detect a burst and for the switch to be operated to connect the input upon which the burst is arriving to the receiver. The delay allows the burst to be detected and the switch to be properly set to couple the entire burst to the receiver so the initial part of the burst is not lost. In this embodiment, the delay line will be inserted on each input after the power detector circuitry. Using the power detection scheme enables the receiver to associate the CM that transmitted the IUC 3 contention grant burst with the optical node because the input the burst arrived upon is known and the SID and MAC address of the CM is known.

3) Grouping Into Separate Logical Channels: The modems coupled to each optical node (or coupled to a small group of optical nodes) can be grouped into a separate logical channel. Then the MAP messages are coordinated so that contention intervals are scheduled only for one specific logical channel at a time. Thus, only the CMs from one specific optical node or some small group of optical nodes can transmit during the contention interval. If one logical channel is set up for each optical node, there is no need for a discovery process and the routing table can have an entry made each time an IUC 3 burst is received using the identity of the optical node for which the contention interval is active and the MAC address or SID of the CM. After initial power up, if a CM picks the wrong logical channel for IUC 3, it will fail initial ranging, and the modem will try another logical channel until it picks the correct logical channel to which its cable node belongs.

In step 238, the UMAC of the shared upstream generates MAP data defining the upstream minislot numbers for station maintenance intervals for "by invitation" additional ranging bursts. After initial ranging bursts, the CMs make the requested adjustments, but not all of them achieve precise synchronization in one try, so additional ranging bursts are invited by the CMTS on a CM-by-CM basis. These station maintenance intervals are intervals defined by the MAP data during which only one particular CM may transmit a ranging burst. This MAP data is sent to the DMAC processes of only downstreams to which are tuned CMs which still need to send more ranging bursts.

In step 240, the conventional DOCSIS ranging process is completed by receiving additional periodic station maintenance ranging bursts from the CMs that have been invited to send more bursts. Offset measurements are made on these bursts and new equalization coefficients are developed. The offsets and equalization coefficients are sent to the CMs that sent the bursts which respond by making appropriate adjustments in their transmitters. Each CM then registers with the CMTS and starts making upstream bandwidth requests.

Step 242 represents an optional step which is implemented in alternative embodiments. With the mapping mechanism illustrated in FIG. 6 (no "per burst switching" as described below to eliminate noise aggregation), noise aggregation occurs. This may cause problems in receiving upstream transmissions from certain CMs such as where the cable plant is noisy and/or the CM is not SCDMA capable and does not have enough power to overcome the noise. In such cases, or in any case when there is noise in the upstream channel, it is desirable to group the CMs in the downstream group that have upstream transmission problems into a different logical group and create a special, lower throughput upstream for them. "Lower throughput upstream" as that term is used herein means an upstream which has a better chance of successful communication upstream even in the face of impairments that make the regular shared upstream not effective for reliable communications. Such a lower throughput upstream may have a lower symbol rate, a less complex modulation constellation and/or more overhead devoted to forward error correction so that fewer payload bits are transmitted per second. More forward error correction means more error detection and correction bits, changes to Reed-Solomon codeword encoding for more powerful error detection and correction capability, using Trellis encoding, or use of other overhead consuming techniques in the burst profile of the upstream to increase the probability of successful upstream communication. Optional step 242 represents the process of:

1) determining which CMs are having problems or would be likely to have problems in the future with reliable upstream communication (or which are overperforming their upstream channels) such as by monitoring and comparing to benchmarks the signal-to-noise ratio, bit error rate, byte error rate, received power or packet loss rate of the initial ranging burst or which optical node the bursts are coming from, etc.;
2) generating data that defines a lower throughput upstream channel (or a higher throughput channel for overperforming CMs) and sending it to the DMACs for downstreams to which are tuned CMs which are having problems (or which are overperforming);
3) using that data in the DMACs of the downstreams to which the CMs having problems (or which are overperforming) are tuned to generate new UCD messages which define the burst parameters of the new lower throughput (or higher throughput) upstream and sending the UCD messages downstream;
4) generating channel change messages in the UMAC of the shared upstream and sending them to the DMACs coupled to the downstreams to which the CMs which are having problems are tuned (or which are overperforming);

5) sending the channel change messages (or ranging response messages which tell the CMs to which they are addressed to change to a new upstream) from the DMACs to the CMs which are having problems to order them to change upstreams (or sending channel change messages or ranging response messages to CMs that are overperforming ordering them to change to a new higher throughput upstream);

6) if necessary, send switching commands to cause CMTS switch 158 to change connections to couple optical nodes coupled to the CMs having problems (or which are overperforming) to a new upstream receiver (receiver #2), and send burst profile of the new lower throughput (or higher throughput) upstream channel to receiver #2 to configure it properly to receive bursts on the new lower throughput (or higher throughput) channel;

7) when bursts from CMs not having problems but which are coupled to the same optical nodes as the CMs which are having problems (or which are overperforming) are scheduled to arrive at the CMTS, UMAC for the new lower throughput (or higher throughput) upstream sends the burst profile data for the original higher throughput shared upstream to receiver #2 to configure it properly to receive the bursts having the burst profile of the original shared upstream. In alternative embodiments, the new upstream that supports the CMs that are having problems can still be the same receiver as is used by the CMs not having problems, but operating in a different logical channel that has lower modulation complexity and/or more error correction coding; and 8) doing conventional DOCSIS processing to get the CMs which have been moved synchronized with the CMTS on the new upstreams to which they have been moved.

In step 244, the registered CMs start making upstream bandwidth requests during intervals designated by the UMAC of the shared upstream for receiving bandwidth requests.

In step 246, the UMAC receives the bandwidth requests and makes bandwidth grants and sends the grant data for each CM which has received a grant to the DMAC for the downstream to which the CM receiving the grant is tuned. DMACs put grant data in MAP messages and send downstream.

The CMs with the SIDs designated in the MAP message as having a grant respond by sending their upstream data during the minislots designated in the grant.

In step 248, the UMAC process monitors the traffic load on the upstreams and downstreams for load balancing purposes and decides whether or not to add another upstream and/or another downstream and whether to change the mapping between upstreams and downstreams. Monitoring of traffic load can be by any method. For example, the UMAC can keep track of the number of subscribers on the shared upstream. The cable operator may wish to guarantee that no subscriber gets less than 128 kilobits/second whereas each upstream can carry a maximum of 10 megabits/second. Therefore, only 80 CMs can share an upstream, and still guarantee that no subscriber gets less than the minimum throughput. Thus, when the shared upstream UMAC determines that more than 80 CMs have registered on the downstream group sharing an upstream, the UMAC decides to add another upstream and may decide to remap some of the downstreams to the new upstream. More complex load balancing may also be used such as monitoring of channel utilization. For example, the cable operator may set a limit of 60% of the maximum upstream capacity as the decision threshold to add a new upstream. The UMAC for the shared upstream then continuously monitors the aggregated upstream bit rate of all the grants it issues in the MAP messages. The combination of the grants and the burst profile (symbol rate, modulation, etc.) define how much data is being transmitted per second on the shared upstream. When that amount of data exceeds the limit set by the cable operator or some other limit (which may be programmable), the UMAC decides to add another upstream. Alternatively, the UMAC for the shared upstream can calculate the percentage of minislots granted versus the total number of minislots available. In an alternative embodiment, another upstream might be added during business hours to satisfy a subscription for a business client, or another upstream might be added after business hours to handle the increased traffic when people get home from work and go online more on their home CMs. In other embodiments, the CMTS may monitor one or more of the factors identified above (signal-to-noise ration, received power, bit error rate etc.) for the shared upstream and may poll the CMs on each downstream to ask them about the number of transmission errors, signal-to-noise ratio, etc. on their particular downstream to determine whether a new upstream or downstream should be added. Any traffic monitoring or load balancing schemes can be used on the shared upstream and for the downstreams to make the decision as to whether to add a new upstream or downstream and what the burst profile of any new upstream should be.

Step 250 represents the process of deciding based upon any of the factors or methodologies identified above whether to add another upstream. If the decision is to not add another upstream, processing proceeds to step 252 to decide whether to add another downstream.

Whether to add another downstream or not can be made based upon any one or more criteria. The most common are as follows.

1) Using the CMTS routing tables to determine how many CMs are tuned to each downstream and shifting the load if multiple downstreams exist by shifting some CMs over to another downstream so that each downstream serves approximately the same number of CMs.

2) Watching the traffic volume to each CM by examining the destination IP address of incoming packets to be sent downstream and the length in bytes of those packets and mapping the IP destination addresses to the CMs on each downstream. If some CMs are getting heavy downstream traffic, shifting those CMs to another downstream in the group that shares the same upstream (and shifting the upstream also if traffic volume from the CM on the upstream so dictates).

3) Comparing subscription commitments as to minimum downstream throughput capacity to one or more CMs and comparing those commitments to the amount of traffic on the downstream to which the CM is tuned.

4) If downstream traffic volume is such that the commitment might be jeopardized, shifting the CM to another downstream with lighter traffic. One way of making this decision is to compare the downtream traffic volume to a downstream traffic utilization threshold which may be set at some number such as 70% of maximum capacity, etc.

If the decision is to not add another downstream, processing proceeds back to step 248 to monitor traffic conditions or carry out whatever other load balancing scheme is in use.

Figure 9A:
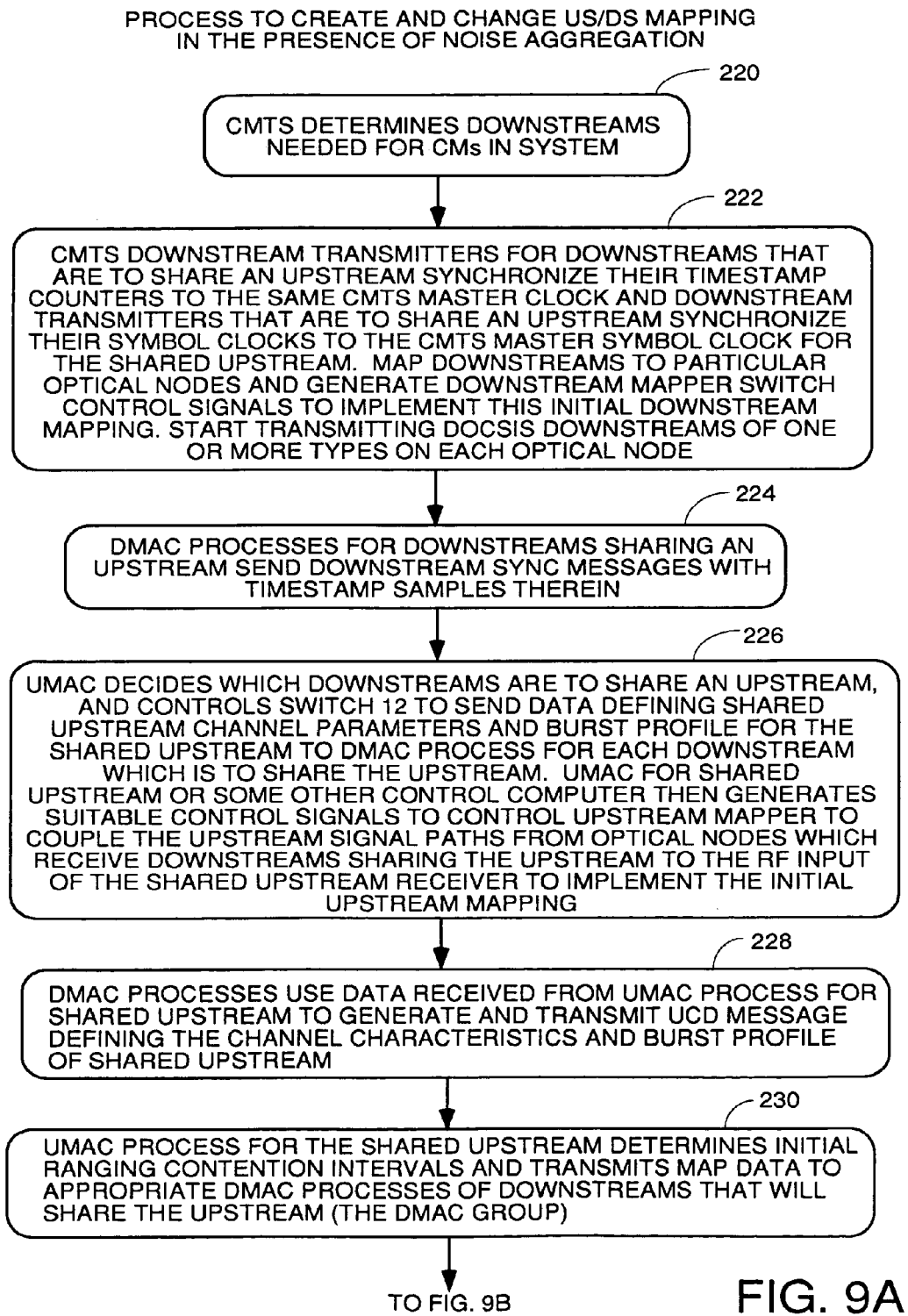
FIG. 9, comprised of FIGS. 9A, 9B and 9C, is a flowchart for flexible mapping of upstreams and downstreams in the presence of noise aggregation with simple switching in of new receivers without changing upstream channel ID, and optional creation of a new upstream channel with a new channel ID and lower symbol rate, less complex modulation, more forward error correction for CMs having upstream communication problems.
Figure 9B:
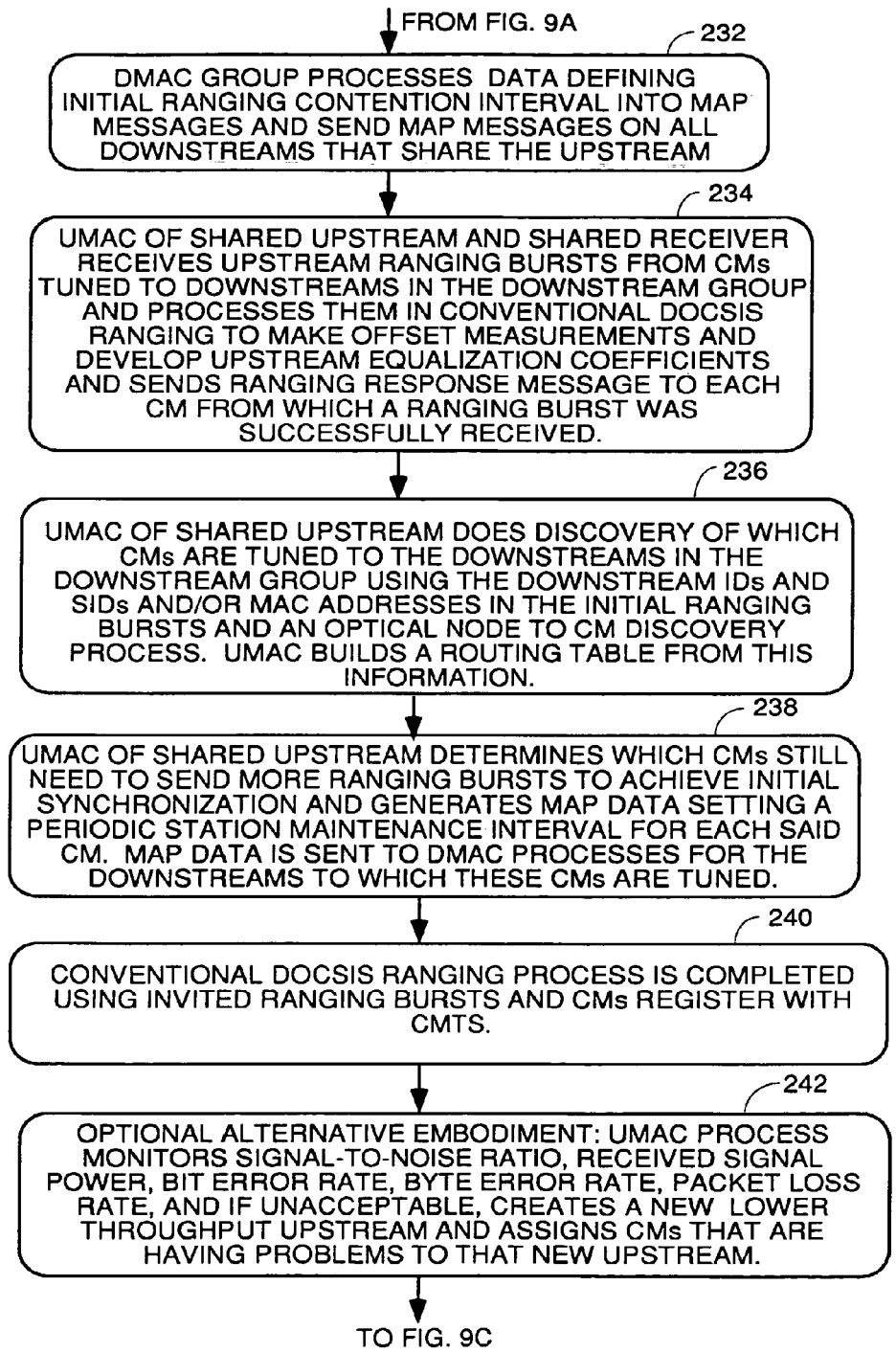
Figure 9C:
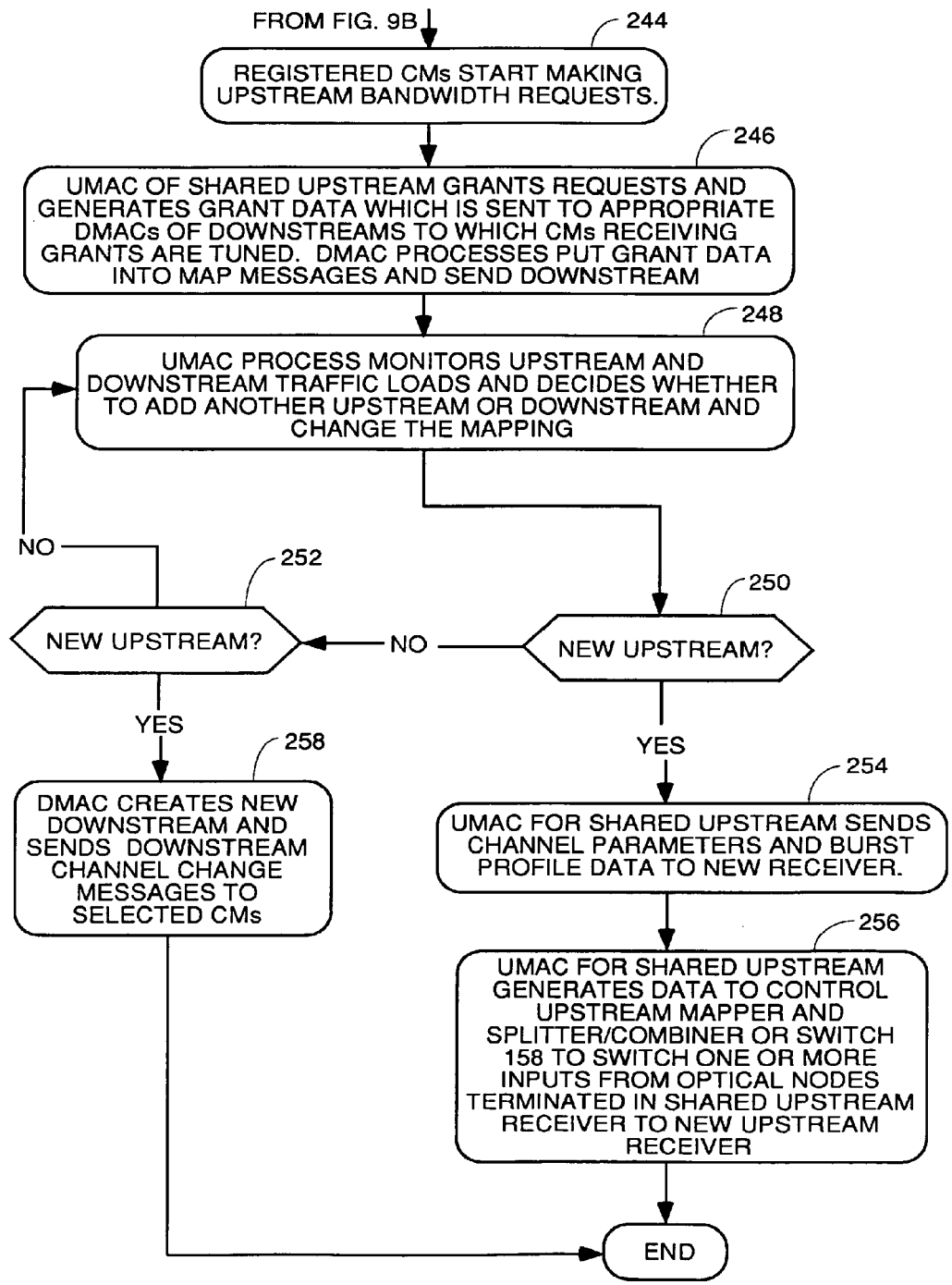
Figure 10A:
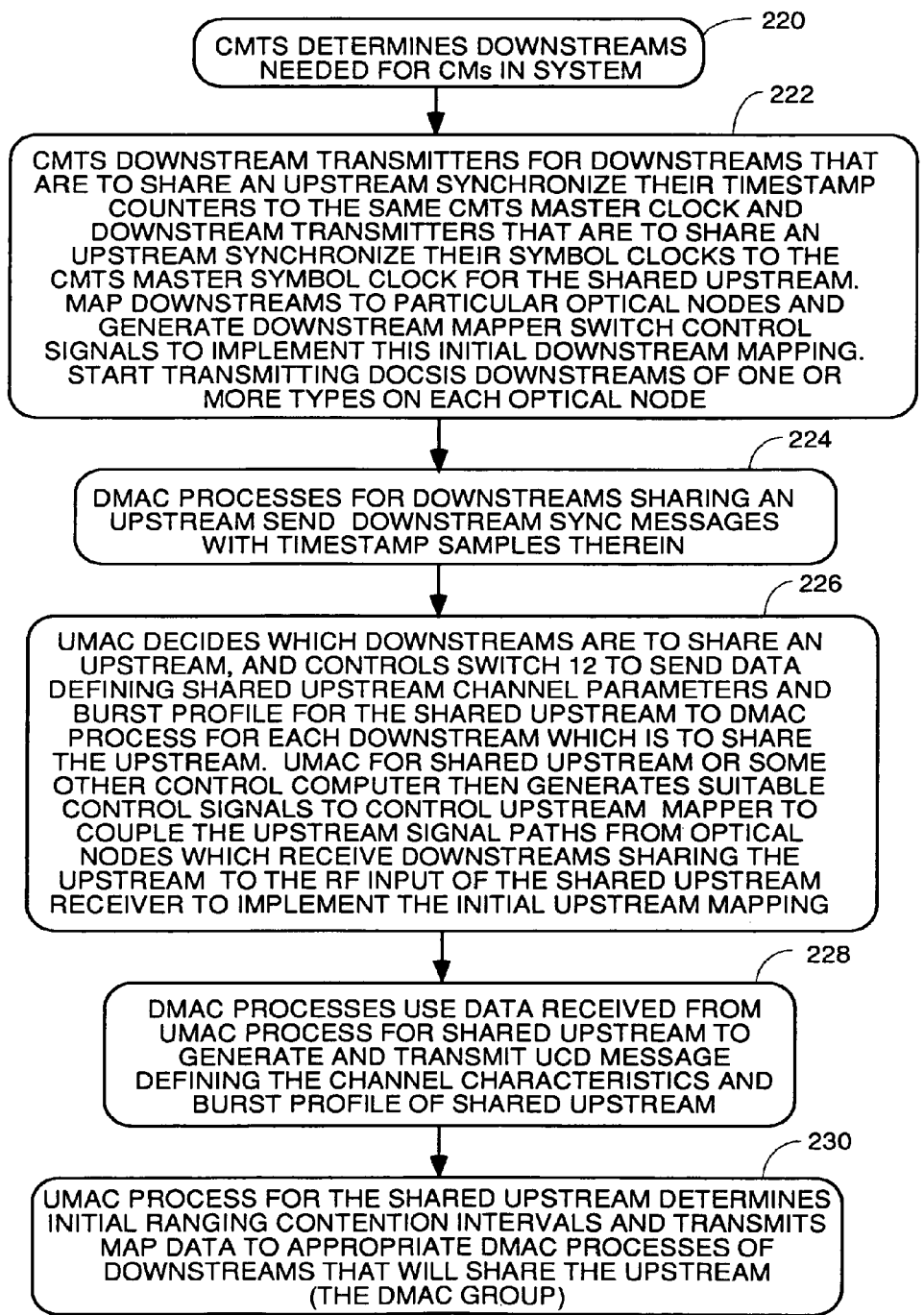
FIG. 10, comprised of FIGS. 10A, 10B, 10C and 10D, there is shown a flowchart for a process for flexible mapping of upstreams and downstreams in the presence of noise aggregation with monitoring for problems and load balancing issues and creation of new upstreams or downstreams to resolve those issues.
Figure 10B:
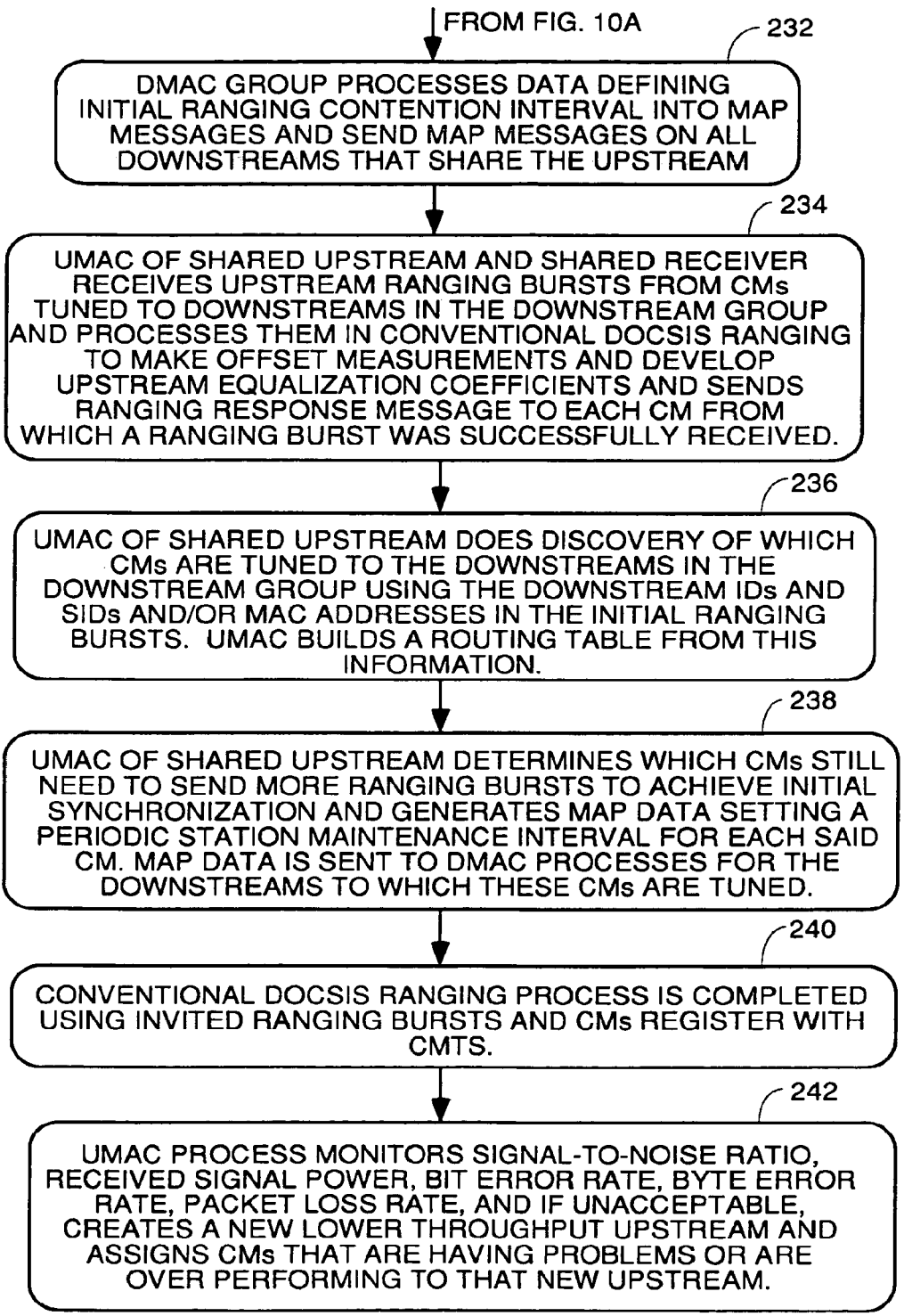
Figure 10C:
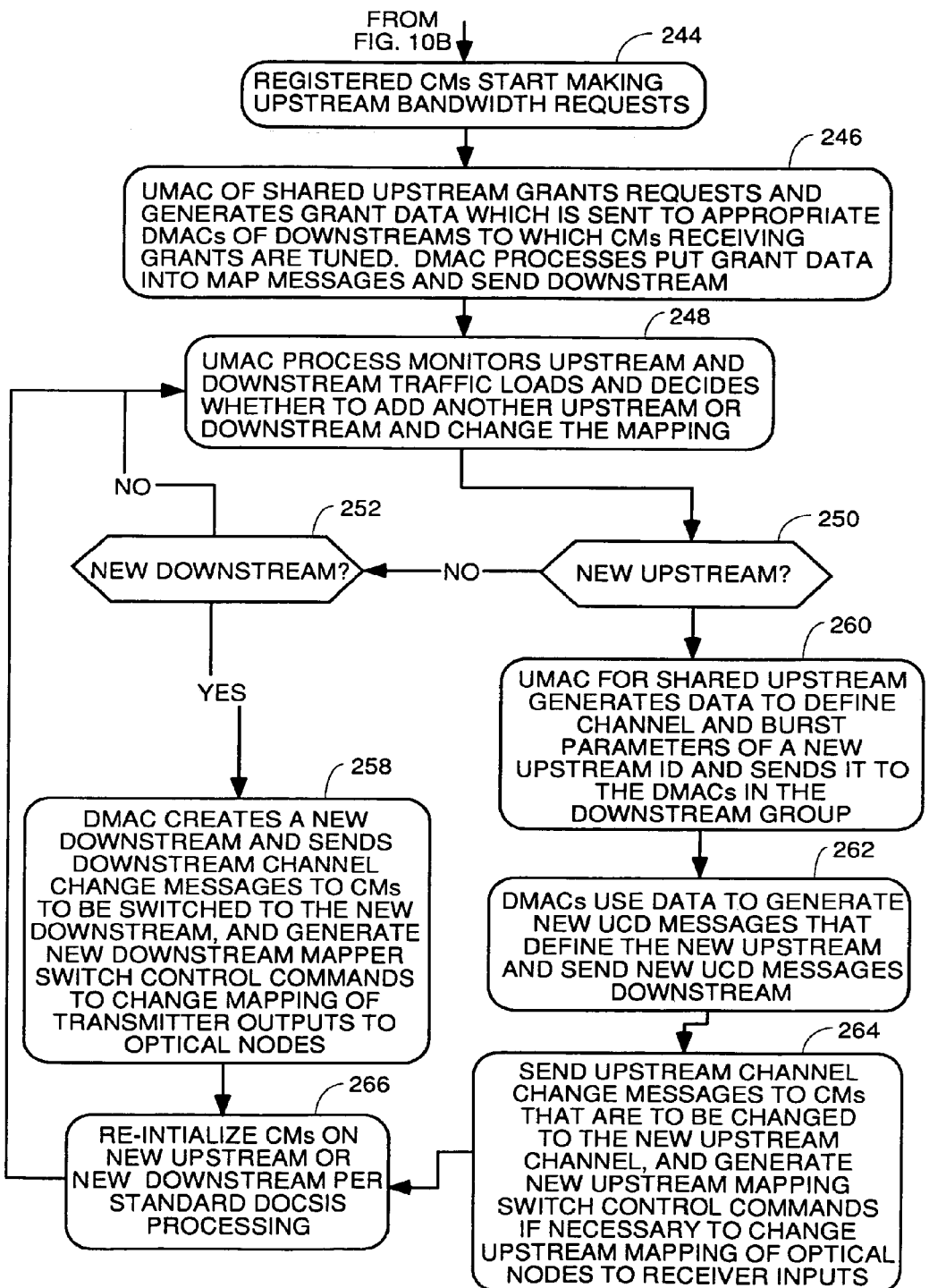

If the process of step 250 decides to add another upstream, step 254 is performed where the UMAC for the shared upstream sends the channel parameters and burst profile data for the existing shared upstream to the new receiver to ready it to receive bursts. In this embodiment of FIGS. 9A through 9C, a new upstream ID is not actually being created with a new or even the same burst profile. The embodiment of FIGS. 10A through 10C is an embodiment where an entirely new upstream with its own upstream channel ID is created. This new upstream in the embodiment of FIGS. 10A through 10C may have different channel and burst parameters as the original upstream or it may have the same channel and burst parameters. In the embodiment of FIGS. 9A through 9C, no new upstream is created. Only a new receiver is added to the existing upstream is added which is configured to handle the same type bursts as are being transmitted on the original shared upstream is being added. Bursts can be switched so that one receiver handles one burst and the other receiver handles the next burst.

In the embodiment of FIGS. 10A through 10C, an entirely new upstream ID is created. To do this, a UMAC for the new upstream will generate data for a new UCD message which defines the new upstream for the CMs. This data will be sent to the DMAC processes for the CMs that are to be switched to the new upstream, and a UCD message will be composed and sent downstream. The CMs that are to be switched to the new upstream ID are then sent upstream channel change messages. They respond by listening for the UCD message for the new upstream, and use the data therein to configure their transmitters to transmit on the new upstream.

The channel parameters and burst profile attributes of the new upstream may be the same as the original shared upstream or they may be different. For example, continual monitoring of signal-to-noise ratio, bit error rate, packet loss rate, etc. may lead to the conclusion that some CMs are having problems with upstream communications or are overperforming their upstreams. These CMs can be grouped into a separate logical group and a lower throughput or higher throughput upstream created for them, as the case may be. This can be done as an ongoing monitoring process in addition to the optional step previously described of monitoring the initial training bursts for SNR, bit error rate etc. and creating lower throughput upstream channels initially for some CMs during the initial training.

Then step 256 is performed by the UMAC of the shared upstream to generate new switching signals to control the upstream mapper and splitter/combiner or switch 158 in FIG. 6 to switch some of the inputs from HFC 1 through 5 over to the input of the new receiver (192 in FIG. 6). Typically no re-ranging is necessary since the channel parameters did not change and the data path did not change significantly in length. If re-ranging is needed, it can be done in the conventional DOCSIS fashion after an upstream channel change message.

The process then ends, but in alternative embodiments, continual monitoring for traffic conditions occurs so processing returns to step 248, as represented by line 257.

If step 252 decides to create a new downstream, step 258 is performed. Step 258 creates the new downstream in a normal DOCSIS fashion, and DOCSIS Dynamic Channel Change-Request (DCC-REQ) messages are then sent to each CM to be changed to the new downstream. The DCC-REQ message also specifies the ID of the upstream channel the CM should use once it gets synchronized to the new downstream. The DCC-REQ message also includes the frequency, modulation type, symbol rate, interleaver depth and downstream channel ID of the new downstream and a copy of the UCD message for the upstream to be used. The DCC-REQ message also informs the CM whether it needs to wait for a new SNYC message on the new downstream and re-synchronize its counters before transmitting upstream. If the CMTS has synchronized the timestamps between the old downstream and new downstream (timestamps derived from the same clock), the CMTS may tell the CM not to wait for a new SYNC message. The DCC-REQ message also tells the CM what level of re-initialization to perform. Generally, if the move within the same MAC domain, complete re-initialization is usually not needed although some re-ranging might be necessary. The CMs to be switched receive these DCC-REQ messages and switch to the new downstream and get re-synchronized in the conventional DOCSIS way and sets up its transmitter using the data in the UCD message copy in the DCC-REQ message.

Referring to FIG. 10, comprised of FIGS. 10A, 10B, 10C and 10D, there is shown a flowchart for a process for flexible mapping of upstreams and downstreams in the presence of noise aggregation with monitoring for problems and load balancing issues and creation of new upstreams or downstreams to resolve those issues. In this process, the steps that have the same step numbers as steps in FIG. 9 are the same as in FIGS. 9A through 9C, and their explanation will not be repeated here. A first difference over the FIG. 9 process is in step 242 which was optional in FIG. 9 but is performed in FIG. 10. Step 242 comprises the following steps:

1) determining which CMs are having problems with reliable upstream communication or which are overperforming their channels on the basis of signal-to-noise ratio, bit error rate, byte error rate, packet loss rate, etc.

2) generating UCD data that defines a lower throughput upstream channel (lower symbol rate, less complex modulation constellation, more aggressive forward error correction parameters) or a new higher throughput upstream channel (higher symbol rate, less error correction bits, more complex modulation constellation, etc.) and sending it to the DMACs for downstreams to which are tuned CMs which are having problems or which are overperforming, 3) using that UCD data in the DMACs of the downstreams to which the CMs having problems or which are overperforming are tuned to generate new UCD messages which define the burst parameters of the new lower throughput or higher throughput upstream and sending the UCD messages downstream, 4) generating channel change messages in the UMAC of the shared upstream and sending them to the DMACs coupled to the downstreams to which the CMs which are having problems or which are overperforming are tuned, 5) sending Dynamic Channel Change (DCC-REQ) or Upstream Channel Change (UCC-REQ) or ranging response messages from the DMACs to the CMs which are having problems or which are overperforming to order them to change to the lower throughput and/or a new higher throughput upstream (both new lower throughput and higher throughput upstreams are created if some CMs are having problems and some are overperforming), 6) sending switching commands to cause CMTS switch 158 to change connections to couple optical nodes coupled to the CMs having problems and/or which are overperforming to one or more new upstream receivers (receiver #2 and/or receiver #2 for the lower throughput upstream and receiver #3 for the higher throughput upstream), and send burst profile of the new lower throughput and/or new higher throughput upstream channel to receiver #2 and/or receiver #3 to configure them properly to receive bursts on the new lower throughput channel and/or new higher throughput upstream channel, 7) when bursts from CMs not having problems but which are coupled to the same optical nodes as the CMs which are having problems or which are overperforming are scheduled to arrive at the CMTS, UMAC for the new lower throughput upstream and/or new higher throughput upstream channel sends the burst profile data for the original shared upstream to receiver #2 or receiver #3 to configure it properly to receive the bursts having the burst profile of the original shared upstream or just switches those bursts to the input of receiver #1 which is configured to receive bursts having the burst profile and channel parameters of the original shared upstream, and 8) doing conventional DOCSIS processing to get the CMs which have been moved synchronized with the CMTS on the new upstreams to which they have been moved.

In alternative versions of this species, the upstream mapper and splitter/combiner 158 in FIG. 5 can be a simple summing node to which the inputs of the two and/or three receivers are coupled. A first receiver is configured with the channel and burst parameters of the original shared upstream channel, a second receiver is configured with the lower throughput channel and burst parameters, and a third receiver (if present) is configured with the channel and burst parameters for the new higher throughput upstream. Each upstream may simply be a different logical channel on the same physical channel (frequency) such as by putting three logical channels in different time intervals of the same upstream physical channel (RF carrier) and separated by null SIDs. Each receiver receives all bursts, but ignores the bursts which it is not configured to process.

In another alternative embodiment, the upstream mapper and splitter/combiner 158 in FIG. 5 is an actively managed switch which switches all bursts having the burst profile for the lower throughput channel to the input of the receiver configured with the lower throughput channel's channel and burst parameters. All bursts having a burst profile for the original shared upstream are routed to the input of the receiver configured to process them. The UMAC processes of the shared upstream and the new upstream schedule each burst and know when they will arrive from each optical node based upon their MAP data and routing tables and suitably cooperate to manage the switching action of the upstream mapper 158 to get the right burst to the right receiver.

The next change is at step 260 on FIG. 10C. In the embodiment of FIG. 10, an entirely new upstream ID is created when it is decided to add another upstream either because of load balancing or communication problem considerations. To do this, the UMAC for the shared upstream generates data to define the channel parameters and burst profile for the new upstream channel (or new upstream logical channel) to be created and sends this data to the DMACs of any downstream in the downstream group to which a CM to be changed is tuned, as represented by step 260. In step 262, the DMAC processes uses this data to create a new UCD message for the new upstream and send the new UCD message downstream. This new UCD message defines the channel and burst profile parameters of the new upstream for the CMs to be switched to the new upstream. The CMs that are to be switched to the new upstream ID are then sent Upstream Channel Change (DOCSIS UCC-REQ) or ranging response messages in step 264 which instruct these CMs to change to the new upstream. They respond by listening for the UCD message for the new upstream, and use the data therein to configure their transmitters to transmit on the new upstream. Step 264 also represents the process of generating suitable switch control signals for the upstream mapper to change the mapping of optical nodes to upstream receiver line cards if necessary.

The channel parameters and burst profile attributes of the new upstream may be the same as the original shared upstream or they may be different. For example, increased traffic causing capacity of the shared upstream to be strained may result in another upstream with the same burst profile parameters but a different frequency to be created and certain CMs shifted over to the new upstream. Which CMs are shifted can be decided in any of several ways: purely on the basis of numbers of CMs on each upstream; on the basis of bandwidth being consumed in the shared upstream by each CM based upon the grants in the maps such as number of minislots awarded to any particular CM over an interval compared to the total number of minislots during that interval; or based upon guaranteed subscription commitments to various CMs compared to the traffic levels on the upstream being used by the CMs having these commitments.

Likewise, the need for a new upstream may be based upon communication difficulties being experienced by some modems, especially DOCSIS 1.0 or 1.1 modems in a system dominated by DOCSIS 2.0 modems. The UMAC of the shared upstream, in some embodiments, carries out continual monitoring of signal-to-noise ratio, received signal power, bit error rate, byte error rate, packet loss rate, etc. This monitoring may lead to the conclusion that some CMs are having problems with having reliable upstream communications. These problem CMs can be grouped into a separate logical group and a lower throughput upstream (lower symbol rate, less complex modulation constellation, more overhead devoted to forward error correction) created for them. Then appropriate UCD and upstream channel change messages are sent to the problem CMs to cause them to switch to the new lower throughput upstream. This can be done as an ongoing monitoring process in addition to the step 242 previously described of monitoring the initial training bursts for SNR, bit error rate etc. and creating lower throughput upstream channels initially for some CMs during the initial training.

Step 266 represents the process of re-initializing the CMs which have been switched to the new upstream ID in the way defined in the DOCSIS specifications. This same process is performed to re-initialize any CMs that have been switched to a new downstream after step 258 is performed to create new downstreams and shift some CMs to the new downstream. Processing then continues back to step 248 to continue the monitoring process for load balancing or communication problem resolution.

Figure 11A:
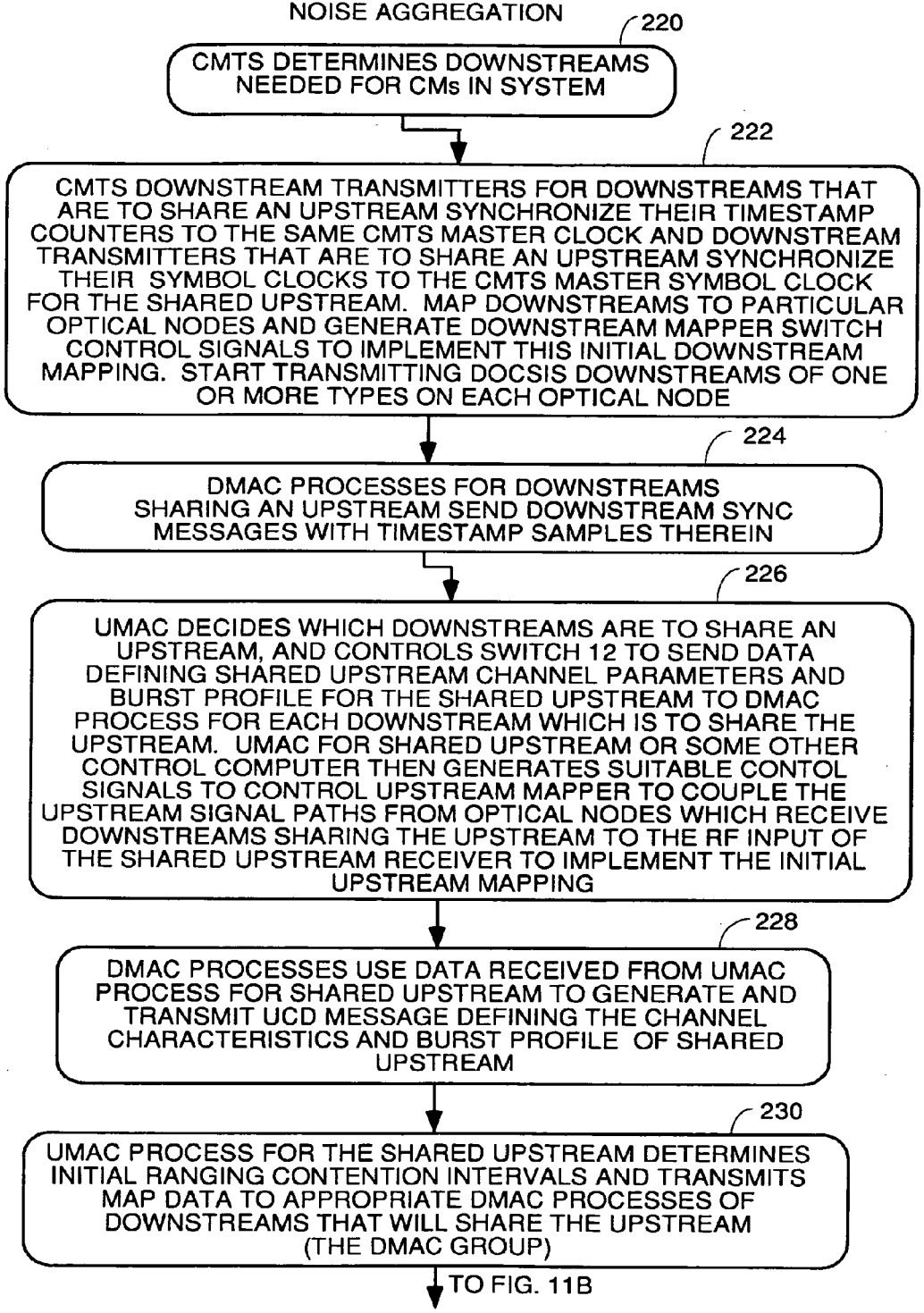
FIG. 11, comprised of FIGS. 11A, 11B, 11C, is a flowchart of the preferred species within the process genus of the invention for providing flexible mapping of upstream receivers to optical nodes without aggregating noise. The species of FIG. 11 also provides flexible mapping of one or more downstreams to each upstream.
Figure 11B:
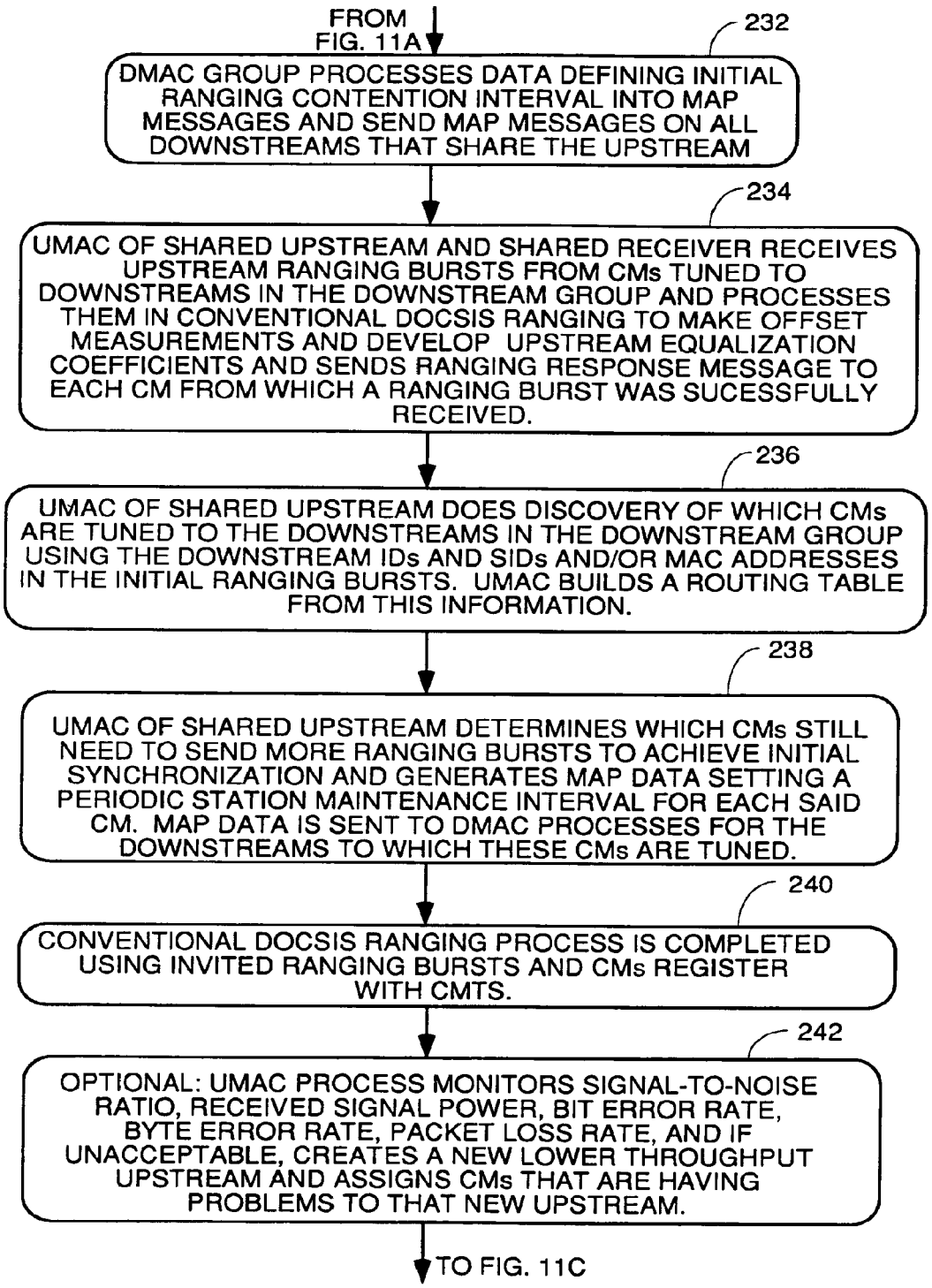
Figure 11C:
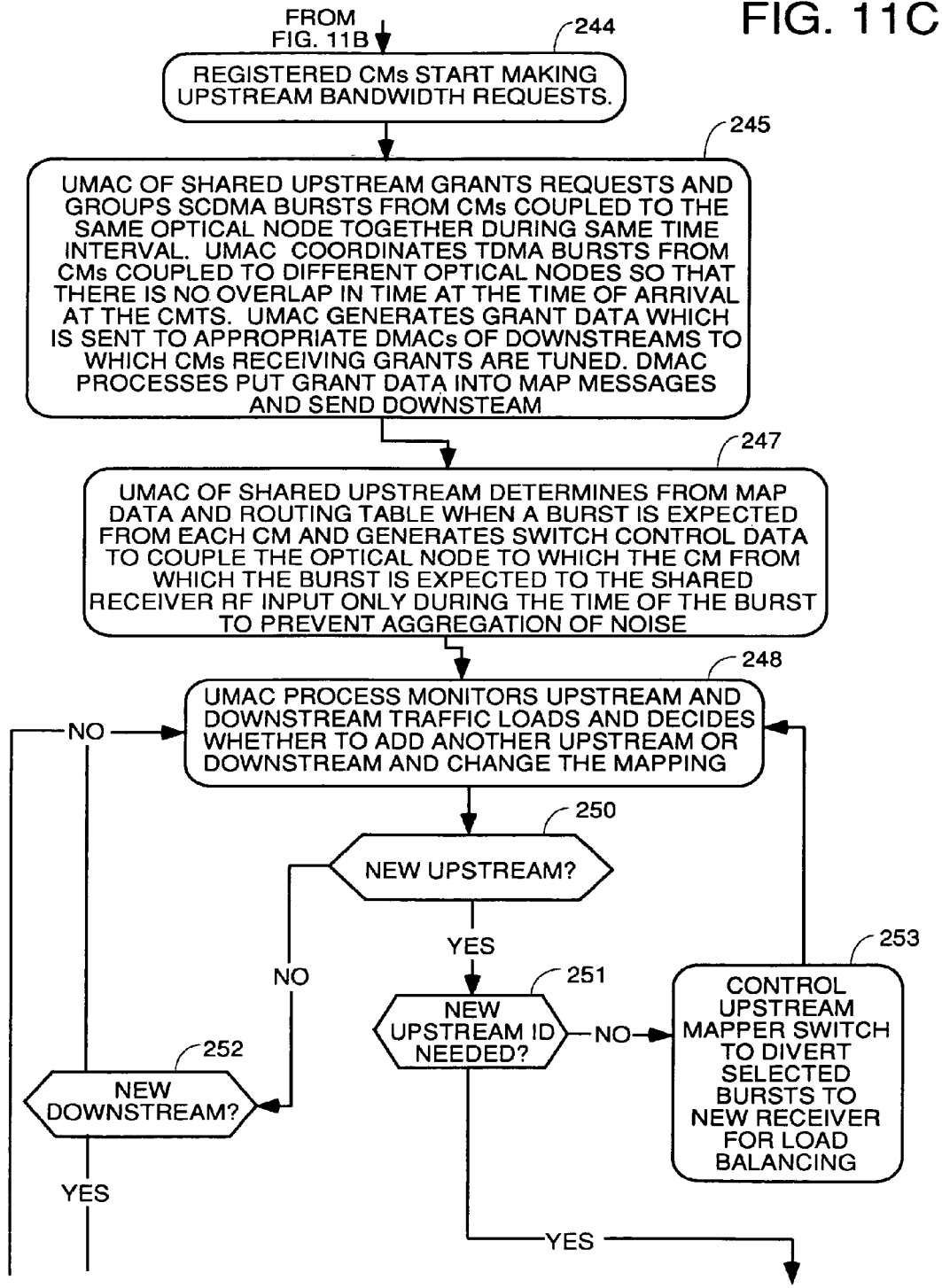
Figure 11D:
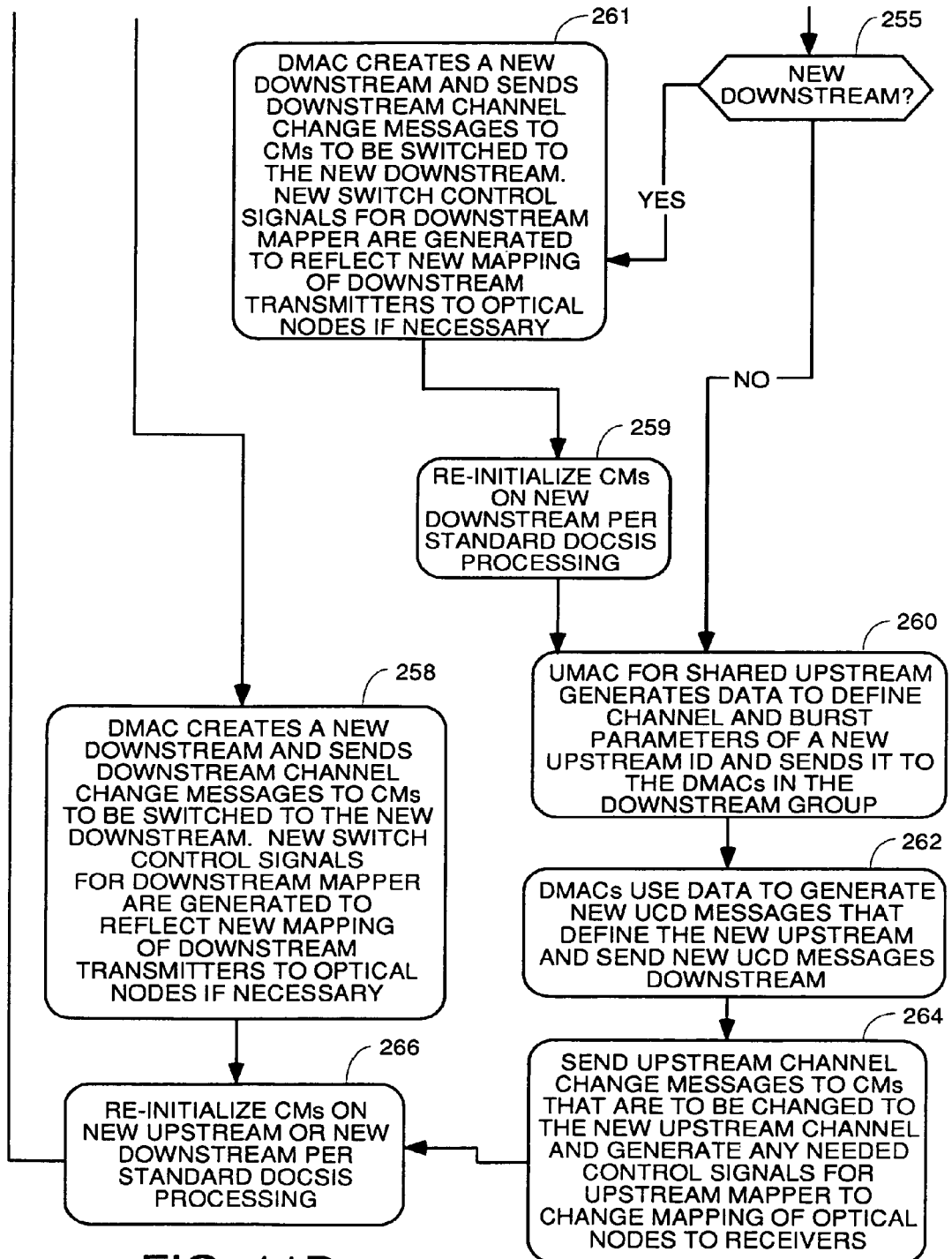

FIG. 11, comprised of FIGS. 11A, 11B, 11C, is a flowchart of the preferred species within the process genus of the invention for providing flexible mapping of upstream receivers to optical nodes without aggregating noise. The species of FIG. 11 also provides flexible mapping of one or more downstreams to each upstream. The process steps having the same reference numbers as steps in the processes of FIGS. 9 and 10 work the same way and will not be described again here. The discussion of these steps for the species of FIGS. 9 and 10 is hereby incorporated by reference. Only the differences will be described here.

The main difference between the species of FIG. 11 and the species of FIGS. 9 and 10 is that the UMAC process for the shared upstream controls switching of the upstream mapper switch 158 in FIG. 6 such that the shared upstream receiver is only coupled to a particular optical node when a burst is expected to arrive from that optical node and is disconnected at all other times. This prevents noise aggregation. This requires the UMAC process to check its MAP data and routing table so as to know when TDMA bursts will be arriving from various optical nodes and it requires the UMAC to generate the MAP so as to group SCDMA bursts from the various CMs such that SCMDA bursts from CMs coupled to the same optical node are all grouped into the same interval of upstream minislots during which the mapper switch 158 is operated to couple the receiver to that particular optical node. Changes to the mapping provided by switch 158 will be done at MAP message boundaries in time.

The first change over the process of FIG. 10 is at step 242. This step is optional in the process of FIG. 11, but is included in an alternative embodiment of the species of FIG. 11. Step 242 represents the process of monitoring signal-to-noise ratio (SNR) or received power (or bit error rate or byte error rate or packet loss rate) during the initial training burst reception from each CM and determining whether any CM, after multiple attempts to successfully complete initial ranging, is still suffering from a bad SNR or received power which is too low. This can happen in noisy or lossy HFC systems which are found in Japan and other places in the orient frequently. If one or more CMs are not able to successfully complete initial ranging with adequate SNR or received power or both, step 242 sets up a special lower throughput upstream channel for these CMs. This special upstream may have a lower symbol rate, less complex modulation constellation, more aggressive forward error correction settings in its burst profile so as to insure successful upstream communications even if a CM suffers from inadequate received power or bad SNR. Step 242 is made optional in FIG. 11 since the process of FIG. 11 does not aggregate noise and step 242 may not be needed unless the HFC system is very noisy or lossy. In such a case, the invention of FIG. 11 will be practiced in its alternative embodiment with step 242 being carried out. The steps to set up the lower throughput channel in this alternative embodiment are:

1) determining which CMs are having problems with reliable upstream communication such as by monitoring signal-to-noise ratio, bit error rate, byte error rate, received power, packet loss rate, which optical node the bursts are coming from etc.,
2) generating data that defines a lower throughput upstream channel and sending it to the DMACs for downstreams to which are tuned CMs which are having problems,
3) using that data in the DMACs of the downstreams to which the CMs having problems are tuned to generate new UCD messages which define the burst parameters of the new lower throughput upstream and sending the UCD messages downstream,
4) generating channel change messages in the UMAC of the shared upstream and sending them to the DMACs coupled to the downstreams to which the CMs which are having problems are tuned,
5) sending the channel change messages from the DMACs to the CMs which are having problems to order them to change upstreams,
6) send switching commands to cause CMTS switch 158 to change connections to couple optical nodes coupled to the CMs having problems to a new upstream receiver (receiver #2), and send burst profile of the new lower throughput upstream channel to receiver #2 to configure it properly to receive bursts on the new lower throughput channel,
7) when bursts from CMs not having problems but which are coupled to the same optical nodes as the CMs which are having problems are scheduled to arrive at the CMTS, UMAC for the new lower throughput upstream sends the burst profile data for the original higher throughput shared upstream to receiver #2 to configure it properly to receive the bursts having the burst profile of the original shared upstream, and
8) doing conventional DOCSIS processing to get the CMs which have been moved synchronized with the CMTS on the new upstreams to which they have been moved.

The next major change over the embodiments of FIGS. 10 and 9 is in controlling the upstream mapper switch 158. In step 226, as was the case for the species of FIGS. 9 and 10, the UMAC for the shared upstream generates switch control signals for upstream mapper switch 158 in FIG. 6 to couple the HFC systems and optical nodes for all the downstreams which are to share the upstream receiver so as to couple all these HFC systems to the RF input of the receiver to be shared. In the example of FIG. 6, HFC 1 through HFC 5 are all coupled to the input of shared upstream receiver 190. These connections will remain during the initial ranging process only because the initial ranging process is a contention interval and the UMAC does not know when ranging bursts will arrive. However, after the CMs Initial Maintenance Bursts (IUC3 bursts) are received, the upstream mapper switch 158 will be operated to avoid aggregation of noise using information in a mapping table developed during a discovery process using contention interval bursts or developed using configuration data entered by the cable operator. The switch can be operated even during any contention intervals to avoid aggregation of noise where energy sensing is used, but aggregation of noise occurs during contention intervals in embodiments where inputs are summed during contention intervals. Since the UMAC does not know when these bursts from various CMs will arrive but does know when the contention interval for upstream requests is, it will control the upstream mapper 158 to connect all HFC systems and optical nodes coupled to the downstream group to couple them to the input of the shared upstream receiver. Although the noise will be aggregated during the contention intervals, contention grants for bandwidth requests are for robust QPSK modulation which can be successfully received in the presence of higher noise.

Controlling of the upstream mapper switch 158 to avoid aggregation of noise starts in step 245 which replaces step 246 of the species of FIGS. 9 and 10. In step 245, the UMAC of the shared upstream receives the upstream bandwidth requests from the CMs and grants them but the granting process is coordinated such that TDMA bursts from CMs tuned to the downstream group but on different optical nodes are coordinated so as to not overlap in time. Likewise, SCDMA grants are coordinated by the UMAC process such that all CMs coupled to each optical node have their SCMDA burst grants grouped together into the same interval dedicated to that optical node. The intervals dedicated for SCDMA bursts for each optical node are coordinated by the UMAC process so as to not overlap. This allows the upstream mapper switch 158 to be controlled so that each TDMA burst from a CM and each group of SCDMA bursts will be expected and the HFC on which the TDMA burst or group of SCDMA bursts is arriving will connected to the RF input of the shared receiver just in time to receive and process the burst or bursts, and disconnected thereafter. In other words, the upstream mapper switch is operated to couple each HFC to the input of the receiver just during the time when a TDMA burst or group of SCDMA bursts from the same optical node are arriving and not thereafter. Step 245 represents the process of granting the upstream bandwidth requests and grouping them as described above and sending the grant data to the appropriate DMAC processes for incorporation into MAP messages for sending downstream.

Step 247 represents the process carried out by the UMAC of the shared upstream of examining the grant data and its upstream minislot counter to determine when upstream TDMA or groups of SCDMA bursts are expected from various CMs and examining the routing table to determine which optical node each burst or group of bursts will be coming from. Suitable switching commands are then generated and sent to the upstream mapper switch to control it to connect each HFC to the input of the shared receiver just during the time of arrival of a TDMA burst or group of SCDMA bursts and to disconnect the HFC from the receiver input thereafter. This prevents noise aggregation.

Figure 12:
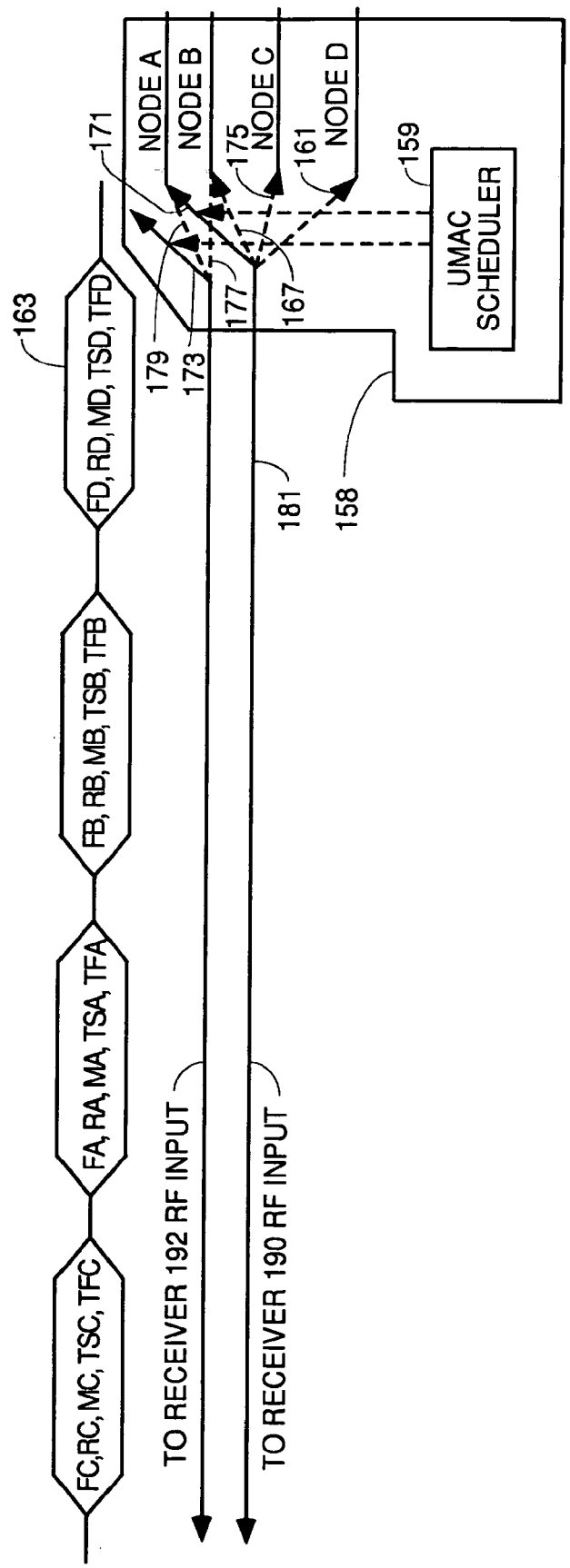
FIG. 12 is an illustration of how a scheduler process 159 in the UMAC process of the shared upstream controls one or more switches in the upstream mapper switch 158 to couple different optical nodes to different upstream receiver RF inputs at different times to prevent noise aggregation.

This operation of the upstream mapper switch 158 is illustrated in FIG. 12. FIG. 12 is an illustration of how a scheduler process 159 in the UMAC process of the shared upstream controls one or more switches in the upstream mapper switch 158 to couple different optical nodes to different upstream receiver RF inputs at different times to prevent noise aggregation. For example, suppose that TDMA bursts or groups of SCDMA bursts, or both, are scheduled in the MAP data to arrive at the CMTS in the time sequence illustrated in FIG. 7 with time increasing from right to left in the figure and that only a single shared upstream processed by receiver 190 in FIG. 6 is to be used. In this case, scheduler 159 controls upstream mapper 158 to make the connection represented by dashed line 161 in FIG. 12 from node D to the input of receiver 190 during the time burst 163 is arriving. At the end of burst 163, connection 161 is broken. Next, collection of SCDMA bursts 165 is scheduled to arrive from optical node B. Schedule 159 controls switch 158 to make the connection represented by dashed line 167 during the interval when the collection of bursts 165 are to arrive and to break the connection 167 after the collection of SCDMA bursts 165 end. Next, TDMA burst 169 is scheduled to arrive on node A. The scheduler controls the switch 158 to make the connection 171 during the time burst 169 is arriving and breaks the connection after burst 169 ends. Finally, burst 173 is scheduled to arrive from optical node C. The scheduler responds by controlling switch 158 to make the connection represented by dashed line 175 during the time burst 173 is arriving and breaks the connection thereafter.

Step 248 in FIG. 11 is the same as in the processes of FIGS. 9 and 10 and represents the process of monitoring upstream and downstream communications for load balancing issues at least and for both load balancing and communications problems in some preferred embodiments. Tests 250 and 252 represent the process of deciding based upon the monitoring whether to add another upstream and/or another downstream. If a decision is made to add another upstream, step 251 is performed to determine if the new upstream needs to have different channel parameters and a different burst profile and a different channel ID than the existing shared upstream.

Adding another upstream receiver can be done in either of two ways. If the burst does not have to have different channel parameters and burst profile (because no CM is having communication problems and load balancing is the only issue), the easiest way is to not create a new upstream channel ID and simply route some of the bursts to the RF input of another receiver by suitably controlling upstream mapper switch 158. This is the process represented by step 253. In step 253, no new upstream channel ID with different channel and burst parameters is created. Instead, some of the bursts on the existing shared upstream are diverted to a second receiver by suitably controlling upstream mapper switch 158. Thus, for example, in FIG. 7, a decision may be made that too many subscribers are being processed by receiver 190 so a second receiver 192 is to be added to process some of the bursts on the shared upstream such as all bursts from CMs coupled to optical nodes A and B. In this example, step 253 represents the process of controlling a switch 173 in upstream mapper 158 in FIG. 12 to make the appropriate connections at the appropriate times. Specifically, switch 173 will be controlled by scheduler 159 to make the connection represented by dashed line 177 to connect node B to the RF input of receiver 192 during the time when burst 165 in FIG. 7 is arriving. Switch 173 will be controlled by scheduler 159 to make the connection represented by dashed line 179 to connect node A to the RF input of receiver 192 during the time burst 169 is arriving. In the meantime, the switch 181 coupled to the input of receiver 190 will be controlled by scheduler 159 to connect receiver 190 to node D when burst 163 is arriving and to node C when burst 173 is arriving. Thus, the bursts are split between two receivers to share the load.

If step 251 decides that a new upstream channel ID with different channel and/or burst parameters is needed, test 255 is performed to determine if there is also a need to create a new downstream. This decision can be made by any of the methods previously described such as monitoring the number of subscribers being served by the downstream group, monitoring the amount of IP packets sent to CMs one each downstream or to particular CMs, comparing traffic to one CM to the traffic to other CMs on the same downstream and the guaranteed capacity promised to the first CM, etc.

If step 255 decides that a new downstream needs to be created, step 261 is performed where the DMAC creates a new downstream in conventional DOCSIS fashion and sends a downstream channel change message to each CM to be changed to the new downstream. The downstream channel change message tells the CMs which have been changed to the new downstream which upstream to use so remapping of downstreams to a shared upstream is done at this point. Step 261 also represents the process of generating new switch control signals for the downstream mapper 156 in FIG. 5 to change the mapping of transmitter outputs to optical nodes if necessary. The CMs tune to the new downstream and do all the other processing necessary to get into synchronization with the CMTS, as represented by step 259. In other words, step 259 is performed to re-initialize the CMs on the new downstream, if necessary, according to standard DOCSIS processing.

If step 255 decides there is no new downstream needed or after step 259 is performed, step 260 is performed. This step is as previously described and creates the channel and burst parameter data for the new upstream channel ID and sends it to the DMACs in the downstream group. All other processing steps are as previously described to generate and send new UCD messages, switch selected CMs to the new upstream, re-initialize any switched CMs if necessary, and continuing to monitor load balance and communication parameters for further upstream and downstream creation if necessary.

The upstream mapper 158 in FIG. 158 can take many different forms consistent with the teachings herein. For example, it can a plurality of multiplexers, each having multiple inputs coupled to the HFC systems and a single output coupled to the RF input of a DOCSIS upstream receiver, or it can be a simple combiner for each receiver to combine RF signals from multiple HFC systems to one composite RF signal, and coupled to the RF input thereof with switches capable of coupling one or more HFC systems to each combiner. The switching can also be done in the digital domain after the analog-to-digital conversions. Any combination of switches, multiplexers, combiners and splitters can be used. When combiners or splitters are used, it is possible in some embodiments to program one receiver to receive bursts having a first burst profile and to program a second receiver to receive bursts having a second burst profile and to supply bursts of both profiles to the input of each receiver. Each receiver then processes only the bursts having the profile which the receiver has been configured to process and ignores all other bursts.

It is also possible to have two different upstreams in different logical channels during different time intervals on the same physical channel which is coupled to the input of a single receiver. The single receiver then has the proper channel and burst parameters supplied to it by the UMAC processes at the proper times to receive the bursts in each logical channel.

The same considerations apply to downstream mapper and splitter/combiner 156 In short, the structure of the upstream and downstream mappers is not critical, and anything that will work to allow electronic, flexible mapping of downstreams to shared upstreams and changing of the mapping and which allows different optical nodes to be flexibly mapped to different upstream receivers and the addition of additional upstreams and downstreams one at a time with flexible, electronic re-mapping of downstreams to upstreams and optical nodes to upstream receivers will suffice to practice the invention.

In an alternative embodiment, port trunking where multiple upstreams are used to transmit data from the same cable modem is also possible to allow a cable modem to have a large bandwidth upstream where needed. Port trunking in the DOCSIS area is disclosed in U.S. patent application Ser. No. 10/446,511, filed May 28, 2003 and entitled WIDEBAND DOCSIS ON CATV SYSTEMS USING PORT TRUNKING, which is hereby incorporated by reference.

System to Avoid Noise Aggregation on DOCSIS Contention Slots

The system and process described above in FIG. 11 prevent noise aggregation in non contention slots by scheduling bursts from CMs coupled to different optical nodes coupled to the inputs of the same CMTS upstream receiver so that bursts from different optical nodes do not overlap in time (see steps 245 and 247). But when multiple optical nodes are coupled to share the same CMTS upstream receiver but the CMs coupled to different optical nodes are tuned to different downstreams, all the downstreams are coordinated to have their timestamp counter counting the same master clock in the CMTS. This is required (fixed offsets are permissible) so that the MAP messages on the different downstreams define the same upstream ranging contention intervals for all the CMs coupled to all the optical nodes whose upstream share the same CMTS receiver. There are multiple contention intervals in DOCSIS systems. The initial training intervals are contention intervals as are subsequent intervals during which CMs make bandwidth requests. Because the ranging and bandwidth request contention intervals can have bursts from different CMs on different optical nodes arriving at the shared CMTS receiver at the same time, some system is needed to process each burst and not have noise aggregation. This is done by using upstream line cards each with a front end multiplexer or crossbar switch with multiple inputs and multiple outputs, each output having an A/D converter and a dedicated FIFO buffer.

Requirements to Share an Upstream Receiver Among Multiple Downstreams

First, a review of the requirements to share an upstream between multiple downstreams is in order. A CMTS which can transmit multiple downstreams to multiple cable modems all of which share the same upstream has to have certain characteristics. Specifically, there are certain requirements on the downstreams which differ depending upon whether the shared upstream allows synchronous code division multiple access (SCDMA) bursts or not.

If the shared upstream is time division multiplexed only and no SCDMA bursts are allowed, then the only requirements on the downstreams are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible.
2) Each downstream transmitter must transmit sync messages or something equivalent which contain the timestamp counts which the CMs can use to keep a local timestamp counter in each CM "synchronized" to the timestamp counter of the downstream transmitter the CM is tuned to. Synchronized means a proper offset between the timestamp counts exists so that when a CM gets an upstream timeslot or minislot assignment, it can use its timestamp counter to determine the correct time to transmit so that its bursts arrive at the CMTS aligned in time with the boundaries of the assigned timeslots or minislots.
3) Each downstream transmitter must transmit a UCD message or something equivalent which defines the shared upstream in terms of the same parameters, with each UCD message containing the downstream ID of the downstream it is transmitted upon and the upstream ID of the shared upstream.
4) Each downstream transmitter must transmit a MAP message or there must be something which tells the CMs when a ranging contention interval exists when CMs can transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization. The MAP messages must be coordinated so that they all define the same ranging contention interval in the upstream and there is no conflict between the timeslot assignments on the upstream between different CMs.
5) The CMTS must be able to build routing tables for each downstream from information in the ranging bursts or registration messages of each CM. Specifically, if the ranging bursts are used, the CMTS must be able to build the routing table for each downstream from the downstream ID information and the SID or something equivalent which identifies the CM which sent each initial ranging burst so as to automatically determine which CMs are listening to each downstream.

If the upstream allows SCMDA bursts (the following requirements would also work if the upstream allows both SCDMA and TDMA bursts), the requirements are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible.
2) Each downstream transmitter must use the same frequency symbol clock and the same symbol rate and the symbol clocks on all downstreams must be locked in phase.
3) The CMs must each recover the downstream symbol clock of the downstream it is tuned to and synchronize its upstream symbol clock to the downstream symbol clock using an M/N relationship between the frequency and phase of the downstream symbol clock versus the frequency and phase of the upstream symbol clock, where M and N are integers, and the upstream symbol clock is at a frequency suitable to generate spread spectrum bursts. In non DOCSIS systems with suitable range, the symbol clocks on the downstreams could be different but they would have to be harmonically related such that any downstream clock that is different than another downstream clock would have to have a frequency which is an integer multiple of the downstream symbol clock of the other downstream symbol clock(s).

4) Each downstream transmitter must transmit sync messages or something equivalent which contain the timestamp counts which the CMs can use to keep a local timestamp counter in each CM "synchronized" to the timestamp counter of the downstream transmitter in the CMTS to which the CM is tuned. Synchronized means a proper offset between the timestamp counts exists so that when a CM gets an upstream timeslot or minislot assignment, it can use its timestamp counter to determine the correct time to transmit so that its bursts arrive at the CMTS aligned in time with the boundaries of the assigned timeslots or minislots.

5) Each downstream transmitter must transmit a UCD message or something equivalent which defines the shared upstream in terms of the same parameters, with each UCD message containing the downstream ID of the downstream it is transmitted upon and the upstream ID of the shared upstream.

6) Each downstream transmitter must transmit a MAP message or there must be something which tells the CMs when a ranging contention interval exists when CMs can transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization. The MAP messages must be coordinated so that they all define the same ranging contention interval in the shared upstream transmitter and there is no conflict between the timeslot assignments on the upstream between different CMs.

7) The CMTS must be able to build routing tables for each downstream from information in the ranging bursts or registration messages of each CM. Specifically, if the ranging bursts are used, the CMTS must be able to build the routing table for each downstream from the downstream ID information and the SID or something equivalent which identifies the CM which sent each initial ranging burst so as to automatically determine which CMs are listening to each downstream.

A Shared Upstream Receiver Card for Coupling to Multiple Optical Nodes

Figure 13:
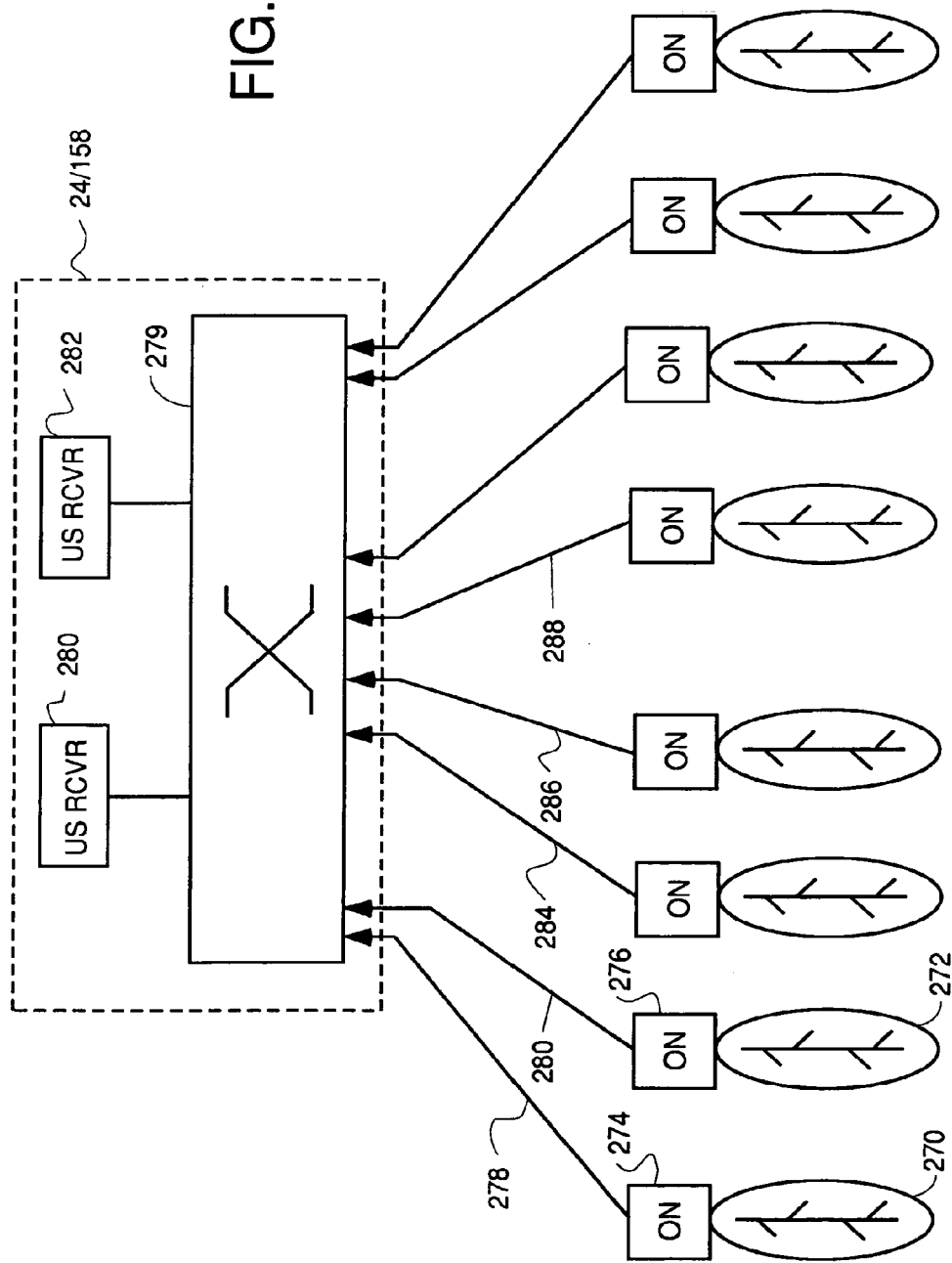
FIG. 13 is a top level diagram showing how multiple HFC systems are coupled through multiple optical nodes to the upstream mapping switch 158 and upstream cards 24 in FIG. 1.

The general concept of how to avoid noise aggregation in DOCSIS contention intervals where multiple downstreams share the same upstream receivers is shown in FIG. 13. FIG. 13 is a top level diagram showing how multiple HFC systems are coupled through multiple optical nodes to the upstream mapping switch 158 and upstream cards 24 in FIG. 1. The coaxial parts of two HFC systems are shown at 270 and 272, each of which is coupled to approximately 500 cable modems in customer homes. Each coaxial portion is coupled to an optical node of which 274 and 276 are typical. Each optical node is coupled by an fiber optic link, of which 278 and 280 are typical, to an input of the upstream circuitry 24/158. The optical signal is converted to an electrical signal before reaching the CMTS. At a top level, the upstream circuitry is comprised of a mapping switch and other circuitry represented by block 278 and several shared upstream receivers shown at 280 and 282.

The function of the circuit 278 is to map multiple upstreams from different optical groups of optical nodes to a shared upstream receiver for the group and to convert the analog signals received from the optical fibers to digital samples that can be processed by the upstream receivers. For example, fiber optic links 278 and 280 may be mapped to the shared upstream receiver 280, while fiber optic links 284, 286 and 288 may be mapped to upstream receiver 282.

Each optical node is also coupled to the downstream circuitry 22 and downstream mapping switch 156 in FIG. 1 (not shown in FIG. 13). If the system of FIG. 13 is time division multiplexed on the upstream, the MAP messages will schedule bursts from different optical nodes so as to not overlap in time (except for contention intervals for training in DOCSIS 1.x). All the downstreams of a group of optical nodes that share an upstream receiver are coordinated so that all the cable modems in the systems that share the same upstream receiver have their upstream minislot counters synchronized via the coordinated timestamps on the downstreams that share the same upstream receiver. Although a separate downstream will be transmitted to each optical node, all the downstreams coupled to optical nodes of a group that share an upstream receiver are coordinated and synchronized so one could think of them as a single downstream even though they each have a unique ID. Because of the synchronization of upstream minislot counters in each group, all the HFC systems in a group that share the same receiver share a pool of upstream minislots. Thus, for two shared receivers 280 and 282 there will be two pools of upstream minislots, each pool being shared by all the CMs in the group that share a receiver.

The anti-noise aggregation method described above for non contention minislots coordinates grants in MAP messages and switching to not aggregate noise. This is done by coordinating the MAP messages sent on the separate downstreams in each group (along with the timing synchronization mentioned above) so that all bursts from a particular optical node in the group are grouped together in time and there is no overlap in time of bursts from different optical nodes in the same group. The switching of the upstream mapping switch 158 in FIG. 1 is then coordinated so that the input of the shared receiver for the group is coupled to the appropriate optical node at the appropriate time to receive bursts from that node. This avoids the aggregation of noise that results when signals from upstream mediums of different HFC systems are summed.

For each upstream group, there will be a separate manager process or thread which coordinates the MAP messages on the downstreams associated with the shared upstream receiver. The downstream switching which couples downstream symbol streams of the various downstreams which share an upstream to various optical nodes can be fixed or configured as a switchboard or patch panel, but preferably is electronically configurable as shown in the embodiment of FIG. 1 so that the upstreams and downstreams in a group can be altered as traffic needs dictate.

Figure 14:
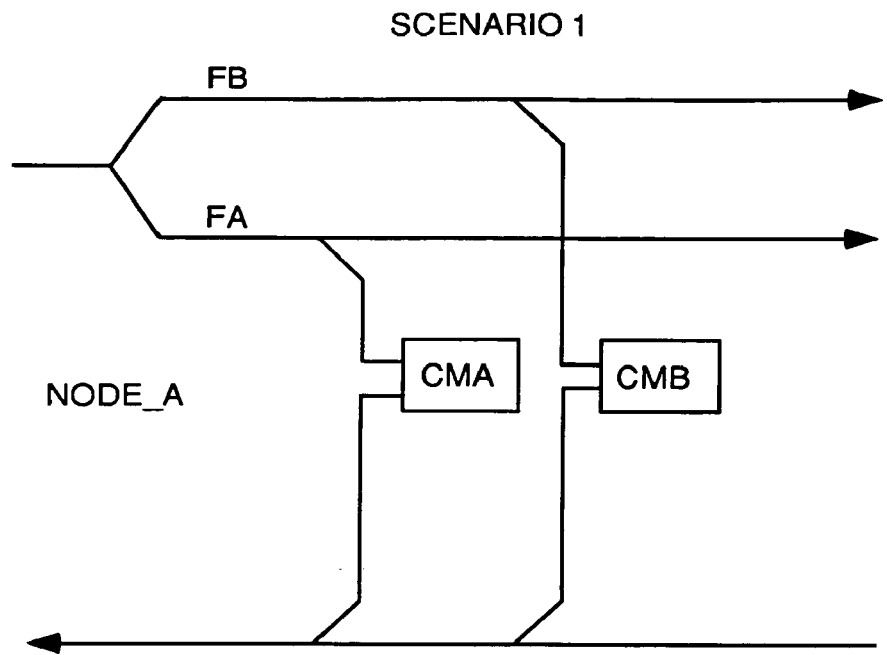
FIGS. 14 and 15 show two different scenarios for multiple downstreams sharing the same upstream.
Figure 15:
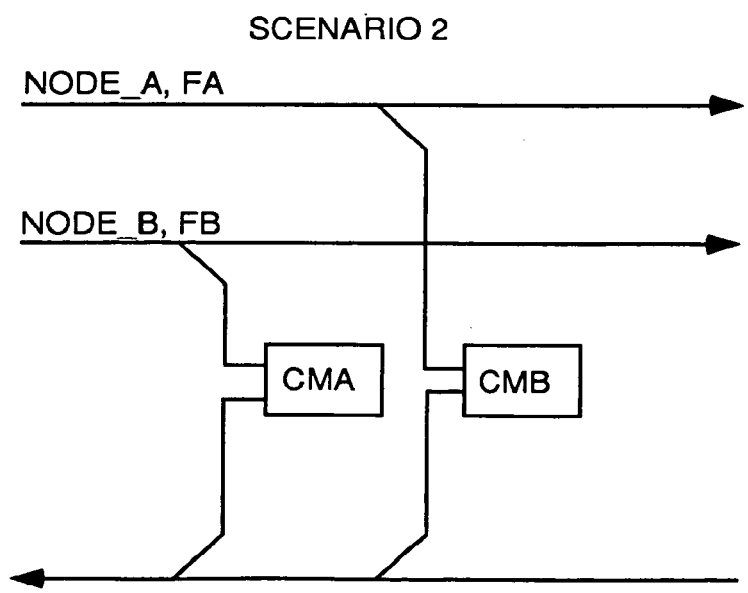

FIGS. 14 and 15 show two different scenarios for multiple downstreams sharing the same upstream. FIG. 14 is a scenario where two separate channels (different center frequencies) are used for two different DOCSIS downstreams coupled to the same optical node with two different cable modems CAa and CMb each tuned to one of the downstreams but sharing a common upstream. FIG. 15 is a second scenario where two separate downstreams are coupled to two different cable modems CMa and CMb through two different optical nodes node_a and node_b, but each of the cable modems share an upstream in the sense that their upstream transmissions will be switched to a common upstream receiver by the upstream mapping circuitry at the CMTS.

Figure 16:
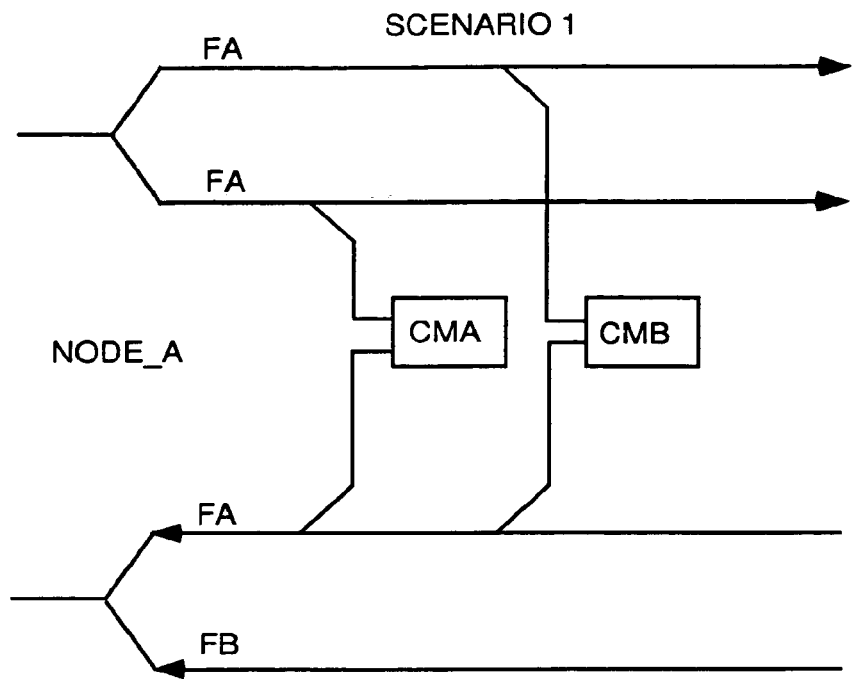
FIG. 16 shows a scenario where multiple upstreams share the same downstream and a common optical node is used.

FIG. 16 shows a scenario where multiple upstreams share the same downstream and a common optical node is used. In FIG. 16, there is a common optical node for both the downstream and the upstream but there are separate logical channels at center frequencies Fa and Fb for the upstreams transmitted from CMs CMa and CMb. Both CMs receive the same downstream having a center frequency Fa.

Figure 17:
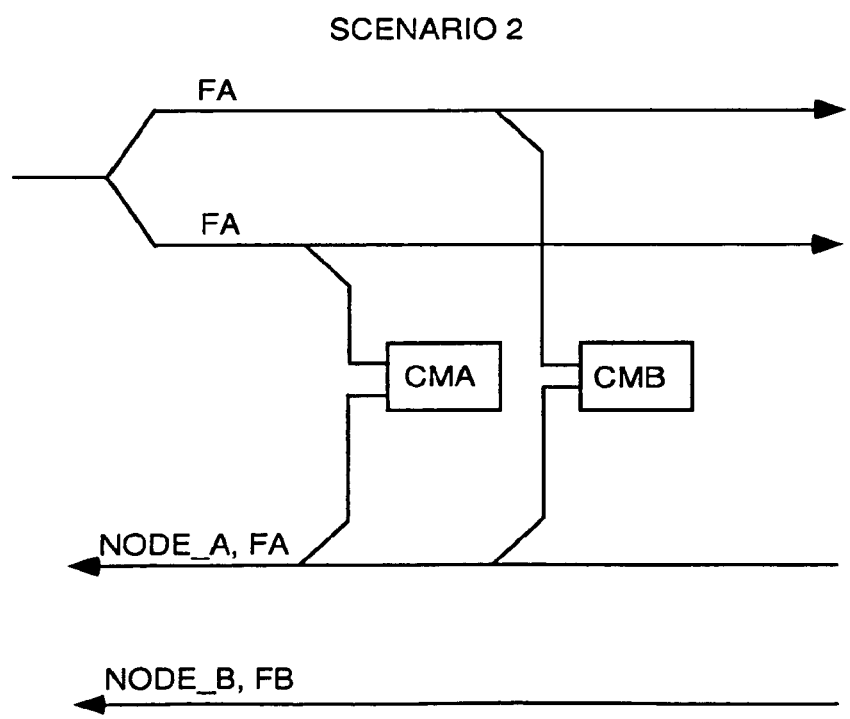
FIG. 17 shows a scenario where multiple upstream share the same downstream and different optical nodes are used.

FIG. 17 shows a scenario where multiple upstream share the same downstream and different optical nodes are used. In FIG. 17, the same downstream on frequency Fa is received by CMs CMa and CMb. The two CMs transmit two different upstreams on frequencies Fa and Fb via optical nodes node_a and node_b.

The teachings of the invention contemplate any apparatus and methodology that can receive one or more bursts from a group of bursts that arrive at a CMTS from different optical nodes. There are two separate subgenera within this genus: one subgenus where multiple bursts arriving simultaneously from different optical nodes during contention intervals can all be received simultaneously; and another subgenus where multiple bursts arriving simultaneously from different optical nodes during contention intervals are sensed, and only one is selected for receiving at any particular time. The others are ignored and the CMs which sent them, having received no response from the CMTS, send them again later. The common characteristics of these two subgenera are that: neither sums the upstream signals from the different optical nodes; each shares an upstream receiver to receive upstream transmissions from different optical nodes; each has a tuner for each of multiple inputs coupled to different optical nodes; and each has A/D conversion and a switching function.

Figure 18:
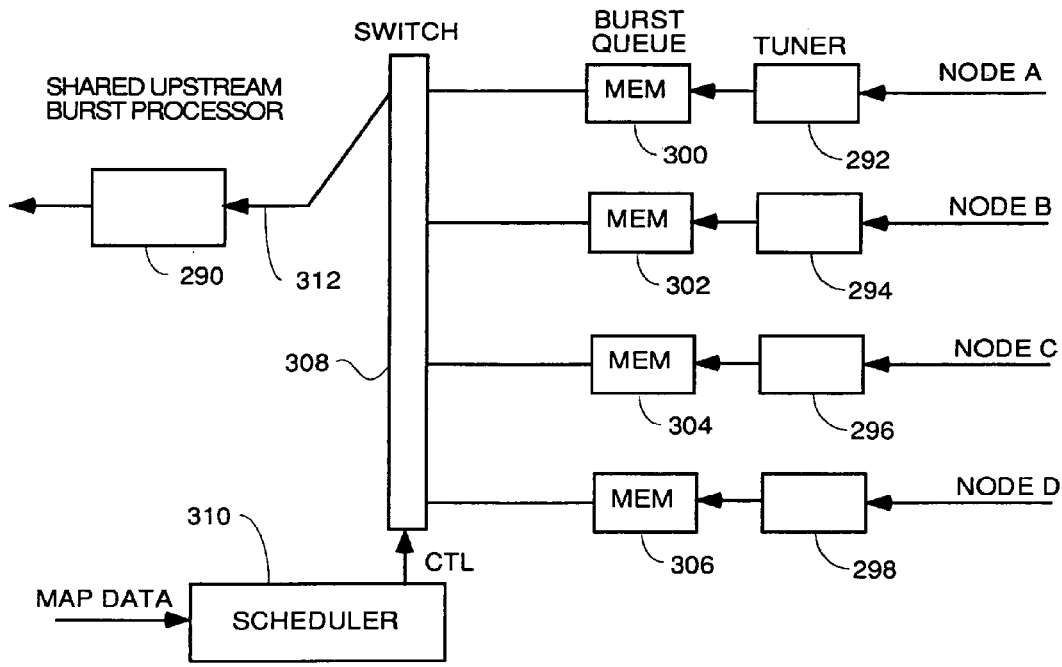
FIG. 18 is a block diagram which defines an important subgenus of upstream receiver cards in which the teachings of the invention to prevent noise aggregation while receiving simultaneously arriving bursts from different optical nodes.

FIG. 18 defines an important subgenus of upstream receiver cards in which the teachings of the invention to prevent noise aggregation while receiving simultaneously arriving bursts from different optical nodes. All species within this genus of upstream receiver cards which can share an upstream receiver and receive multiple bursts that overlap in time during contention intervals must have the hardware components shown in FIG. 18. First, there must be multiple inputs that can be coupled to receive upstream signals from different optical nodes. The inputs marked Node A, Node B, etc. are typical. There can be more or fewer than four, but the capacity to process bursts of the shared upstream burst processor or receiver 290 cannot be exceeded. Also needed are tuners such as 292, 294, 296 and 298 to process the radio frequency upstream signals arriving on the various inputs. The tuners can take various forms such as are described below such as wideband amplification of the entire upstream frequency band by a gain set to make most efficient use of the dynamic range of an A/D converter and filtering out of excessive noise and analog-to-digital conversion. Some species mix the RF signal down to baseband or some IF frequency using information about what channel they are supposed to be tuning and then use a narrow bandwidth passband filter to filter out noise outside the bandwidth of the channel of interest. Some species use analog filters and mixers and local oscillators and some use digital filters, digital mixers and digital local oscillators. In some species, separate A/D converters outside the tuners may be used.

It is necessary in the genus of upstream line cards that can simultaneously receive and store multiple bursts from different optical nodes to have buffer memory that has the capability to simultaneously store the samples of every burst received. In some species, this is implemented by having a separate buffer for each A/D converter. Those buffers are shown at 300, 302, 304 and 306. All that is necessary in this particular genus is to be able to simultaneously store samples from bursts that arrive simultaneously from different optical nodes, and any way this can be accomplished is sufficient to practice this particular subgenus.

A switching function 308 is controlled by scheduler 310 to couple burst samples to shared upstream receiver 290. Many embodiments for DOCSIS upstream receivers are known in the art, and any one of them will suffice for receiver 290. The switch 308 can be a simple one output, multiple input multiplexer. Some species use multiple shared receivers which are fewer in number than the number of inputs. In these species, switch 308 can be a crossbar switch. In some embodiments, the switch can be placed between the tuners and the memories. In some embodiments, the schedular controls the switch 308 based upon MAP information for each of the upstreams that are transmitted through each of the optical nodes that are coupled to a shared receiver. The MAP information defines when the contention intervals for training and upstream bandwidth requests are for each of the HFC systems which share receiver 290 (a plurality of HFC systems which share one or more upstream DOCSIS receivers will hereafter be referred to as a group). Bursts can be transmitted randomly within these contention intervals by the CMs in each HFC system within the group. Each burst is received and sampled as it arrives and stored in the appropriate one of the memories 300 through 306. In some species, the separate memories 300 through 306 can be eliminated and one multiport memory can be substituted with a plurality of address spaces and a plurality of address ports and data ports, each said plurality equal in number to the number of inputs.

The switching function in controlled in the embodiment of FIG. 18 to selectively couple the burst samples from one of the memories 300, 302, 304 or 306 to the input 312 of the shared upstream receiver 290 for processing to recover the data of the burst. In some species, the memories are FIFOs with read and write address pointers which are communicated to the scheduler 310 so that it can keep track of which memory is the most full or close to overflow and select that memory first for output to the shared receiver. In other species, the scheduler 310 can poll the memories to see which ones have data and control the switch 308 to couple the memories that have data to the shared receiver one at a time. In other species, the scheduler 310 sets up a round robin and just gives each memory a time slice to empty its contents to shared receiver 290.

The schedular 310 receives MAP data from the DMAC processes that control the downstreams to the HFC systems in the group that shares receiver 290. The MAP data tells the scheduler when the contention intervals are so that the scheduler can adopt different behaviors during contention intervals than during non contention intervals. During non contention intervals, the MAP data does not schedule overlapping bursts on the upstreams in the group that share receiver 290. Therefore, the scheduler just uses the MAP data for each upstream in the group to control switch 308 to couple each burst to receiver 290 as it arrives. During contention intervals, scheduler 310 adopts the behavior described in the next preceding paragraph to couple the output of one memory at a time to the shared receiver using any one of several different schemes to decide which memory to couple to the shared receiver input at any particular time.

Figure 19:
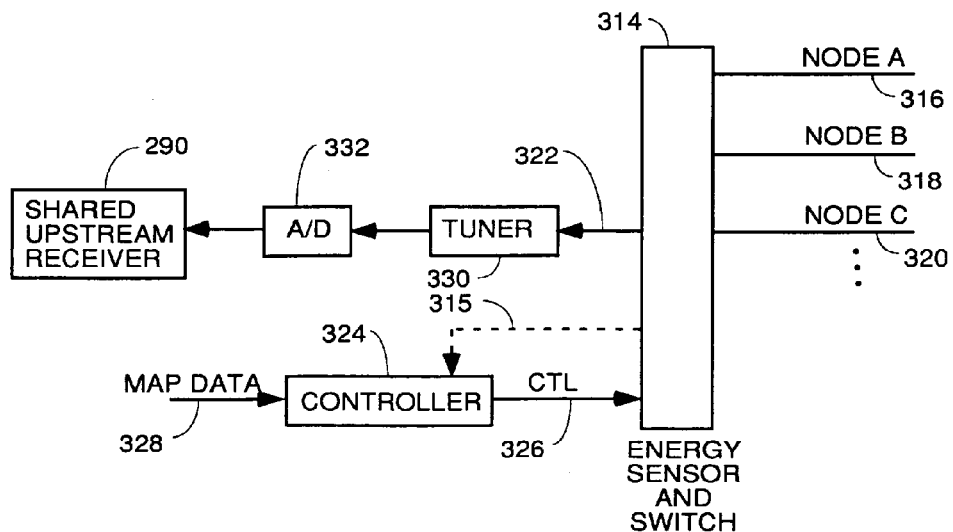
FIG. 19 is a block diagram which defines an important subgenus of upstream receiver cards which do not aggregate noise even though a shared upstream receiver is used and achieve this by energy sensing and receiving only one burst at a time during a contention interval.

The second subgenus using energy sensing to prevent noise aggregation is represented by FIG. 19. In this embodiment, a switch 314 has the ability to couple any one of the inputs 316, 318 or 320 to the output 322 under the control of scheduler 324 and control signals on line 326. Switch 314 has the further ability to sense energy on any one of the inputs during contention intervals and pick one of the inputs for coupling to output 322 without the need for control input from controller 324. Scheduler 324 signals switch 314 via control signals or data on line 326 when the contention intervals are and the switch responds by going into an autonomous mode. Any scheme to select the input to couple to the output can be used such as first-come, first-serve, whichever signal has the best signal-to-noise ratio, whichever signal has the strongest absolute magnitude or some predetermined order of selection in case of simultaneous arrival. The scheduler 324 receives MAP data on line 328 for the upstreams in the group so it knows when the contention intervals are.

Any kind of energy sensing circuitry known in the prior art can be used to detect when a burst is arriving on one of the inputs to switch 314. In alternative embodiments, represented by dashed line 315, the energy sensor circuitry senses energy on the various inputs and sends data to the scheduler/controller 324 indicating which inputs have or are receiving bursts. The scheduler 324 then sends back control signals on signal path 326 telling the switch which input to select and couple to output 322.

The tuner 330, A/D converter 332 and shared upstream receiver 290 are as previously described.

Figure 20:
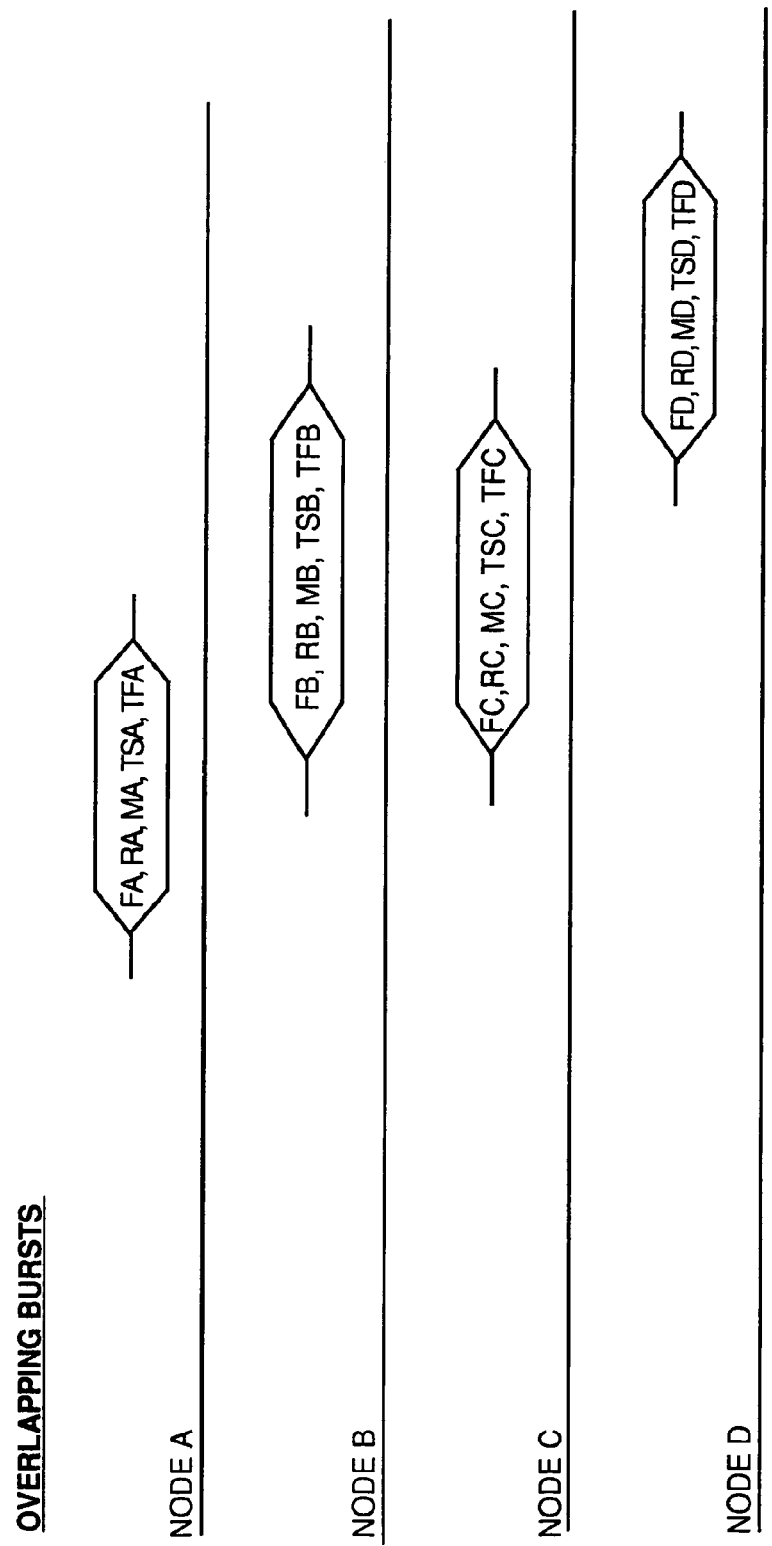
FIG. 20 is a diagram showing how multiple overlapping bursts can arrive from different optical nodes at the inputs of the circuits in FIGS. 18 and 20.

FIG. 20 is a diagram showing how multiple overlapping bursts can arrive during contention slots from different optical nodes at the inputs of the circuits in FIGS. 18 and 20. These bursts can, within limits, be simultaneously received without noise aggregation if the proper upstream linecard circuitry is available at the CMTS.

Figure 21:
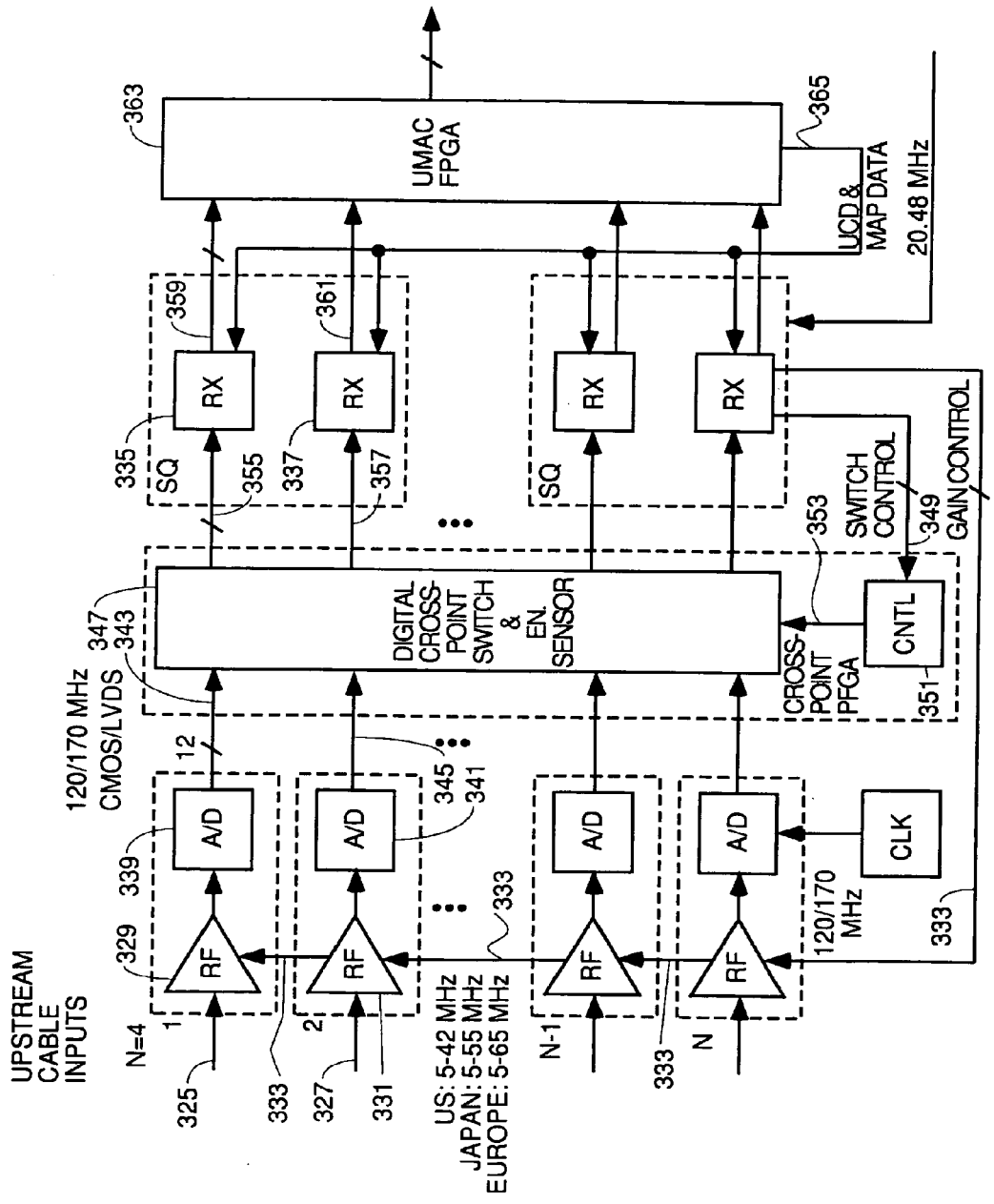
FIGS. 21 and 22 are block diagrams of the preferred and alternative embodiments of upstream line cards which can simultaneously receive multiple overlapping bursts from different optical nodes during contention intervals such as ranging and bandwidth request intervals.
Figure 22:
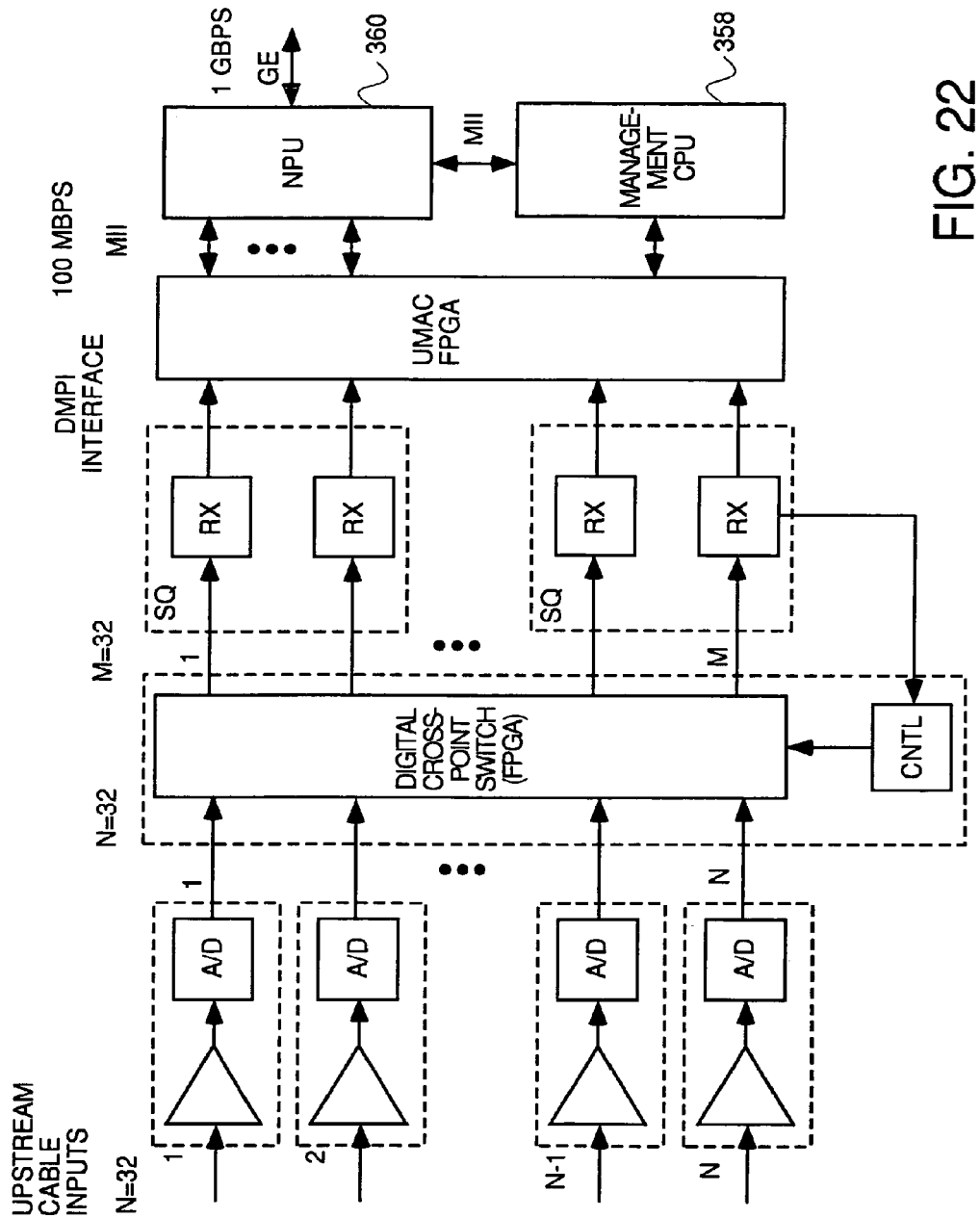

FIGS. 21 and 22 are block diagrams of the preferred and alternative embodiments of upstream line cards which can simultaneously receive multiple overlapping bursts from different optical nodes during contention intervals such as ranging and bandwidth request intervals.

The Sequoia-Based Linecard

Referring to FIG. 21, there is shown a block diagram of one embodiment of a Sequoia PHY receiver-based linecard. In the preferred embodiment, the digital crosspoint switch is implemented in an FPGA. The Sequoia linecard (hereafter, the upstream linecard) is comprised of a plurality of RF inputs (325, 327 typical) for coupling to different optical nodes of different HFC systems. An RF section (329, 331 typical) amplifies the entire upstream frequency band by a gain controlled by gain control data on bus 333 generated by the DOCSIS compatible receivers (335, 337 typical). The output signals from the RF sections are digitized in A/D converters (339, 341 typical) at a sample rate of 120 or 170 MHz depending upon whether the CMTS will be used in the US or Europe to generate a plurality of 12 bit samples of the signal on each RF input. The plurality of output streams output from the A/D converters are supplied as inputs (343, 345 typical) to a digital crosspoint switch 347.

Switching by the digital crosspoint switch 347 is controlled by the PHY receivers by switch control data on bus 349. A control circuit 351 translates the switch control data into signals on path 353 which control which input (343, 345, etc.) is coupled to which output (355, 357, etc.). The outputs are coupled to the inputs of DOCSIS compatible PHY receivers (335, 337 typical). The outputs (359, 361, typical) of the receivers carrying recovered data are coupled to a UMAC FPGA 363.

The UMAC FPGA generates coordinated downstream UCD and MAP messages to coordinate all downstreams that are coupled to CMs coupled to optical nodes that are coupled to inputs 325, 327, etc. (an upstream group). The UMAC process decides from the MAP data which of the receivers 335, 337, etc. is to receive each burst during non contention intervals. The UMAC process then sends the appropriate MAP data for each burst to the receiver which has been assigned to receive it via bus 365. The MAP data includes the upstream minislot at which the burst starts, the length of the burst, the cable modem from which the burst originated (the SID number), the IUC number of the burst (the burst type) and the logical channel number. This information is used to search a lookup table to find the particular RF section at which the burst will be arriving. The contents of the lookup table are written with configuration data which indicates from which optical node the receiver should expect to receive the burst and which input is coupled to each optical node. The information as to the RF section at which the burst will be arriving is used to generate the switch control commands on bus 349 which control operation of the crosspoint switch 347 during normal operation during non contention intervals. In the preferred embodiment, this process of assigning receivers to receive particular bursts and sending the appropriate MAP data to the assigned receiver is carried out in software executed by the management CPU 358 in FIG. 22. In other embodiments, it can be carried out by the FPGA 363 or the entire UMAC process can be carried out in software in a microprocessor including the process of assigning receivers and sending the appropriate MAP data to each receiver. Each receiver also receives the appropriate UCD data for the upstream channel upon which the burst will be arriving along with the IUC burst type so that it can set itself up properly to receive the burst.

Any conventional DOCSIS UMAC process and DOCSIS compatible receiver which is capable of performing the above defined functions will suffice to practice the invention.

Because there are multiple receivers, multiple simultaneously arriving bursts from different optical nodes can be simultaneously received up to the point where all PHY receivers are consumed processing a burst. The PHY receivers receive DOCSIS UCD and MAP message data from the UMAC process on bus 365. The MAP data tells each receiver when each burst is scheduled from each optical node during non contention intervals, and tells the receivers when the contention intervals are. However, the MAP data does not tell the receivers when bursts will be received from each optical node during contention intervals. However, since multiple PHY receivers are available, multiple simultaneous bursts from different optical nodes that arrive during contention intervals can be simultaneously received if the crosspoint switch goes into an autonomous mode and senses energy on its inputs and finds an available output to which to couple the burst.

FIG. 22 is a block diagram of another embodiment for a linecard using a digital crosspoint switch. In embodiments described below which make use of energy sensing to avoid noise aggregation, the crosspoint switch includes an energy sensor, but there is no need for an energy sensor in embodiments where noise aggregation is present by summing inputs. In this embodiment, a management CPU 358 and an NPU 360 are added to communicate with the UMAC FPGA. The management CPU is based upon a Motorola MPC8270 running at 450 MHz and handles the DOCSIS ranging and bandwidth request protocols and MAP message generation. The UMAC FPGA handles the DMPI interface, DES encryption and CRC/HCS checking. The NPU handles the GMII interface, concatenation, fragmentation, payload header suppression/ expansion, MIB counters, media access control management and upstream bandwidth request queues for the management CPU and handles priority queuing. Since the only aspect of the invention which involves these circuits is how the UCD and MAP messages are coordinated to allow sharing of upstream receivers without noise aggregation, more detail about their programming is not necessary. The nature of the coordination of UCD and MAP messages of both these embodiments is as discussed previously herein.

Figure 23:
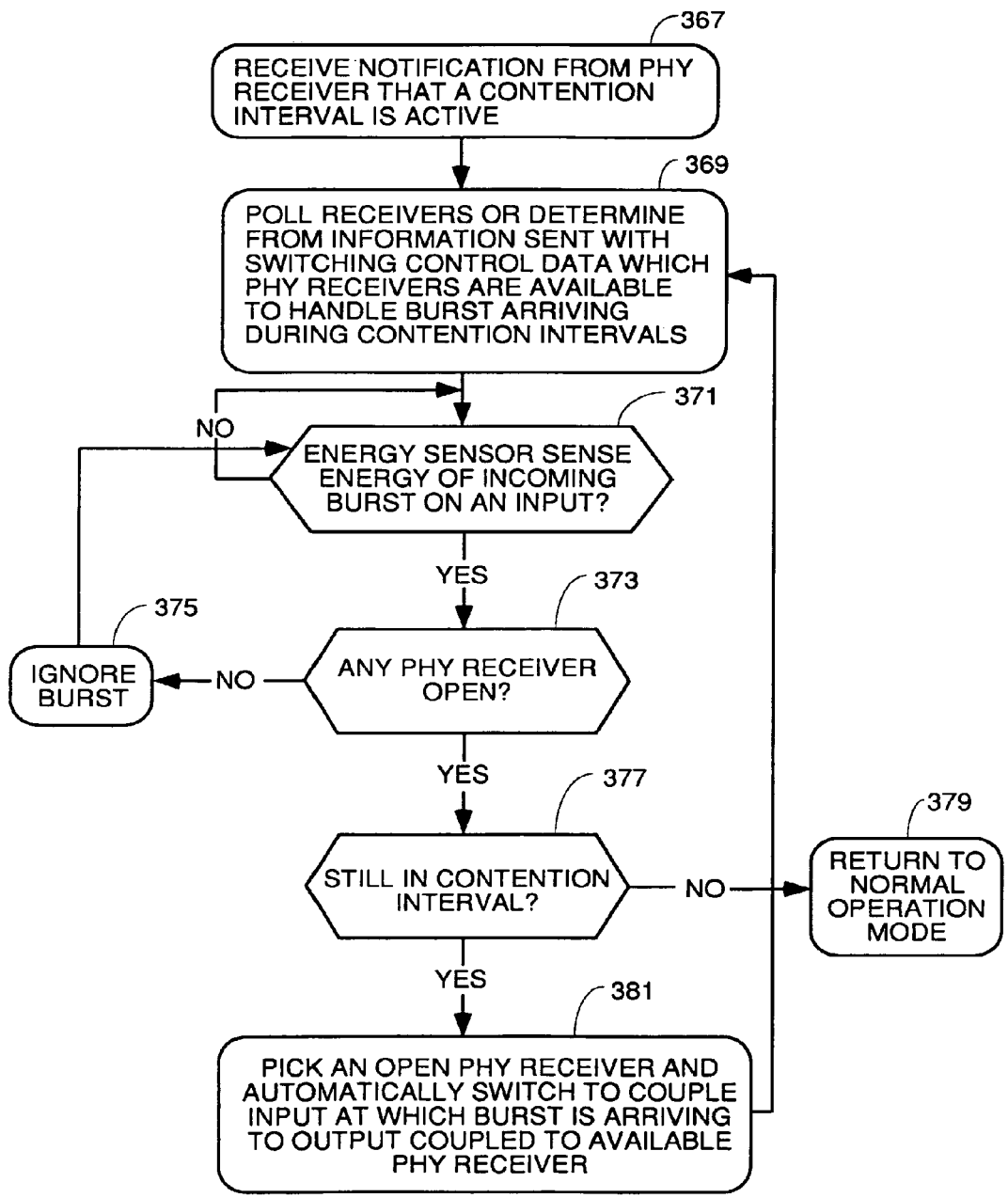
FIG. 23 is a flowchart of one embodiment for a process carried out by the crosspoint switch during contention intervals to couple incoming simultaneous bursts to an available PHY receiver.

FIG. 23 is a flowchart of one embodiment for a process carried out by the crosspoint switch during contention intervals to couple incoming simultaneous bursts to an available PHY receiver. Step 367 represents the process of receiving notification that a contention interval is active. In the preferred embodiment, that notification comes from the PHY receivers via bus 349 because the PHY receivers receive the MAP data via bus 365 from the UMAC FPGA 363 and know from this data when the contention intervals are scheduled. The PHY receivers then send appropriate switching commands on bus 349 to control switching by the crosspoint switch 347 during non contention intervals and sends data on bus 349 indicating to the crosspoint switch when a contention interval starts and stops. In alternative embodiments, this information on bus 349 can be supplied by the UMAC process 363. The reason step 367 is performed is because the crosspoint switch acts differently during contention intervals than it does during non contention intervals. During non contention intervals, the PHY receivers know from the MAP message data on bus 365 when each burst from each optical node will be arriving. The PHY receivers then control the crosspoint switch according to these burst arrival times to coupled each scheduled bursts to a PHY receiver that will handle it. However, during contention intervals, nobody knows when the bursts will be arriving from the various optical nodes. During these intervals, the crosspoint switch must (in this non noise aggregation class of embodiments at least) sense when a burst is coming in, find a receiver to handle it and connect the burst to that receiver.

Step 369 represents the process of determining in the crosspoint switch which receivers are available to process bursts during the contention interval. In the preferred species within this class of embodiments, each PHY receiver sends data or a control signal on bus 349 to indicate whether or not it is available. In an alternative embodiment, the crosspoint switch polls the PHY receivers to determine which ones are available to handle bursts. In some embodiments, step 369 can be eliminated in favor of step 373 reading in real time the availability data from each of the receivers. In alternative embodiments, step 369 can be the process of reading the availability data from the receivers and constructing a table or database, and step 373 can be the process of updating the table or database as the availability information changes and then reading the table to find an available receiver, if any.

Test 371 determines if an energy sensor coupled to the inputs of the digital crosspoint switch 347 has sensed any incoming energy of a burst on any input. If not, the process idles in a loop performing test 371 multiple times until an incoming burst is sensed. When energy is sensed, test 373 is performed to determine if there is any PHY receiver available to receive the incoming burst. When any PHY receiver is processing a burst, it changes the data it outputs to the crosspoint switch to indicate it is not available. If there is no available PHY receiver, step 375 is performed and the incoming burst is ignored, and processing flows back to test 371 to repeat it. If a receiver is available to process the burst, test 377 is performed to determine if the contention interval is still active. In the preferred embodiment, step 377 is accomplished by reading information sent to said crosspoint switch on bus 365 by a PHY receiver which indicates when said contention interval starts and when it stops or when said contention interval starts in terms of an upstream minislot number and the duration in minislots of said contention interval.

If the contention interval is not still active, processing returns to normal operation as symbolized by step 379 where the PHY receivers send switching commands to control the crosspoint switch to couple the incoming burst to whatever receiver is assigned to process it.

If test 377 determines that the contention interval is still active, step 381 is performed to pick an available PHY receiver and automatically switch to couple the input at which the burst is arriving to the output port to which the available PHY receiver is coupled. Processing then returns to step 369 to make a fresh determination of which PHY receivers are available to handle incoming bursts. The process of FIG. 23 goes on simultaneously for each of the inputs to the crosspoint switch or it occurs as a subroutine consisting of steps 369 through 381 which are called each time a polling routine polls one of the inputs.

Figure 24:
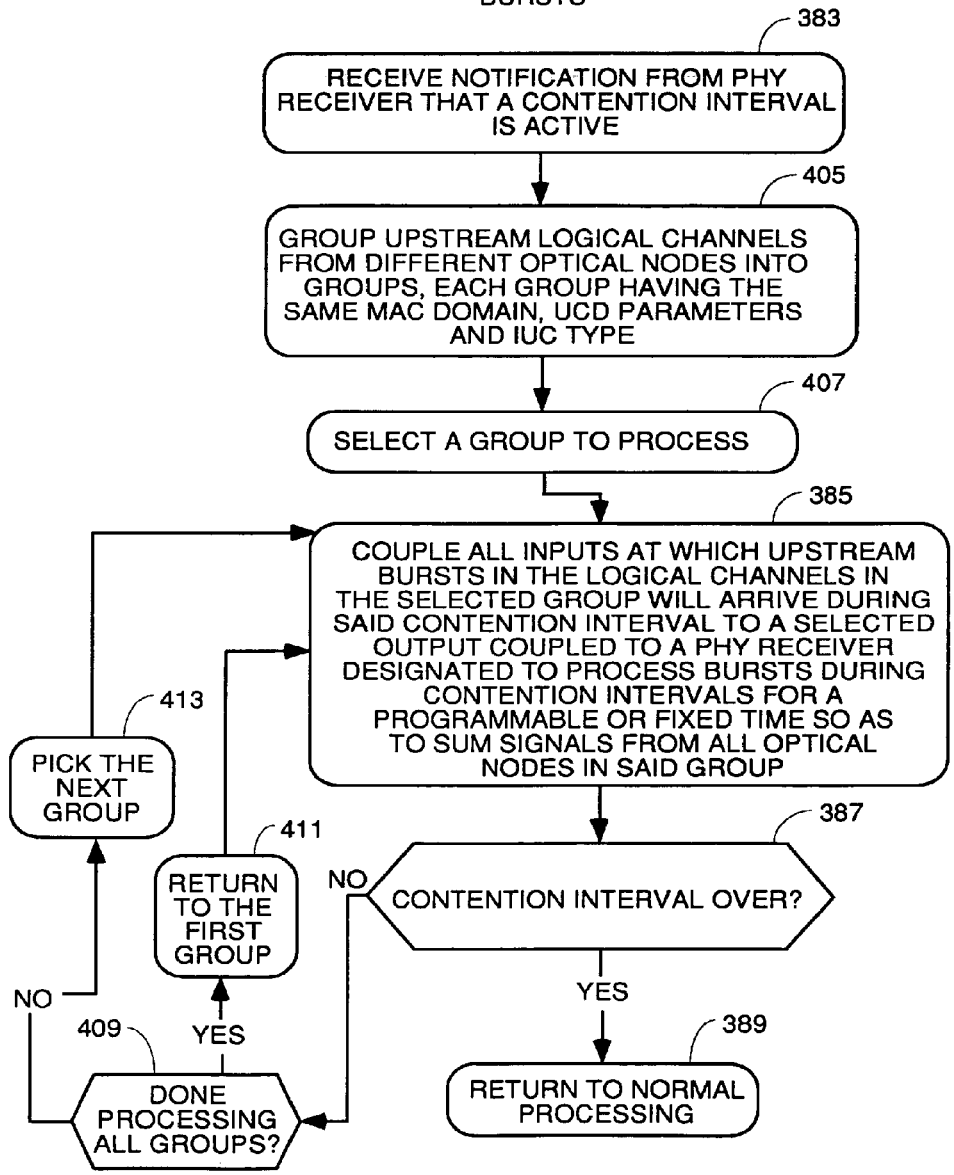
FIG. 24 is a flowchart of an alternative noise aggregating embodiment for receiving bursts in a shared upstream receiver CMTS environment using a front end crosspoint switch.

FIG. 24 is a flowchart of an alternative noise aggregating embodiment for receiving bursts in a shared upstream receiver CMTS environment using a front end crosspoint switch. Summing of upstream logical channels during contention intervals can only be done for upstream logical channels that are in the same MAC domain and have the same UCD (channel parameters such as symbol rate, modulation type, etc.) and IUC type (type of burst, e.g., request for bandwidth, training). A MAC domain is like an address space for the media access control process where the address space is made up of service identifiers or SIDs (modem IDs basically).

Step 383 represents the process of receiving notification from the PHY receiver(s) that a contention interval is active. In step 405, the upstream logical channels are grouped into groups, each group having the same MAC domain and the same UCD parameters and the same IUC. In step 407, a group to process is selected. These steps 405 and 407 are typically performed in a PHY receiver which has been assigned to process bursts during a contention interval because it has the UCD and MAP information, but it could also be performed in the UMAC process by the FPGA or management CPU or, in some embodiments, it could be done by the crosspoint switch if it has processing capability such as an embedded microprocessor and has been supplied with UCD and MAP information. In those embodiments, the PHY receiver does not have to send information to the crosspoint switch as to when the contention intervals are. The upstream logical channels in each group are then used to look up the inputs of the crosspoint switch to which each upstream logical channel in each group are coupled. This information is stored in a lookup table which is configured with data indicating which inputs are coupled to which optical nodes when the crosspoint switch is installed. Since the upstream logical channels are mapped to specific optical nodes, they can be mapped to specific inputs, and this information is then written into the lookup table or database. The lookup table can be stored in the PHY receivers, the UMAC process or the crosspoint switch in various embodiments. Ultimately, the inputs in a selected group will be coupled to a particular output, so switching commands can be sent to the crosspoint switch after the table lookup from the PHY receivers or from the UMAC FPGA or the crosspoint switch can give itself switching commands during contention intervals after it does its own lookup.

In step 385, the crosspoint switch does switching according to commands it issues itself or gets from the PHY receivers or the UMAC process (depending upon the embodiment). This switching couples all inputs at which upstream bursts on different logical channels in the group will be arriving from different optical nodes to an output port coupled to whichever PHY receiver is selected to process the bursts received during the contention interval for a programmable or fixed time. This sums all the upstream signals from all the logical channels in the group at the input of the PHY receiver and will aggregate the noise. However, since the simple QPSK constellation is used in DOCSIS for contention interval bursts, higher noise can be tolerated. The PHY receiver will only be able to process bursts received during the contention interval which do not collide with another burst arriving simultaneously.

Step 387 determines from information received from the PHY receivers (or from MAP data received by the crosspoint switch from the UMAC process in some embodiments) whether the contention interval is over. If not, processing proceeds to step 409 where it is determined if all groups have been processed. If yes, processing proceeds to step 411 to return to the first group and then processing returns to step 385. If not all groups have been processed, step 413 is performed to pick the next group, and processing returns to step 385. If step 387 determines the contention interval is over, processing returns to normal mode, as symbolized by step 389.

It is a waste of resources to assign one receiver to process all bursts during contention intervals if more receivers are available. In addition, it slows down the system's operation since cable modems that transmit training bursts or bandwidth request bursts and which receive no response assume a collision occurred or the burst was not received and transmit the burst again. When that happens, the modem has not made any progress toward its goal. Further, even though QPSK is being used, when all the optical node upstream signals are added together, the noise level is higher than it needs to be where there are additional receivers available to apportion the load.

Figure 25:
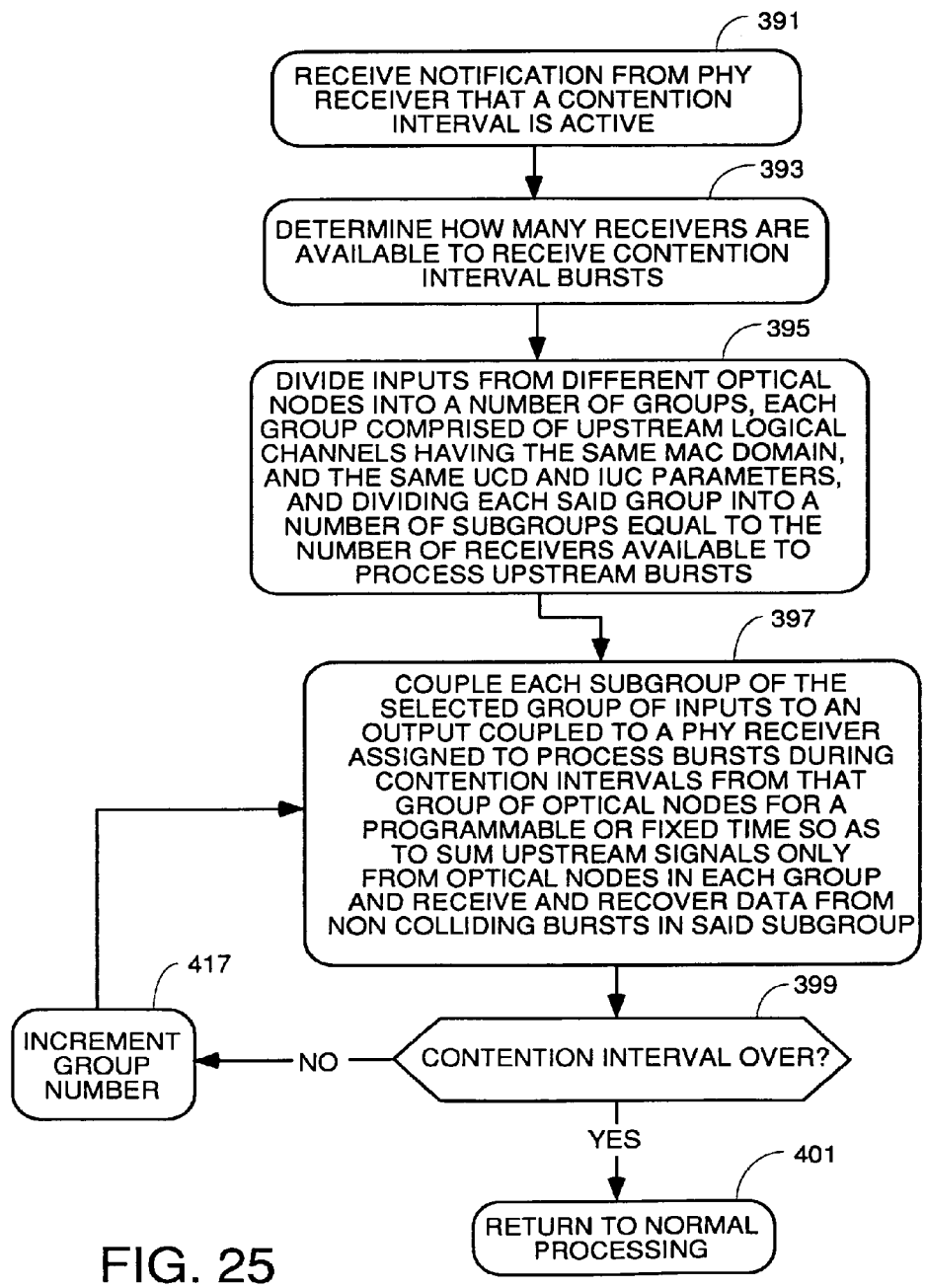
FIG. 25 represents the preferred noise aggregation process to receive contention interval bursts and represents a divide and conquer approach.

Accordingly, FIG. 25 represents the preferred noise aggregation process to receive contention interval bursts and represents a divide and conquer approach. In step 391, the crosspoint switch receives notice from the PHY receiver(s) that a contention interval is active. In step 393, which is optional, the crosspoint switch determines how many receivers are available to receive contention interval bursts. This step is optional since the crosspoint switch may be informed by configuration data how many PHY receivers are present and may assume in some embodiments, that all PHY receivers present are available to process contention interval bursts. In some embodiments however, PHY receivers may be added to the line card as needed in a modular form, so step 393 is performed to determine at the particular time of the contention interval in question how many PHY receivers are present. Step 395 represents the process of first dividing the upstream logical channels coming from the optical nodes to which the inputs of the upstream linecard are coupled into one more groups, each group comprised of logical upstreams that have the same MAC domain and the same UCD parameters and the same IUC burst type. Then, each group is further subdivided into a number of subgroups that is equal to the number of receivers available to process upstream bursts.

In step 397, each subgroup of the selected group has the inputs at which are received the logical channels of said subgroup coupled through said crosspoint switch to an output to which is coupled the input of one of the available PHY receivers for a programmable or fixed time. This has the effect of summing the upstream logical channels from only the optical nodes in each subgroup at the input of the PHY receiver assigned to receive upstream bursts during the contention interval from that group. The receivers then process bursts from only the subgroup that is summed at the input, and, as long as there is no collision within the subgroup, the data of the burst will be recovered. However, bursts within the subgroup which are summed and collide are ignored. This causes the cable modems which sent the colliding bursts to try again later. Only non colliding bursts in each subgroup can be processed by the receiver assigned to that subgroup.

Step 399 determines if the contention interval is over. If not, processing proceeds to step 417 where the group number is incremented. Then step 397 is performed again to couple the inputs of each subgroup within the newly selected group to an output coupled to a PHY receiver assigned to process that subgroup's contention interval bursts for a programmable or fixed time, and data from non colliding bursts from CMs in the subgroups is recovered. Thereafter, step 399 is performed again and step 417 is performed again and processing is vectored back to step 397 in a loop until the contention interval is over.

When step 399 determines the contention interval is over, processing returns to normal non contention interval processing, as represented by step 401. In normal processing, scheduled bursts are coupled without noise aggregation to inputs of specific receivers assigned to process them.

Figure 26:
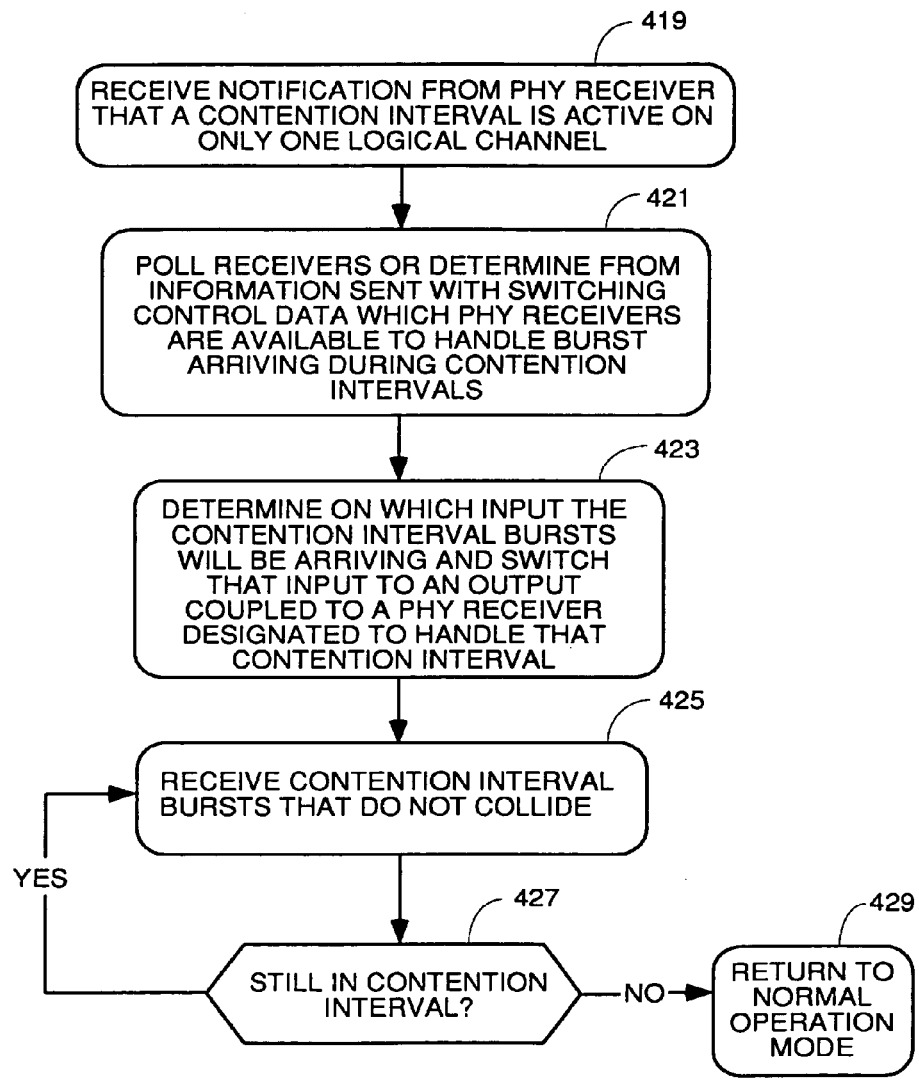
FIG. 26 is a flowchart of the process of receiving contention interval bursts from a single logical channel without noise aggregation.

FIG. 26 is a flowchart of a process carried out in the line card during contention intervals to receive contention bursts using a single receiver. In this process, the key feature is that the MAP messages are coordinated by the UMAC process such that contention intervals are active on only one logical channel at any particular time. Step 419 represents the process of determining that a contention interval is active. This can be by receiving notification at the crosspoint switch from the PHY receivers who get the MAP data. In alternative embodiments, the MAP data can be sent directly to the crosspoint switch from the UMAC process in addition to the PHY receivers. Step 419 also represents the process of determining upon which logical channel the contention interval is active since the UMAC process coordinates MAP messages for all the upstream logical channels such that contention intervals are scheduled for each upstream logical channel so as to not overlap in time, or, if they do overlap in time, there are no more overlapping contention intervals than there are available PHY receivers to receive contention bursts during these contention intervals. In other words, if there are four receivers, up to four logical channels on four different inputs to the crosspoint switch can have their contention intervals scheduled so as to overlap.

Step 421 polls the receivers or determines from information sent to the crosspoint switch from the receivers which PHY receivers are available to process bursts arriving during the contention intervals. Step 423 determines upon which input or inputs contention bursts during the active contention intervals will be arriving. When there is only one receiver, only one contention interval on one logical channel and one input will be active. If there are four receivers, as many as four contention intervals can be active simultaneously but only on four logical channels coming from four different inputs of the crosspoint switch. Step 423 also switches the crosspoint switch such that each input at which contention bursts will be arriving during an active contention interval is coupled to an input of a PHY receiver.

Step 425 represents receiving non colliding contention bursts during the contention interval using the receiver(s) that are coupled to the logical channels upon which contention intervals are active. Steps 427 and 429 represent the process of continuing to receive contention bursts until the contention interval is over and then returning to normal operation mode.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A method for receiving DOCSIS upstream bursts during contention intervals in an upstream linecard in a cable modem termination system having one or more PHY receivers, said upstream linecard coupled to a plurality of optical nodes, said reception carried out without aggregation of noise, comprising the steps:
   (1) determining when a DOCSIS contention interval exists;
   (2) determining how many PHY receivers are available during said contention interval to receive upstream DOCSIS bursts from said plurality of optical nodes;
   (3) sensing energy of incoming DOCSIS bursts at inputs of said upstream linecard coupled to said optical nodes;
   (4) determining if any PHY receiver is available to receive a DOCSIS burst which is creating said energy which was sensed;
   (5) if no PHY receiver is available to process a burst whose energy was sensed, ignoring said burst;
   (6) if a PHY receiver is available to process the incoming burst whose energy is being sensed and said contention interval is still occurring, picking an available PHY receiver and switching a crosspoint switch to coupled an input at which is arriving said burst whose energy was sensed to an output coupled to said available PHY receiver.

2. The method of claim 1, wherein step (6) further comprises:
   if said contention interval is not still occurring, returning to normal operation wherein the burst which is arriving is known via DOCSIS MAP data and said crosspoint switch is switched so as to couple said burst to an output to which is coupled a PHY receiver which has been assigned to receive it,
   and wherein step (1) is carried out by receiving information from one or more PHY receivers in an upstream line card indicating when DOCSIS contention intervals start and stop in a plurality of DOCSIS upstreams from a plurality of optical nodes all of which are coupled to and upstream group comprising one or more shared upstream receivers and further comprising the step of sending DOCSIS MAP data for at least said upstream group from an upstream media access control process to one or more PHY receivers which are assigned to process upstream bursts from said upstream group, said MAP message data indicating when contention intervals are in said group.

3. The method of claim 1 wherein step (1) is carried out by receiving DOCSIS upstream MAP message data pertaining to a plurality of DOCSIS upstreams from a plurality of optical nodes all of which are coupled to an upstream group comprising one or more shared upstream receivers, said MAP message data indicating when contention intervals are in said group.

4. The method of claim 1 wherein step (2) is carried out by polling said receivers to determine which receivers are available to receive upstream bursts during contention intervals.

5. The method of claim 1 wherein step (2) is carried out by receiving information from said receivers which indicates which receivers are available to receive upstream bursts during contention intervals.

6. The method of claim 1 wherein step (2) further comprises the step of constructing a table or database of receiver availability from availability information sent by the receivers, and wherein step (4) further comprises the step of updating the table or database built by step (2) with the latest availability information and then reading said table to find an available receiver, if any, and further comprising a step for building a mapping table using a discovery process carried out during contention intervals using reception of IUC 3 and IUC 4 bursts, said mapping table containing entries which associate each cable modem with an input to said switch at which upstream bursts from said cable modem will arrive.

7. The method of claim 1 wherein step (6) is accomplished by reading information sent to said crosspoint switch by a PHY receiver which indicates when said contention interval staffs and when it stops or when said contention interval staffs in terms of an upstream minislot number and the duration in minislots of said contention interval.

8. The method of claim 6 wherein step (7) is accomplished by the crosspoint switch reading the receiver availability table after it has been updated with the latest information on availability sent by said receivers and, if a receiver is available, automatically switching the input at which energy has been sensed to couple said input to an output of said crosspoint switch to which said available receiver is coupled.

9. The method of claim 2 wherein normal operation of step (6) is accomplished by performing the following steps:
   (A) generating DOCSIS UCD and MAP messages contain Information Element data in an upstream media access control process and sending said UCD and MAP messages downstream to said cable modems, said MAP message data defining when each cable modem coupled to an optical node can transmit and what type of burst it can transmit during DOCSIS non contention intervals;
   (B) examining said Information Element data to determine when each burst will be arriving from each optical node during non contention intervals;
   (C) for each burst, determining receiver availability and picking a receiver to process said burst;
   (D) sending MAP data and UCD data pertaining to each burst to the receiver to which said burst has been assigned;
   (E) in each said receiver which has been assigned to process a burst and which has received pertinent MAP and UCD data, setting up to process said burst and using said MAP data to search a lookup table which indicates upon which RF section said burst will be arriving and using said MAP data regarding when said burst will be arriving and data found from said lookup table to generate a switch control command or data for said crosspoint switch which will cause said crosspoint switch to couple at an appropriate time an input at which said burst will be arriving to an output to which said receiver is coupled such that sample data of said burst reaches said receiver.

10. An upstream linecard apparatus, comprising:
   means for determining when a DOCSIS contention interval exists;
   means for determining how many PHY receivers are available during said contention interval to receive upstream DOCSIS bursts from said plurality of optical nodes;
   means for sensing energy of incoming DOCSIS bursts at inputs of said upstream linecard coupled to said optical nodes;

means for determining if any PHY receiver is available to receive a DOCSIS burst which is creating said energy which was sensed;

means for ignoring said burst whose energy was sensed if no PHY receiver is available to process said burst;

means for determining if the contention interval is still occurring if a PHY receiver is available and energy of an incoming burst during a contention interval is sensed;

means for picking an available PHY receiver and switching a crosspoint switch to coupled an input at which is arriving said burst whose energy was sensed to an output coupled to said available PHY receiver if a contention interval exists, a PHY receiver is available and energy of an incoming burst is sensed and for sampling said burst to digitize it, processing said samples and recovering data encoded in said burst; and means for returning to normal operation when no contention interval is active wherein any burst which is arriving during a non contention interval is known via DOCSIS MAP data and said crosspoint switch is switched so as to couple said burst to an output to which is coupled a PHY receiver which has been assigned to receive it and for receiving digital samples of said burst and recovering data therefrom.

11. A method for receiving DOCSIS upstream bursts during contention intervals in an upstream linecard in a cable modem termination system having one or more PHY receivers, said upstream linecard coupled to a plurality of optical nodes in one or more hybrid fiber coaxial cable systems and wherein each cable modem for a group of cables belongs to an upstream logical channel, comprising the steps:

(1) determining when a DOCSIS contention interval exists;

(2) responding to start of a DOCSIS contention interval by grouping upstream logical channels from different optical nodes into groups, each group having the same MAC domain and the same UCD and IUC type;

(3) selecting a group to process;

(4) switching a switch to couple each input coupled to a hybrid fiber coaxial cable system optical node in said selected group to an output coupled to a DOCSIS compatible PHY receiver for a fixed or programmable time so as to sum all upstream signals from said optical nodes in said group;

(5) determining if the contention interval is over;

(6) receiving upstream bursts from cable modems in said group and which do not collide, and for determining if all groups have been processed during said contention interval and attempting to process each group during said contention interval to receive non colliding bursts from each group in turn; and (7) if step 5 determines the contention interval is over, returning to normal processing.

12. An apparatus comprising:

means for determining when a DOCSIS contention interval exists;

means for responding to start of a DOCSIS contention interval by grouping upstream logical channels from different optical nodes into groups, each group having the same MAC domain and the same UCD and IUC type;

means for selecting one of said groups to process;

means for switching a switch to couple each input coupled to a hybrid fiber coaxial cable system optical node in said selected group to an output coupled to a DOCSIS compatible PHY receiver for a fixed or programmable time so as to sum all upstream signals from said optical nodes in said group, and for receiving any upstream burst which does not collide with another burst and recovering data therefrom;

means for receiving any upstream burst during said contention interval which does not collide with another burst and recovering data therefrom and attempting to receive upstream bursts from each logical group in turn during said contention interval; and means for carrying out normal processing to receive and recover data from scheduled bursts from said optical nodes without noise aggregation during non contention intervals.

13. A method comprising the steps:

(1) determining when a DOCSIS contention interval exists;

(2) responding to start of a DOCSIS contention interval by determining how many PHY receivers are available to receive bursts during said contention interval;

(3) dividing upstream logical channels received at inputs of an upstream line card into one or more groups, each group of upstream logical channels having the same MAC domain, UCD type and IUC type, and then dividing each group into a number of subgroups equal to the number of PHY receivers available to process bursts from cable;

(4) coupling inputs at which are received upstream logical channels of each subgroup of a selected group to an output of a crosspoint switch which is coupled to one of said available receivers assigned to receive bursts from said subgroup for a fixed or programmable time, and receiving digital samples of bursts and recovering data from non colliding bursts of said subgroup and ignoring colliding bursts within said subgroup;

(5) attempting to receive non colliding bursts from cable modems in other groups during said contention interval.

14. An apparatus comprising:

means for determining when a DOCSIS contention interval exists;

means for responding to start of a DOCSIS contention interval by determining how many PHY receivers are available to receive bursts during said contention interval;

means for dividing upstream logical channels received at inputs of an upstream line card into one or more groups, each group of upstream logical channels having the same MAC domain, UCD type and IUC type, and then dividing each group into a number of subgroups equal to the number of PHY receivers available to process bursts from cable;

means for coupling inputs at which are received upstream logical channels of each subgroup of a selected group to an output of a crosspoint switch which is coupled to one of said available receivers assigned to receive bursts from said subgroup for a fixed or programmable time, and receiving digital samples of bursts and recovering data from non colliding bursts of said subgroup and ignoring colliding bursts within said subgroup;

means for determining whether said contention interval is over, and, if not, incrementing the group number and repeating step (4) and this step (5) until it is determined that said contention interval is over, and when said contention interval is over, returning to normal processing.

15. An upstream linecard comprising:

a plurality of RF amplifier sections, each having an input for coupling to an optical node of a hybrid fiber coaxial cable system and an output each having an gain control input;

a plurality of analog-to-digital (A/D) converters, each having an input for receiving amplified signals from said output of an RF amplifier section, and each having a sample output;

a digital crosspoint switch having a plurality of inputs and one or more outputs, each said input coupled to an output of one of said A/D converters, and having a switch control input, for switching so as to couple one or more inputs to an output under control of data or signals received at said switch control input;

one or more DOCSIS compatible receivers, each having an input coupled to an output of said crosspoint switch, and each having a switch control output coupled to said switch control input of said crosspoint switch, and each having a UCD and MAP data input for receiving DOCSIS UCD and MAP data for upstream logical channels coupled to said plurality of RF amplifier sections, and each having a gain control output coupled to a gain control input of an RF amplifier section, each said receiver functioning to generate switch control signals which control switching of said crosspoint switch based upon said MAP data such that scheduled bursts during non contention intervals get coupled to an input of a PHY receiver during non contention intervals such that said receiver recovers data encoded in said burst-without noise aggregation caused by summing of signals of more than one said upstream logical channel sharing a PHY receiver, and for causing said crosspoint switch to go into contention mode processing when contention intervals occur so as to receive contention burst transmitted during contention intervals on one or more upstream logical channels coupled to one or more inputs of said crosspoint switch.

16. A method for receiving DOCSIS upstream bursts during contention intervals and non contention intervals in an upstream linecard in a cable modem termination system having one or more PHY receivers, said upstream linecard coupled to a plurality of optical nodes, comprising the steps:

(1) determining when a DOCSIS contention interval exists;

(2) when a contention interval is occurring, for a switch having at least one output coupled to a PHY receiver and having a plurality of inputs coupled to a plurality of optical nodes in a hybrid fiber coaxial cable system generating suitable control signals to control said switch to sum all inputs signal appearing at said inputs and couple the result to an output coupled to a PHY receiver;

(3) receiving an IUC 3 burst during said contention interval and identifying the cable modem which sent said IUC 3 burst;

(4) sending a message to the cable modem identified in step 3 ordering said cable modem to send an IUC 4 burst, and generating control signals to control said switch to pick just one input for coupling to said output coupled to said PHY receiver;

(5) if no IUC 4 burst from said cable modem identified in step 3 is heard, generating control signals to control said switch to select another single input for coupling to said output coupled to said PHY receiver and sending a command to said cable modem identified in step 3 ordering it to send another IUC 4 burst;

(6) if no IUC 4 burst is heard, repeating steps 5 and 6 until an IUC 4 burst is heard;

(7) when an IUC 4 burst is heard, making an entry in a mapping table associating the cable modem which sent said IUC 4 burst with the optical node coupled to the input upon which said IUC 4 burst is heard; and (8) after said contention interval is over, using information in said mapping table and information in DOCSIS MAP messages to determine upon which input each scheduled non contention burst will be arriving and using that information to generate control signals to control switching by said switch so as to avoid noise aggregation in receiving bursts by a shared DOCSIS receiver coupled through said switch to multiple optical nodes.

17. A method for receiving DOCSIS upstream bursts during contention intervals and non contention intervals in an upstream linecard in a cable modem termination system having one or more PHY receivers, said upstream linecard coupled to a plurality of optical nodes, comprising the steps:

(1) determining by notification or MAP data when a DOCSIS contention interval is active;

(2) enable energy sensors on each input of switch;

(3) sensing energy of an incoming DOCSIS IUC 3 burst at an input of said switch, and controlling switch to couple IUC 3 burst to PHY receiver and receive burst and carry out DOCSIS training protocol;

(4) determining from energy detector which input IUC 3 burst arrived upon and determining from IUC 3 burst which cable modem sent burst;

(5) making a mapping table entry associating cable modem which sent IUC 3 burst to the input and/or optical node to which said cable modem is coupled;

(6) using mapping table and MAP data to control switch to receive non contention bursts without noise aggregation.

18. A method for receiving DOCSIS upstream bursts during contention and non contention intervals, in an upstream linecard in a cable modem termination system having one or more PHY receivers, said upstream linecard coupled to a plurality of optical nodes, comprising steps for:

determining when a contention interval is active, and, when a contention interval is active, operating a switch to sum all inputs to an input of a PHY receiver;

receiving an IUC 3 burst and identifying the cable modem which sent said IUC 3 burst and performing DOCSIS training with said cable modem;

sending a message to said cable modem inviting said cable modem to send one or more IUC 4 bursts and controlling said switch to carry out a successive approximation process to listen for the IUC 4 bursts on ever smaller groups of inputs until a single input is found;

after said single input is found, making a mapping entry in a mapping table associating said cable modem which sent said IUC 4 burst which was heard on a single input with said input and/or optical node to which said cable modem is coupled;

using said mapping table and MAP message data to control said switch to receive scheduled non contention bursts without noise aggregation.

* * * * *